(12) United States Patent
Coutu et al.

(10) Patent No.: US 10,584,884 B2
(45) Date of Patent: Mar. 10, 2020

(54) CONTROL SYSTEM AND METHOD FOR A LIQUID DESICCANT AIR DELIVERY SYSTEM

(71) Applicant: Nortek Air Solutions Canada, Inc., Saskatoon (CA)

(72) Inventors: Kenneth Paul Coutu, Saskatoon (CA); Cam Forman, Saskatoon (CA); Philip Paul LePoudre, Saskatoon (CA); Blake Norman Erb, Warman (CA); Howard Brian Hemingson, Saskatoon (SK); Manfred Gerber, Saskatoon (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 0 days.

(21) Appl. No.: 14/171,951

(22) Filed: Feb. 4, 2014

(65) Prior Publication Data
US 2014/0260367 A1   Sep. 18, 2014

Related U.S. Application Data

(60) Provisional application No. 61/793,826, filed on Mar. 15, 2013.

(51) Int. Cl.
| F24F 3/14 | (2006.01) |
| F24F 3/147 | (2006.01) |
| F24F 12/00 | (2006.01) |

(52) U.S. Cl.
CPC ............ *F24F 3/1417* (2013.01); *F24F 3/147* (2013.01); *F24F 12/002* (2013.01);
(Continued)

(58) Field of Classification Search
CPC .. F24F 3/1417; F24F 3/147; F24F 2003/1435; F24F 2003/1464;
(Continued)

(56) References Cited

U.S. PATENT DOCUMENTS

| 1,015,831 A | 1/1912 | Pielock et al. |
| 2,186,844 A | 1/1940 | Smith |

(Continued)

FOREIGN PATENT DOCUMENTS

| AU | 2011286700 A1 | 12/2012 |
| AU | 2011268661 | 1/2013 |

(Continued)

OTHER PUBLICATIONS

Acker; "Industrial Dehumidification: Water Vapor Load Calculations and System Descriptions"; HPAC Heating/Piping/Air Conditioning; Mar. 1999; pp. 49-59.

(Continued)

*Primary Examiner* — Christopher R Zerphey
(74) *Attorney, Agent, or Firm* — Schwegman Lundberg & Woessner, P.A.

(57) ABSTRACT

An air delivery system may include a housing, a first liquid-to-air membrane energy exchanger (LAMEE), and a desiccant storage tank. The housing includes a supply air channel and an exhaust air channel. The first LAMEE may be an exhaust LAMEE disposed within an exhaust air channel of the housing. The exhaust LAMEE is configured to receive the outside air during a desiccant regeneration mode in order to regenerate desiccant within the exhaust LAMEE. The desiccant storage tank is in communication with the exhaust LAMEE. The exhaust LAMEE is configured to store regenerated desiccant within the desiccant storage tank. The regenerated desiccant within the desiccant storage tank is configured to be tapped during a normal operation mode.

35 Claims, 13 Drawing Sheets

(52) U.S. Cl.
CPC ............... *F24F 2003/1435* (2013.01); *F24F 2003/1464* (2013.01); *F24F 2012/007* (2013.01); *Y02B 30/563* (2013.01)

(58) Field of Classification Search
CPC ...... F24F 12/002; F24F 12/003; F24F 12/007; F24F 2003/1452
See application file for complete search history.

(56) References Cited

U.S. PATENT DOCUMENTS

| | | | |
|---|---|---|---|
| 2,290,465 A * | 7/1942 | Crawford | F24F 3/1417 165/224 |
| 2,562,811 A | 7/1951 | Glenn | |
| 2,946,201 A | 7/1960 | Munters | |
| 2,968,165 A | 1/1961 | Gunnar | |
| 3,009,684 A | 1/1961 | Georg | |
| 3,018,231 A * | 1/1962 | Kelley | F24F 3/1417 202/158 |
| 3,144,901 A | 8/1964 | Meek | |
| 3,247,679 A | 4/1966 | Gershon | |
| 3,291,206 A | 12/1966 | Peter | |
| 3,401,530 A | 9/1968 | Gershon | |
| 3,467,072 A | 9/1969 | Toesca | |
| 3,735,559 A | 5/1973 | Salemme | |
| 4,011,731 A | 3/1977 | Meckler | |
| 4,113,004 A | 9/1978 | Rush et al. | |
| 4,180,985 A * | 1/1980 | Northrup, Jr. | B01D 53/26 62/271 |
| 4,233,796 A | 11/1980 | Mazzoni | |
| 4,235,081 A | 11/1980 | Dowling | |
| 4,257,169 A | 3/1981 | Pierce | |
| 4,259,849 A | 4/1981 | Griffiths | |
| 4,373,347 A | 2/1983 | Howell et al. | |
| 4,380,910 A | 4/1983 | Hood et al. | |
| 4,430,864 A | 2/1984 | Mathiprakasam | |
| 4,474,021 A | 10/1984 | Harband | |
| 4,538,426 A | 9/1985 | Bock | |
| 4,594,860 A | 6/1986 | Coellner et al. | |
| 4,691,530 A | 9/1987 | Meckler | |
| 4,700,550 A | 10/1987 | Rhodes | |
| 4,719,761 A | 1/1988 | Cromer | |
| 4,723,417 A | 2/1988 | Meckler | |
| 4,729,428 A | 3/1988 | Yasutake et al. | |
| 4,729,774 A | 3/1988 | Cohen et al. | |
| 4,841,733 A * | 6/1989 | Dussault | F24F 5/0071 165/223 |
| 4,887,438 A | 12/1989 | Meckler | |
| 4,900,448 A | 2/1990 | Bonne et al. | |
| 4,905,479 A | 3/1990 | Wilkinson | |
| 4,909,810 A | 3/1990 | Nakao et al. | |
| 4,930,322 A | 6/1990 | Ashley et al. | |
| 4,936,107 A | 6/1990 | Kitagaki et al. | |
| 4,939,906 A | 7/1990 | Spatz et al. | |
| 4,941,324 A | 7/1990 | Peterson et al. | |
| 4,982,575 A | 1/1991 | Besik | |
| 5,003,961 A | 4/1991 | Besik | |
| 5,020,334 A | 6/1991 | Wilkinson | |
| 5,020,335 A | 6/1991 | Albers et al. | |
| 5,022,241 A | 6/1991 | Wilkinson | |
| 5,120,445 A | 6/1992 | Colman | |
| 5,131,238 A | 7/1992 | Meckler | |
| 5,148,374 A | 9/1992 | Coellner | |
| 5,170,633 A | 12/1992 | Kaplan | |
| 5,176,005 A | 1/1993 | Kaplan | |
| 5,181,387 A | 1/1993 | Meckler | |
| 5,191,771 A | 3/1993 | Meckler | |
| 5,297,398 A * | 3/1994 | Meckler | B01D 53/261 62/271 |
| 5,311,929 A | 5/1994 | Verret | |
| 5,325,676 A | 7/1994 | Meckler | |
| 5,337,574 A | 8/1994 | Dick | |
| 5,351,497 A | 10/1994 | Lowenstein | |
| 5,353,606 A | 10/1994 | Yoho et al. | |
| 5,373,704 A | 12/1994 | McFadden | |
| 5,387,376 A | 2/1995 | Gasser | |
| 5,448,895 A | 9/1995 | Coellner et al. | |
| 5,471,852 A * | 12/1995 | Meckler | B01D 53/261 62/271 |
| 5,482,625 A | 1/1996 | Shimizu et al. | |
| 5,496,397 A | 3/1996 | Fischer et al. | |
| 5,502,975 A | 4/1996 | Brickley et al. | |
| 5,517,828 A | 5/1996 | Calton et al. | |
| 5,526,651 A | 6/1996 | Worek et al. | |
| 5,542,968 A | 8/1996 | Belding | |
| 5,551,245 A | 9/1996 | Calton et al. | |
| 5,564,281 A | 10/1996 | Calton et al. | |
| 5,579,647 A | 12/1996 | Calton et al. | |
| 5,580,369 A | 12/1996 | Belding | |
| 5,632,954 A | 5/1997 | Coellner et al. | |
| 5,638,900 A | 6/1997 | Lowenstein | |
| 5,649,428 A | 7/1997 | Calton et al. | |
| 5,650,221 A | 7/1997 | Belding | |
| 5,653,115 A | 8/1997 | Brickley et al. | |
| 5,660,048 A | 8/1997 | Belding | |
| 5,661,983 A | 9/1997 | Groten et al. | |
| 5,685,897 A | 11/1997 | Belding | |
| 5,701,762 A | 12/1997 | Akamatsu et al. | |
| 5,718,286 A | 2/1998 | Damsohn et al. | |
| 5,727,394 A | 3/1998 | Belding | |
| 5,732,562 A | 3/1998 | Moratalla | |
| 5,749,230 A | 5/1998 | Coellner et al. | |
| 5,758,508 A | 6/1998 | Belding | |
| 5,758,511 A * | 6/1998 | Yoho | F24F 3/1411 62/271 |
| 5,761,915 A | 6/1998 | Rao | |
| 5,761,923 A | 6/1998 | Maeda | |
| 5,791,153 A | 8/1998 | Belding | |
| 5,791,157 A | 8/1998 | Maeda | |
| 5,816,065 A | 10/1998 | Maeda | |
| 5,825,641 A | 10/1998 | Mangtani | |
| 5,826,434 A | 10/1998 | Belding | |
| 5,826,641 A | 10/1998 | Bierwirth et al. | |
| 5,832,736 A | 11/1998 | Yoshioka et al. | |
| 5,860,284 A | 1/1999 | Goland | |
| 5,890,372 A | 4/1999 | Belding | |
| 5,911,273 A | 6/1999 | Brenner et al. | |
| 5,931,016 A | 8/1999 | Yoho, Sr. | |
| 5,943,874 A | 8/1999 | Maeda | |
| 5,946,931 A | 9/1999 | Lomax et al. | |
| 5,950,447 A | 9/1999 | Maeda et al. | |
| 5,992,160 A | 11/1999 | Bussjager et al. | |
| 6,003,327 A | 12/1999 | Belding | |
| 6,018,953 A | 2/2000 | Belding | |
| 6,018,954 A | 2/2000 | Assaf | |
| 6,029,462 A | 2/2000 | Denniston | |
| 6,029,467 A | 2/2000 | Moratalla | |
| 6,050,100 A | 4/2000 | Belding et al. | |
| 6,079,481 A | 6/2000 | Lowenstein | |
| 6,094,835 A | 8/2000 | Cromer | |
| 6,138,470 A | 10/2000 | Potnis et al. | |
| 6,141,979 A | 11/2000 | Dunlap | |
| 6,145,588 A | 11/2000 | Martin et al. | |
| 6,156,102 A | 12/2000 | Conrad et al. | |
| 6,176,101 B1 | 1/2001 | Lowenstein | |
| 6,178,762 B1 | 1/2001 | Flax | |
| 6,199,388 B1 | 3/2001 | Fischer, Jr. | |
| 6,199,392 B1 | 3/2001 | Maeda | |
| 6,237,354 B1 | 5/2001 | Cromer | |
| 6,269,650 B1 | 8/2001 | Shaw | |
| 6,318,106 B1 | 11/2001 | Maeda | |
| RE37,464 E | 12/2001 | Meckler | |
| 6,363,218 B1 | 3/2002 | Lowenstein | |
| 6,412,295 B2 | 7/2002 | Weiss et al. | |
| 6,442,951 B1 | 9/2002 | Maeda et al. | |
| 6,494,053 B1 | 12/2002 | Forkosh et al. | |
| 6,497,107 B2 | 12/2002 | Maisotsenko et al. | |
| 6,532,763 B1 | 3/2003 | Gupte | |
| 6,546,746 B2 | 4/2003 | Forkosh et al. | |
| 6,568,466 B2 | 5/2003 | Lowenstein | |
| 6,575,228 B1 | 6/2003 | Ragland et al. | |
| 6,598,862 B2 | 7/2003 | Merrill et al. | |
| 6,635,104 B2 | 10/2003 | Komkova et al. | |
| 6,644,059 B2 | 11/2003 | Maeda et al. | |

(56) References Cited

U.S. PATENT DOCUMENTS

| | | |
|---|---|---|
| 6,684,649 B1 | 2/2004 | Thompson |
| 6,709,492 B1 | 3/2004 | Spadaccini et al. |
| 6,720,990 B1 | 4/2004 | Walker et al. |
| 6,739,142 B2 | 5/2004 | Korin |
| 6,745,826 B2 | 6/2004 | Lowenstein |
| 6,751,964 B2 | 6/2004 | Fischer |
| 6,800,118 B2 | 10/2004 | Kusunose et al. |
| 6,841,601 B2 | 1/2005 | Serpico et al. |
| 6,848,265 B2 | 2/2005 | Lowenstein |
| 6,854,278 B2 | 2/2005 | Maisotsenko et al. |
| 6,864,005 B2 | 3/2005 | Mossman |
| 6,935,416 B1 | 8/2005 | Tsunoda et al. |
| 6,973,795 B1 | 12/2005 | Moffitt |
| 6,976,365 B2 | 12/2005 | Forkosh et al. |
| 6,978,633 B2 | 12/2005 | Yamazaki |
| 7,000,427 B2 | 2/2006 | Mathias et al. |
| 7,017,356 B2 | 3/2006 | Moffitt |
| 7,092,006 B2 | 8/2006 | Walker et al. |
| 7,093,452 B2 | 8/2006 | Chee et al. |
| 7,093,649 B2 | 8/2006 | Dawson |
| RE39,288 E | 9/2006 | Assaf |
| 7,178,355 B2 | 2/2007 | Moffitt |
| 7,181,918 B2 | 2/2007 | Reinders et al. |
| 7,231,967 B2 | 6/2007 | Haglid |
| 7,269,966 B2 | 9/2007 | Lowenstein |
| 7,306,650 B2 | 12/2007 | Slayzak |
| 7,331,376 B2 | 2/2008 | Gagnon |
| 7,340,906 B2 | 3/2008 | Moffitt |
| 7,389,646 B2 | 6/2008 | Moffitt |
| 7,389,652 B1 | 6/2008 | Fair |
| 7,593,033 B2 | 9/2009 | Walker et al. |
| 7,602,414 B2 | 10/2009 | Walker et al. |
| 7,605,840 B2 | 10/2009 | Walker et al. |
| 7,717,404 B2 | 5/2010 | Hasegawa et al. |
| 7,719,565 B2 | 5/2010 | Walker et al. |
| 7,737,224 B2 | 6/2010 | Willis et al. |
| 7,753,991 B2 | 7/2010 | Kertzman |
| 7,781,034 B2 | 8/2010 | Yializis |
| 7,817,182 B2 | 10/2010 | Walker et al. |
| 7,942,387 B2 | 5/2011 | Forkosh |
| 7,966,841 B2 | 6/2011 | Lowenstein |
| 8,002,023 B2 | 8/2011 | Murayama |
| 8,033,532 B2 | 10/2011 | Yabu |
| 8,137,436 B2 | 3/2012 | Calis et al. |
| 8,157,891 B2 | 4/2012 | Montie et al. |
| 8,318,824 B2 | 11/2012 | Matsuoka et al. |
| 8,511,074 B2 | 8/2013 | Pierburg |
| 8,550,151 B2 | 10/2013 | Murayama et al. |
| 8,769,971 B2 | 7/2014 | Kozubal et al. |
| 8,783,053 B2 | 7/2014 | McCann |
| 8,887,523 B2 | 11/2014 | Gommed et al. |
| 8,899,061 B2 | 12/2014 | Reytblat |
| 8,915,092 B2 | 12/2014 | Gerber et al. |
| 8,920,699 B2 | 12/2014 | Marutani et al. |
| 8,943,848 B2 | 2/2015 | Phannavong et al. |
| 8,966,924 B2 | 3/2015 | Pichai |
| 9,027,764 B2 | 5/2015 | Marutani et al. |
| 9,109,808 B2 | 8/2015 | Gerber et al. |
| 9,188,349 B2 | 11/2015 | Warmerdam et al. |
| 9,234,665 B2 | 1/2016 | Erb et al. |
| 9,243,810 B2 | 1/2016 | Vandermeulen et al. |
| 9,273,877 B2 | 3/2016 | Vandermeulen |
| 9,429,332 B2 | 8/2016 | Vandermeulen et al. |
| 9,810,439 B2 | 11/2017 | Coutu et al. |
| 9,816,760 B2 | 11/2017 | LePoudre et al. |
| 9,909,768 B2 | 3/2018 | Gerber et al. |
| 10,302,317 B2 | 5/2019 | Besant et al. |
| 10,352,628 B2 | 7/2019 | Erb et al. |
| 10,480,801 B2 | 11/2019 | Gerber et al. |
| 2001/0003902 A1* | 6/2001 | Kopko .................. F24F 3/14 62/89 |
| 2002/0005271 A1 | 1/2002 | Weiss et al. |
| 2002/0038552 A1 | 4/2002 | Maisotsenko et al. |
| 2002/0158023 A1 | 10/2002 | Wurzburger |
| 2003/0014983 A1 | 1/2003 | Maisotsenko |
| 2003/0037905 A1 | 2/2003 | Weng |
| 2003/0070787 A1* | 4/2003 | Moffitt .................. F24F 12/001 165/4 |
| 2003/0121271 A1 | 7/2003 | Dinnage et al. |
| 2003/0132166 A1 | 7/2003 | Rey |
| 2004/0000152 A1 | 1/2004 | Fischer |
| 2004/0055329 A1 | 3/2004 | Mathias et al. |
| 2004/0061245 A1 | 4/2004 | Maisotsenko |
| 2004/0134211 A1 | 7/2004 | Lee et al. |
| 2004/0134212 A1 | 7/2004 | Lee et al. |
| 2004/0168462 A1* | 9/2004 | Assaf .................... F24F 3/1417 62/271 |
| 2004/0226685 A1 | 11/2004 | Gagnon |
| 2005/0056042 A1 | 3/2005 | Bourne et al. |
| 2005/0072303 A1 | 4/2005 | Weidenmann |
| 2005/0230080 A1 | 10/2005 | Paul et al. |
| 2005/0249901 A1 | 11/2005 | Yializis |
| 2005/0262862 A1 | 12/2005 | Moffitt |
| 2005/0279115 A1 | 12/2005 | Lee et al. |
| 2006/0021615 A1 | 2/2006 | Kertzman |
| 2006/0042295 A1 | 3/2006 | Assaf |
| 2006/0205301 A1 | 9/2006 | Klare et al. |
| 2007/0029685 A1* | 2/2007 | Lin ....................... F24F 3/1417 261/154 |
| 2007/0056894 A1 | 3/2007 | Connors |
| 2007/0068663 A1 | 3/2007 | Pierburg |
| 2007/0095519 A1 | 5/2007 | Hombucher |
| 2007/0234743 A1 | 10/2007 | Assaf |
| 2007/0279861 A1 | 12/2007 | Doll et al. |
| 2008/0023182 A1 | 1/2008 | Beamer et al. |
| 2008/0066888 A1 | 3/2008 | Tong et al. |
| 2008/0085437 A1 | 4/2008 | Dean |
| 2008/0099184 A1 | 5/2008 | Han |
| 2008/0283217 A1 | 11/2008 | Gagnon |
| 2009/0095162 A1 | 4/2009 | Hargis et al. |
| 2009/0126913 A1 | 5/2009 | Lee |
| 2009/0133866 A1 | 5/2009 | Campbell et al. |
| 2009/0193974 A1 | 8/2009 | Montie |
| 2009/0294110 A1 | 12/2009 | Foust |
| 2009/0324929 A1 | 12/2009 | Yamakawa et al. |
| 2010/0090356 A1 | 4/2010 | Sines et al. |
| 2010/0170655 A1 | 7/2010 | Kronvall et al. |
| 2010/0170776 A1 | 7/2010 | Ehrenberg et al. |
| 2010/0181062 A1 | 7/2010 | Mccann |
| 2010/0192605 A1 | 8/2010 | Fang |
| 2010/0200068 A1 | 8/2010 | D'arcy et al. |
| 2010/0275629 A1 | 11/2010 | Erickson |
| 2010/0300123 A1* | 12/2010 | Park ..................... B01D 53/06 62/94 |
| 2010/0319370 A1 | 12/2010 | Kozubal |
| 2011/0056384 A1 | 3/2011 | Kadota |
| 2011/0192579 A1 | 8/2011 | Sotokawa et al. |
| 2011/0223486 A1 | 9/2011 | Zhang et al. |
| 2011/0232485 A1 | 9/2011 | Ellsworth |
| 2011/0232633 A1 | 9/2011 | Lima |
| 2011/0259572 A1 | 10/2011 | Muratani et al. |
| 2011/0308265 A1* | 12/2011 | Phannavong .......... F24F 12/001 62/160 |
| 2012/0000227 A1 | 1/2012 | Matsuura et al. |
| 2012/0031133 A1 | 2/2012 | Kuwabara et al. |
| 2012/0061045 A1 | 3/2012 | Huizing |
| 2012/0073791 A1 | 3/2012 | Dubois |
| 2012/0085112 A1 | 4/2012 | Wintemute |
| 2012/0106073 A1 | 5/2012 | Wu et al. |
| 2012/0125020 A1 | 5/2012 | Vandermeulen |
| 2012/0125021 A1 | 5/2012 | Vandermeulen |
| 2012/0125023 A1 | 5/2012 | Kopko et al. |
| 2012/0125031 A1 | 5/2012 | Vandermeulen |
| 2012/0125405 A1 | 5/2012 | Vandermeulen |
| 2012/0125581 A1 | 5/2012 | Allen |
| 2012/0131934 A1 | 5/2012 | Vandermeulen |
| 2012/0131937 A1 | 5/2012 | Vandermeulen |
| 2012/0131938 A1 | 5/2012 | Vandermeulen |
| 2012/0131939 A1 | 5/2012 | Vandermeulen |
| 2012/0131940 A1 | 5/2012 | Vandermeulen |
| 2012/0132513 A1 | 5/2012 | Vandermeulen |
| 2012/0162918 A1 | 6/2012 | Thyni et al. |
| 2012/0168369 A1 | 7/2012 | Van Medevoort et al. |
| 2012/0180505 A1 | 7/2012 | Gerber et al. |

(56) References Cited

U.S. PATENT DOCUMENTS

| | | |
|---|---|---|
| 2012/0186281 A1 | 7/2012 | Vandermeulen |
| 2012/0247132 A1* | 10/2012 | Lakdawala .......... F24F 5/0071 62/79 |
| 2012/0298340 A1 | 11/2012 | Al-Otaibi |
| 2013/0056177 A1 | 3/2013 | Coutu |
| 2013/0186121 A1 | 7/2013 | Erb et al. |
| 2013/0199220 A1 | 8/2013 | Ma et al. |
| 2013/0240438 A1 | 9/2013 | Willis et al. |
| 2013/0248147 A1 | 9/2013 | Wintemute et al. |
| 2013/0283837 A1 | 10/2013 | Takahashi et al. |
| 2013/0340449 A1 | 12/2013 | Kozubal et al. |
| 2014/0054004 A1 | 2/2014 | LePoudre et al. |
| 2014/0054013 A1 | 2/2014 | Lepoudre et al. |
| 2014/0083648 A1 | 3/2014 | Wawryk |
| 2014/0190037 A1 | 7/2014 | Erb et al. |
| 2014/0245769 A1 | 9/2014 | Vandermeulen et al. |
| 2014/0260369 A1 | 9/2014 | Lepoudre |
| 2014/0260373 A1 | 9/2014 | Gerber et al. |
| 2014/0260399 A1 | 9/2014 | Vandermeulen |
| 2014/0262125 A1 | 9/2014 | Erb et al. |
| 2014/0262144 A1 | 9/2014 | Erb et al. |
| 2014/0326433 A1 | 11/2014 | Kozubal |
| 2015/0096714 A1 | 4/2015 | Dagley et al. |
| 2015/0184876 A1 | 7/2015 | Vandermeulen et al. |
| 2015/0292754 A1 | 10/2015 | Mongar |
| 2015/0323203 A1 | 11/2015 | Gerber et al. |
| 2016/0054012 A1 | 2/2016 | Lepoudre et al. |
| 2016/0084512 A1 | 3/2016 | Erb et al. |
| 2016/0187010 A1 | 6/2016 | Vandermeulen et al. |
| 2016/0290666 A1 | 10/2016 | Coutu et al. |
| 2016/0298865 A1 | 10/2016 | Gerber et al. |
| 2016/0327345 A1 | 11/2016 | Lowenstein |
| 2017/0241655 A1 | 8/2017 | Lepoudre et al. |
| 2018/0073753 A1 | 3/2018 | Lepoudre et al. |
| 2018/0128510 A1 | 5/2018 | Lepoudre et al. |
| 2018/0135880 A1 | 5/2018 | Ghadiri Moghaddam et al. |
| 2018/0187918 A1 | 7/2018 | Lepoudre et al. |
| 2019/0212020 A1 | 7/2019 | Besant et al. |

FOREIGN PATENT DOCUMENTS

| | | |
|---|---|---|
| AU | 2014231672 B2 | 3/2018 |
| AU | 2015230799 B2 | 3/2018 |
| AU | 2013305427 | 4/2018 |
| AU | 2014231681 B2 | 6/2018 |
| AU | 2013305428 B2 | 9/2018 |
| AU | 2014231668 B2 | 2/2019 |
| AU | 2014231667 | 6/2019 |
| CA | 2283089 A1 | 11/2000 |
| CA | 2801352 A | 12/2011 |
| CA | 2801352 A1 | 12/2011 |
| CA | 2798928 A1 | 2/2012 |
| CA | 2843763 A1 | 3/2013 |
| CA | 2904224 A1 | 9/2014 |
| CA | 2901483 C | 4/2019 |
| CH | 193732 A | 10/1937 |
| CN | 1163389 A | 10/1997 |
| CN | 1343292 A | 4/2002 |
| CN | 1456855 A | 11/2003 |
| CN | 1517610 A | 8/2004 |
| CN | 1518477 A | 8/2004 |
| CN | 1666081 A | 9/2005 |
| CN | 1711448 A | 12/2005 |
| CN | 2821506 Y | 9/2006 |
| CN | 200958820 Y | 10/2007 |
| CN | 101368754 | 2/2009 |
| CN | 101405559 A | 4/2009 |
| CN | 101421580 A | 4/2009 |
| CN | 101469090 A | 7/2009 |
| CN | 101776406 A | 7/2010 |
| CN | 101918777 A | 12/2010 |
| CN | 102076401 A | 5/2011 |
| CN | 201906567 U | 7/2011 |
| CN | 102165268 A | 8/2011 |
| CN | 102232015 A | 11/2011 |
| CN | 102345909 A | 2/2012 |
| CN | 102395419 A | 3/2012 |
| CN | 102548727 A | 7/2012 |
| CN | 102549361 A | 7/2012 |
| CN | 102713154 A | 10/2012 |
| CN | 102933931 A | 2/2013 |
| CN | 102939397 | 2/2013 |
| CN | 103068246 | 4/2013 |
| CN | 103069246 A | 4/2013 |
| CN | 103827595 A | 5/2014 |
| CN | 104048434 | 9/2014 |
| CN | 203893703 | 10/2014 |
| CN | 104136855 | 11/2014 |
| CN | 104583706 A | 4/2015 |
| CN | 105121989 A | 12/2015 |
| CN | 105164474 A | 12/2015 |
| CN | 105202795 A | 12/2015 |
| CN | 105283715 A | 1/2016 |
| CN | 101512238 A | 8/2016 |
| CN | 105164484 B | 6/2017 |
| CN | 105121989 B | 9/2017 |
| CN | 107249715 A | 10/2017 |
| CN | 107300230 A | 10/2017 |
| CN | 107560482 A | 1/2018 |
| CN | 107850335 | 3/2018 |
| CN | 107923647 A | 4/2018 |
| CN | 108027221 A | 5/2018 |
| CN | 109028519 A | 12/2018 |
| CN | 109073265 A | 12/2018 |
| CN | 110345803 | 10/2019 |
| DE | 10143092 A1 | 3/2003 |
| EP | 0448991 A2 | 10/1991 |
| EP | 0661502 A2 | 7/1995 |
| EP | 0678321 A2 | 10/1995 |
| EP | 1108575 A1 | 6/2001 |
| EP | 2397787 A2 | 12/2011 |
| EP | 3314188 | 5/2018 |
| EP | 2893283 B1 | 12/2018 |
| EP | 2972039 B1 | 12/2018 |
| EP | 2971993 | 8/2019 |
| FR | 2291457 A1 | 6/1976 |
| GB | 1354502 A | 6/1974 |
| GB | 2015384 A | 9/1979 |
| IN | 201717044889 | 3/2018 |
| IN | 201717044890 | 3/2018 |
| IN | 201817002765 A | 4/2018 |
| IN | 201817037404 A | 12/2018 |
| JP | 6152594 A | 3/1986 |
| JP | 05157282 A | 6/1993 |
| JP | H09113167 | 5/1997 |
| JP | 09196482 A | 7/1997 |
| JP | 10170177 A | 6/1998 |
| JP | 2004116419 A | 4/2004 |
| JP | 2004257588 A | 9/2004 |
| JP | 2008070046 A | 3/2008 |
| JP | 2009275955 A | 11/2009 |
| SG | 10201809840VA | 12/2018 |
| TW | I271499 B | 1/2007 |
| WO | WO 96/41107 | 12/1996 |
| WO | WO 99/14535 | 3/1999 |
| WO | WO-01/35039 A1 | 5/2001 |
| WO | WO-01/71260 A1 | 9/2001 |
| WO | WO-03/049835 A1 | 6/2003 |
| WO | WO-2004/065875 A1 | 8/2004 |
| WO | 2005100243 | 10/2005 |
| WO | WO-2008/037079 A1 | 4/2008 |
| WO | WO-2008/053367 A2 | 5/2008 |
| WO | WO-2008/089484 A1 | 7/2008 |
| WO | WO-2009/000974 A1 | 12/2008 |
| WO | WO-2009/094032 A1 | 7/2009 |
| WO | WO-2009/158030 A1 | 12/2009 |
| WO | WO-2010006968 A1 | 1/2010 |
| WO | WO-2011/062808 A1 | 5/2011 |
| WO | WO 2011/161547 | 12/2011 |
| WO | WO-2011/161547 A3 | 12/2011 |
| WO | WO-2012/018089 A1 | 2/2012 |
| WO | 2012050860 | 4/2012 |
| WO | WO-2012/042553 A1 | 4/2012 |

(56) References Cited

FOREIGN PATENT DOCUMENTS

| | | |
|---|---|---|
| WO | WO-2012/087273 A1 | 6/2012 |
| WO | WO-2012/097445 A1 | 7/2012 |
| WO | WO-2012167366 A1 | 12/2012 |
| WO | WO-2013/029148 A1 | 3/2013 |
| WO | WO-2013/094206 A1 | 6/2013 |
| WO | WO-2013/107554 A1 | 7/2013 |
| WO | WO 2013/192397 | 12/2013 |
| WO | WO-2014/029003 A1 | 2/2014 |
| WO | WO-2014029004 A1 | 2/2014 |
| WO | WO-2014/107790 A1 | 7/2014 |
| WO | 2014138851 | 9/2014 |
| WO | 2014142277 | 9/2014 |
| WO | WO-2014/138846 A1 | 9/2014 |
| WO | WO-2014/138847 A1 | 9/2014 |
| WO | WO-2014/138859 A1 | 9/2014 |
| WO | WO 2014/138860 | 9/2014 |
| WO | WO-2014138847 | 9/2014 |
| WO | WO-2016/026042 A1 | 2/2016 |
| WO | WO-2016/183667 A1 | 11/2016 |
| WO | WO-2016/183668 A1 | 11/2016 |
| WO | WO-2016/207864 A1 | 12/2016 |
| WO | WO-2017152268 A1 | 9/2017 |

OTHER PUBLICATIONS

ASHRAE Technical Committee; Meeting Programs; Jan. 29, 1997 to Jan. 25, 2001 (13 pages).
Bellia et al.; "Air Conditioning Systems With Desiccant Wheel for Italian Climates"; International Journal on Architectural Science; vol. 1; No. 4; 2000; (pp. 193-213).
Chant et al.; "A Steady-State Simulation of an Advanced Desiccant-Enhanced Cooling and Dehumidification System"; ASHRAE Transactions: Research; Jul. 1992; pp. 339-347.
Coad; "Conditioning Ventilation Air for Improved Performance and Air Quality"; HPAC Heating/Piping/Air Conditioning; Sep. 1999; pp. 49-56.
Des Champs Laboratories, Inc.; "Dehumidification Solutions"; 2001; (18 pages).
Des Champs Technologies; "Desi-WringerTM Precision Desiccant Dehumidification Systems"; 2007; (12 pages).
DiBlasio; "Desicants in Hospitals—Conditioning a Research Facility"; Engineered Systems; Sep. 1995; (4 pages).
Downing et al.; "Operation and Maintenance for Quality Indoor Air"; Proceedings of the 7th Symposium on Improving Building Systems in Hot and Humid Climates, Ft. Worth, TX; Oct. 9-10, 1990; (5 pages).
Downing; "Humidity Control—No Place Like Home"; Engineered Systems; 1996; (4 pages).
Federal Technology Alert; "Two-Wheel Desiccant Dehumidification System—Technology for Dehumidification and Improving Indoor Air Quality"; Apr. 1997 (24 pages).
Fischer; "Active Desiccant Dehumidification Module Integration With Rooftop Packaged HVAC Units—Final Report Phase 3B"; Oak Ridge National Laboratory; Mar. 2002; (36 pages).
Fischer; "Optimizing IAQ, Humidity Control, and Energy Efficiency in School Environments Through the Application of Desiccant-Based Total Energy Recovery Systems"; IAQ 96/Paths to Better Building Environments/Environmental Effects on Health and Productivity; Date unknown (pp. 179-194).
Harriman, III et al.; "Dehumidification and Cooling Loads From Ventilation Air"; ASHRAE Journal; Nov. 1997; (pp. 37-45).
Harrimann, III et al.; "New Weather Data for Energy Calculations"; ASHRAE Journal; Mar. 1999; (pp. 31-38).
Harriman, III et al.; "Evaluating Active Desiccant Systems for Ventilating Commercial Buildings"; ASHRAE Journal; Oct. 1999; (pp. 25-34).
"Heating, Ventilating, and Air Conditioning (HVAC) Demonstration"; Chapter 8—HVAC Demonstration; (pp. 65-77 and 157-158).
Jeong et al.; "Energy Conservation Benefits of a Dedicated Outdoor Air System with Parallel Sensible Cooling by Ceiling Radiant Panels"; ASHRAE Transactions; vol. 109; Part 2; 2003; (10 pages).
Kosar et al.; "Dehumidification Issues of Standard 62/1989"; ASHARE Journal; Mar. 1998; (pp. 71-75).
AAONAIRE Energy Recovery Units Users Information Manual.
Mc Gahey; "New Commercial Applications for Desiccant-Based Cooling"; ASHARE Journal; Jul. 1998; (pp. 41-45).
Mc Gahey et al.; "Desiccants: Benefits for the Second Century of Air Conditioning"; Proceedings of the Tenth Symposium on Improving Building Systems in Hot and Humid Climates, Ft. Worth, Texas; May 13-14, 1996 (9 pages).
Mumma et al.; "Achieving Dry Outside Air in an Energy-Efficient Manner"; ASHRAE Transactions 2001; vol. 107; Part 1; (8 pages).
Mumma; "Dedicated Outdoor Air-Dual Wheel System Control Requirements"; ASHRAE Transactions 2001; vol. 107; Part 1; (9 pages).
Mumma et al.; "Extension of the Multiple Spaces Concept of ASHRAE Standard 62 to Include Infiltration, Exhaust/Exfiltration, Interzonal Transfer, and Additional Short-Circuit Paths"; ASHRAE Transactions: Symposia; Date Unknown; (pp. 1232-1241).
Mumma; "Overview of Integrating Dedicated Outdoor Air Systems With Parallel Terminal Systems"; ASHRAE Transactions 2001; vol. 107; Part 1; (7 pages).
Nimmo et al.; "DEAC: Desiccant Enhancement of Cooling-Based Dehumidification"; ASHRAE Transactions: Symposia; Date Unknown; (pp. 842-848).
Qin et al.; "Engine-driven Desiccant-assisted Hybrid Air-conditioning System"; 23rd World Gas Conference, Amsterdam 2006 (15 pages).
Scofield et al.; "HVAC Design for Classrooms: Divide and Conquer"; Heating/Piping/Air Conditioning; May 1993 (pp. 53-59).
"Energy Recovery—Fresh in Air Quality"; SEMCO Inc.; Date Unknown (131 pages).
Sevigny et al.; "Air Handling Unit Direct Digital Control System Retrofit to Provide Acceptable Indoor Air Quality and Global Energy Optimization"; Energy Engineering; vol. 94; No. 5; 1997; (pp. 24-43).
Shank et al.; "Selecting the Supply Air Conditions for a Dedicated Outdoor Air System Working in Parallel with Distributed Sensible Cooling Terminal Equipment"; ASHRAE Transactions 2001; vol. 107; Part 1; (10 pages).
Smith et al.; "Outdoor Air, Heat Wheels and JC Penny: A New Approach to Retail Ventilation"; Proceedings of the Eleventh Symposium on Improving Building Systems in Hot and Humid Climates, Ft. Worth, Texas; Jun. 1-2, 1998 (pp. 311).
Smith; "Schools Resolve IAQ/Humidity Problems with Desiccant Preconditioning"; Heating/Piping/Air Conditioning; Apr. 1996; (6 pages).
Swails et al.; "A Cure for Growing Pains"; www.csermag.com; Consulting Specifying Engineer; Jun. 1997 (4 pages).
"Advances in Desiccant-Based Dehumidification"; TRANE Engineers Newsletter; vol. 34-4; Date Unknown; (pp. 1-8).
Turpin; "Dehumidification: The Problem no One Wants to Talk About (Apr. 2000)"; http//www.esmagazine.com/copyright/de12c1c879ba8010VgnVCM100000f932a8c0_? . . . ; May 6, 2011 (6 pages).
Yborra; "Field Evaluation of Desiccant-Integrated HVAC Systems: A Review of Case Studies in Multiple Commercial/Institutional Building Types"; Proceedings of the Eleventh Symposium on Improving Building Systems in Hot and Humid Climates, Ft. Worth, Texas; Jun. 1-2, 1998;(pp. 361-370).
"Performance analysis of a liquid desiccant and membrane contactor hybrid air-conditioning system," Bergero, Chiari, Energy and Buildings, 2010.
"Desiccant Enhanced Evaporative Air Conditioning: Parametric Analysis and Design," J. Woods and E. Kozunal, Presented at the Second International Conference on Building Energy and Environment (COBEE2012), Conference Paper, Oct. 2012.
International Search Report and Written Opinion for counterpart application PCT/CA2014/000083.

(56) References Cited

OTHER PUBLICATIONS

"European Application Serial No. 14764305.0, Response filed Apr. 13, 2016 to Communication Pursuant to Article 94(3) EPC mailed Oct. 8, 2015", 10 pgs.
"International Application Serial No. PCT/CA2014/000083, International Preliminary Report on Patentability mailed Sep. 24, 2015", 9 pgs.
U.S. Appl. No. 14/830,492, filed Aug. 19, 2015, Liquid to Air Membrane Energy Exchangers.
U.S. Appl. No. 13/449,598, filed Apr. 18, 2012, Energy Exchange System For Conditioning Air in an Enclosed Structure.
U.S. Appl. No. 15/185,180, filed Jun. 17, 2016, Energy Exchange System for Conditioning Air in an Enclosed Structure.
U.S. Appl. No. 13/702,596, filed Apr. 15, 2013, Liquid-to-Air Membrane Energy Exchanger.
U.S. Appl. No. 14/957,795, filed Dec. 3, 2015, Liquid-to-Air Membrane Energy Exchanger.
U.S. Appl. No. 13/737,473, filed Jan. 9, 2013, System and Method for Providing Conditioned Air to an Enclosed Structure.
U.S. Appl. No. 13/797,152, filed Mar. 12, 2013, Liquid Panel Assembly.
U.S. Appl. No. 14/187,413, filed Feb. 24, 2014, Evaporative Cooling System with Liquid-to-Air Membrane Energy Exchanger.
U.S. Appl. No. 13/801,280, U.S. Pat. No. 9,109,808, filed Mar. 13, 2013, Variable Desiccant Control Energy Exchange System and Method.
U.S. Appl. No. 13/797,062, filed Mar. 12, 2013, Membrane Support Assembly for an Energy Exchanger.
U.S. Appl. No. 14/804,953, filed Jul. 21, 2015, Variable Desiccant Control Energy Exchange System and Method.
U.S. Appl. No. 15/185,155, filed Jun. 17, 2016, Variable Desiccant Control Energy Exchange System and Method.
U.S. Appl. No. 14/192,019, filed Feb. 27, 2014, Energy Exchange Assembly with Microporus Membrane.
U.S. Appl. No. 14/190,715, filed Feb. 26, 2014, Membrane-Integrated Energy Exchange Assembly.
U.S. Appl. No. 10/048,797, U.S. Pat. No. 6,684,649, filed Jan. 31, 2002, Enthalpy Pump.
"AAONAIRE Energy Recovery Units Users Information Manual", (Aug. 2006), 16 pgs.
"U.S. Appl. No. 10/048,797, Amendment and Response filed Apr. 29, 2003 to Non-Final Office dated Mar. 11, 2003", 10 pgs.
"U.S. Appl. No. 10/048,797, Non-Final Office dated Mar. 11, 2003", 4 pgs.
"U.S. Appl. No. 10/048,797, Notice of Allowance dated May 13, 2003", 5 pgs.
"U.S. Appl. No. 13/350,902, Appeal Brief filed Apr. 4, 2014", 24 pgs.
"U.S. Appl. No. 13/350,902, Appeal Decision dated Sep. 30, 2016", 6 pgs.
"U.S. Appl. No. 13/350,902, Examiner's Answer dated Jun. 16, 2014", 17 pgs.
"U.S. Appl. No. 13/350,902, Final Office Action dated Dec. 30, 2013", 13 pgs.
"U.S. Appl. No. 13/350,902, Non Final Office Action dated Oct. 1, 2013", 13 pgs.
"U.S. Appl. No. 13/350,902, Notice of Allowance dated Nov. 9, 2016", 9 pgs.
"U.S. Appl. No. 13/350,902, Reply Brief filed Jul. 8, 2014", 9 pgs.
"U.S. Appl. No. 13/350,902, Response filed Aug. 5, 2013 to Restriction Requirement dated Jul. 23, 2013", 2 pgs.
"U.S. Appl. No. 13/350,902, Response filed Oct. 29, 2013 to Non Final Office Action dated Oct. 1, 2013", 15 pgs.
"U.S. Appl. No. 13/350,902, Restriction Requirement dated Jul. 23, 2013", 8 pgs.
"U.S. Appl. No. 13/449,598, Final Office Action dated Feb. 4, 2016", 23 pgs.
"U.S. Appl. No. 13/449,598, Non Final Office Action dated Apr. 24, 2015", 18 pgs.

"U.S. Appl. No. 13/449,598, Non Final Office Action dated Aug. 27, 2015", 20 pgs.
"U.S. Appl. No. 13/449,598, Notice of Allowance dated Mar. 10, 2017", 7 pgs.
"U.S. Appl. No. 13/449,598, Notice of Allowance dated Nov. 4, 2016", 9 pgs.
"U.S. Appl. No. 13/449,598, Response filed Jan. 29, 2015 to Restriction Requirement dated Jan. 5, 2015", 2 pgs.
"U.S. Appl. No. 13/449,598, Response filed Jul. 17, 2015 to Non Final Office Action dated Apr. 24, 2015", 17 pgs.
"U.S. Appl. No. 13/449,598, Response filed Nov. 16, 2015 to Non Final Office Action dated Aug. 27, 2015", 18 pgs.
"U.S. Appl. No. 13/449,598, Restriction Requirement dated Jan. 5, 2015", 10 pgs.
"U.S. Appl. No. 13/702,596, Appeal Brief filed Jun. 15, 2015", 82 pgs.
"U.S. Appl. No. 13/702,596, Final Office Action dated Jan. 30, 2015", 15 pgs.
"U.S. Appl. No. 13/702,596, Non Final Office Action dated Oct. 30, 2014", 16 pgs.
"U.S. Appl. No. 13/702,596, Notice of Allowance dated Oct. 1, 2015", 7 pgs.
"U.S. Appl. No. 13/702,596, Notice of Allowance dated Nov. 25, 2015", 2 pgs.
"U.S. Appl. No. 13/702,596, Post Allowance Amendment filed Oct. 7, 2015", 13 pgs.
"U.S. Appl. No. 13/702,596, PTO Response to Rule 312 Communication dated Oct. 19, 2015", 2 pgs.
"U.S. Appl. No. 13/702,596, Response filed Dec. 15, 2014 to Non-Final Office Action dated Oct. 30, 2014", 21 pgs.
"U.S. Appl. No. 13/797,062, Appeal Brief filed Jun. 9, 2016", 33 pgs.
"U.S. Appl. No. 13/797,062, Final Office Action dated Feb. 24, 2016", 29 pgs.
"U.S. Appl. No. 13/797,062, Non Final Office Action dated May 7, 2015", 19 pgs.
"U.S. Appl. No. 13/797,062, Non Final Office Action dated Sep. 25, 2015", 24 pgs.
"U.S. Appl. No. 13/797,062, Response filed Apr. 23, 2015 to Restriction Requirement dated Mar. 13, 2015", 3 pgs.
"U.S. Appl. No. 13/797,062, Response filed Jul. 17, 2015 to Non Final Office Action dated May 7, 2015", 16 pgs.
"U.S. Appl. No. 13/797,062, Response filed Nov. 30, 2015 to Non Final Office Action dated Sep. 25, 2015", 16 pgs.
"U.S. Appl. No. 13/797,062, Restriction Requirement dated Mar. 13, 2015", 8 pgs.
"U.S. Appl. No. 13/797,152, Appeal Brief filed Jun. 9, 2016", 29 pgs.
"U.S. Appl. No. 13/797,152, Corrected Notice of Allowance dated Mar. 9, 2017", 7 pgs.
"U.S. Appl. No. 13/797,152, Final Office Action dated Feb. 25, 2016", 14 pgs.
"U.S. Appl. No. 13/797,152, Non Final Office Action dated Aug. 25, 2015", 10 pgs.
"U.S. Appl. No. 13/797,152, Notice of Allowance dated Mar. 9, 2017", 7 pgs.
"U.S. Appl. No. 13/797,152, Notice of Allowance dated Oct. 31, 2016", 7 pgs.
"U.S. Appl. No. 13/797,152, Response filed Nov. 20, 2015 to Non Final Office Action dated Aug. 25, 2015", 12 pgs.
"U.S. Appl. No. 13/801,280, 312 Amendment filed Jun. 18, 2015", 8 pgs.
"U.S. Appl. No. 13/801,280, Non Final Office Action dated Feb. 12, 2015", 7 pgs.
"U.S. Appl. No. 13/801,280, Notice of Allowance dated May 19, 2015", 7 pgs.
"U.S. Appl. No. 13/801,280, PTO Response to 312 Amendment dated Jul. 9, 2015", 2 pgs.
"U.S. Appl. No. 13/801,280, Response filed Jan. 7, 2015 to Restriction Requirement dated Dec. 10, 2014", 1 pg.
"U.S. Appl. No. 13/801,280, Response filed Mar. 31, 2015 to Non Final Office Action dated Feb. 12, 2015", 9 pgs.

(56) References Cited

OTHER PUBLICATIONS

"U.S. Appl. No. 13/801,280, Restriction Requirement dated Dec. 10, 2014", 9 pgs.
"U.S. Appl. No. 14/186,420, Notice of Allowance dated Jan. 27, 2017", 7 pgs.
"U.S. Appl. No. 14/187,413, Advisory Action dated Nov. 10, 2016", 4 pgs.
"U.S. Appl. No. 14/187,413, Final Office Action dated Jul. 28, 2016", 20 pgs.
"U.S. Appl. No. 14/187,413, Non Final Office Action dated Feb. 8, 2017", 15 pgs.
"U.S. Appl. No. 14/187,413, Non Final Office Action dated Mar. 17, 2016", 15 pgs.
"U.S. Appl. No. 14/187,413, Response filed Feb. 25, 2015 to Restriction Requirement dated Feb. 16, 2016", 3 pgs.
"U.S. Appl. No. 14/187,413, Response filed May 26, 2016 to Non Final Office Action dated Mar. 17, 2016", 15 pgs.
"U.S. Appl. No. 14/187,413, Response filed Oct. 28, 2016 to Final Office Action dated Jul. 28, 2016", 17 pgs.
"U.S. Appl. No. 14/187,413, Response filed Dec. 21, 2016 to Final Office Action dated Jul. 28, 2016 and Advisory Action dated Nov. 10, 2016", 15 pgs.
"U.S. Appl. No. 14/187,413, Restriction Requirement dated Feb. 16, 2016", 6 pgs.
"U.S. Appl. No. 14/190,715, Restriction Requirement dated Apr. 13, 2017", 7 pgs.
"U.S. Appl. No. 14/804,953, Non Final Office Action dated Sep. 15, 2016", 8 pgs.
"U.S. Appl. No. 14/804,953, Notice of Allowance dated Feb. 27, 2017", 7 pgs.
"U.S. Appl. No. 14/804,953, Response filed Dec. 15, 2016 to Non Final Office Action dated Sep. 15, 2016", 7 pgs.
"U.S. Appl. No. 14/957,795, Non Final Office Action dated Apr. 3, 2017", 19 pgs.
"Australian Application Serial No. 2011268661, First Examiner Report dated Sep. 24, 2014", 5 pgs.
Australian Application Serial No. 2011268661, Response filed Jul. 20, 2015 to First Examiner Report dated Sep. 24, 2014, 8 pgs.
"Australian Application Serial No. 2011268661, Response filed Sep. 23, 2015 to Second Examiner Report dated Aug. 18, 2015", 5 pgs.
"Australian Application Serial No. 2011268661, Second Examiner Report dated Aug. 18, 2015", 6 pgs.
"Austrailian Application Serial No. 2012208921, First Examiner Report dated Jun. 2, 2016", 7 pgs.
"Australian Application Serial No. 2012304223, First Examiner Report dated Aug. 5, 2016", 4 pgs.
"Australian Application Serial No. 2012304223, Response filed Feb. 16, 2017 to First Examiner Report dated Aug. 5, 2016", 25 pgs.
"Australian Application Serial No. 2013305427, Examination Report dated Mar. 3, 2017", 4 pgs.
"Australian Application Serial No. 2015230799, First Examiner Report dated Mar. 27, 2017", 10 pgs.
"Canadian Application Serial No. 2,801,352, Office Action dated Aug. 15, 2016", 3 pgs.
"Canadian Application Serial No. 2,801,352, Response filed Feb. 8, 2017 to Office Action dated, Aug. 15, 2016", 89 pgs.
"Canadian Application Serial No. 2,843,763, Office Action dated Dec. 4, 2014", 3 pgs.
"Canadian Application Serial No. 2,843,763, Response filed May 12, 2015 to Office Action dated Dec. 4, 2014", 31 pgs.
"Canadian Application Serial No. 2,901,483, Office Action dated Nov. 23, 2016", 4 pgs.
"Chinese Application Serial No. 201280006006.9, Office Action dated Feb. 2, 2016", (w/ English Summary), 19 pgs.
"Chinese Application Serial No. 201280006006.9, Response filed Apr. 8, 2016 to Office Action dated Feb. 2, 2016", (w/ English Translation of Claims), 64 pgs.
"Chinese Application Serial No. 201280006006.9, Voluntary Amendment filed Apr. 14, 2014", 61 pgs.
"Chinese Application Serial No. 201180031103.9, Office Action dated Feb. 11, 2015", (w/ English Translation), 16 pgs.
"Chinese Application Serial No. 201180031103.9, Office Action dated Jun. 13, 2014", (w/ English Translation), 19 pgs.
"Chinese Application Serial No. 201180031103.9, Office Action dated Sep. 9, 2015", (w/ English Translation), 3 pgs.
"Chinese Application Serial No. 201180031103.9, Office Action dated Nov. 6, 2015", (w/ English Translation), 5 pgs.
"Chinese Application Serial No. 201180031103.9, Response filed Apr. 27, 2015 to Office Action dated Feb. 11, 2015", (w/ English Translation), 15 pgs.
"Chinese Application Serial No. 201180031103.9, Response filed Sep. 26, 2014 to Office Action dated Jun. 13, 2014", (w/ English Translation), 12 pgs.
"Chinese Application Serial No. 201180031103.9, Response filed Sep. 29, 2015 to Office Action dated Sep. 9, 2015", (w/ English Translation), 78 pgs.
"Chinese Application Serial No. 201280006006.9, Office Action dated May 13, 2015", 3 pgs.
"Chinese Application Serial No. 201280006006.9, Office Action dated Aug. 15, 2016", (English Translation), 18 pgs.
"Chinese Application Serial No. 201280006006.9, Response filed Sep. 28, 2015 to Office Action dated May 13, 2015", (w/ English Translation of Claims), 71 pgs.
"Chinese Application Serial No. 201280006006.9, Response filed Nov. 30, 2016 to Office Action dated Aug. 15, 2016", (w/ English Translation of Claims), 69 pgs.
"Chinese Application Serial No. 201280042778.8, Office Action dated Feb. 3, 2016", (With English Translation), 9 pgs.
"Chinese Application Serial No. 201280042778.8, Office Action dated Sep. 7, 2016", 3 pgs.
"Chinese Application Serial No. 201280042778.8, Response filed May 25, 2016 to Office Action dated Feb. 3, 2016", Without English Translation of Claims, 46 pgs.
"Chinese Application Serial No. 201280042778.8, Response filed Nov. 16, 2016 to Office Action dated Sep. 7, 2016", Without English Translation of Claims, 43 pgs.
"Chinese Application Serial No. 201380042926.0, Office Action dated Feb. 26, 2016", (With English Translation), 15 pgs.
"Chinese Application Serial No. 201380042926.0, Office Action dated Nov. 28, 2016", (w/ English Translation), 12 pgs.
"Chinese Application Serial No. 201380042926.0, Response filed Feb. 13, 2017 to Office Action dated Sep. 28, 2016", (w/ English Translation of Amended Claims), 56 pgs.
"Chinese Application Serial No. 201380042926.0, Response filed Jul. 7, 2016 to Office Action dated Feb. 26, 2016", (w/ English Translation of Claims), 40 pgs.
"Chinese Application Serial No. 201380044484.3, Office Action dated Jan. 13, 2017", (w/ English Translation), 16 pgs.
"Chinese Application Serial No. 201380044484.3, Office Action dated Mar. 28, 2016", (w/ English Translation), 16 pgs.
"Chinese Application Serial No. 201380044484.3, Response filed Mar. 28, 2017 to Office Action dated Jan. 13, 2017", (w/ English Translation of Claims), 58 pgs.
"Chinese Application Serial No. 201380044484.3, Response filed Oct. 12, 2016 to Office Action dated Mar. 28, 2016", (w/ English Translation of Claims), 54 pgs.
"Chinese Application Serial No. 201480015355.6, Office Action dated Nov. 28, 2016", (w/ English Translation), 16 pgs.
"Chinese Application Serial No. 201480015422.4, Office Action dated Nov. 1, 2016", (w/ English Translation), 13 pgs.
"Chinese Application Serial No. 201480015766.5, Office Action dated Oct. 19, 2016", (w/ English Translation), 9 pgs.
"Chinese Application Serial No. 201480015766.5, Response filed Jan. 20, 2017 to Office Action dated Oct. 19, 2016", (w/ English Translation of Claims), 52 pgs.
"European Application Serial No. 11797695.1, Extended European Search Report dated Jan. 25, 2016", 11 pgs.
"European Application Serial No. 11797695.1, Partial Supplementary European Search Report dated Oct. 7, 2015", 6 pgs.
"European Application Serial No. 11797695.1, Response filed Aug. 22, 2016 to Office Action dated Feb. 11, 2016", 9 pgs.

(56) References Cited

OTHER PUBLICATIONS

"European Application Serial No. 12736074.1, Extended European Search Report dated Jul. 13, 2015", 8 pgs.
"European Application Serial No. 12736074.1, Response filed Oct. 2, 2015 to Extended European Search Report dated Jul. 13, 2015", 10 pgs.
"European Application Serial No. 12827918.9, Extended European Search Report dated Jul. 6, 2015", 6 pgs.
"European Application Serial No. 12827918.9, Response filed Sep. 28, 2015 to Extended European Search Report dated Jul. 6, 2015", 8 pgs.
"European Application Serial No. 13830357.3, Extended European Search Report dated Jun. 8, 2016", 5 pgs.
"European Application Serial No. 13830357.3, Response filed Dec. 23, 2016 to Extended European Search Report dated Jun. 8, 2016", 11 pgs.
"European Application Serial No. 13830940.6, Extended European Search Report dated Jul. 4, 2016", 5 pgs.
"European Application Serial No. 13830940.6, Response filed Jan. 16, 2017 to Communication Pursuant to Rules 70(2) and 70a(2) EPC dated Jul. 21, 2016", 1 pg.
"European Application Serial No. 14764192.2, Extended European Search Report dated Oct. 27, 2016", 7 pgs.
"European Application Serial No. 14764192.2, Response filed Jan. 30, 2017 to Extended European Search Report dated Oct. 27, 2016", 19 pgs.
"European Application Serial No. 14764192.2, Response filed Apr. 13, 2016 to Communication Pursuant Rules 161(2) and 162 EPC dated Nov. 19, 2015", 9 pgs.
"European Application Serial No. 14764305.0, Extended European Search Report dated Apr. 4, 2017", 8 pgs.
"European Application Serial No. 14764318.3, Extended European Search Report dated Mar. 15, 2017", 10 pgs.
"European Application Serial No. 14764318.3, Response filed Jan. 28, 2016 to Communication pursuant to Rules 161(1) and 162 EPC dated Nov. 19, 2015", 17 pgs.
"European Application Serial No. 14764713.5, Extended European Search Report dated Dec. 9, 2016", 6 pgs.
"European Application Serial No. 14764713.5, Response filed Jan. 28, 2016 to Communication pursuant to Rules 161(1) and 162 EPC dated Dec. 2, 2015", 9 pgs.
"European Application Serial No. 14765396.8, Extended European Search Report dated Oct. 28, 2016", 6 pgs.
"European Application Serial No. 14765396.8, Office Action dated Nov. 20, 2015", 2 pgs.
"European Application Serial No. 14765396.8, Response filed Jan. 29, 2016 to Office Action dated Nov. 20, 2015", 12 pgs.
"International Application Serial No. PCT/CA2012/000055, International Preliminary Report on Patentability dated Aug. 1, 2013", 9 pgs.
"International Application Serial No. PCT/CA2012/000055, International Search Report dated May 24, 2012", 4 pgs.
"International Application Serial No. PCT/CA2012/000055, Invitation to Pay Add'l Fees and Partial Search Report dated Mar. 23, 2012", 2 pgs.
"International Application Serial No. PCT/CA2012/000055, Written Opinion dated May 24, 2012", 7 pgs.
"International Application Serial No. PCT/CA2012/000749, International Search Report dated Oct. 26, 2012", 3 pgs.
"International Application Serial No. PCT/CA2012/000749, Written Opinion dated Oct. 26, 2012", 5 pgs.
"International Application Serial No. PCT/CA2013/000608, International Preliminary Report on Patentability dated Mar. 5, 2015", 7 pgs.
"International Application Serial No. PCT/CA2013/000608, International Search Report dated Sep. 23, 2013", 3 pgs.
"International Application Serial No. PCT/CA2013/000608, Written Opinion dated Sep. 23, 2013", 5 pgs.
"International Application Serial No. PCT/CA2013/000609, International Preliminary Report on Patentability dated Mar. 5, 2015", 7 pgs.
"International Application Serial No. PCT/CA2013/000609, International Search Report dated Sep. 17, 2013", 3 pgs.
"International Application Serial No. PCT/CA2013/000609, Written Opinion dated Sep. 17, 2013", 5 pgs.
"International Application Serial No. PCT/CA2013/000964, International Search Report dated Feb. 7, 2014", 3 pgs.
"International Application Serial No. PCT/CA2013/000964, Written Opinion dated Feb. 7, 2014", 6 pgs.
"International Application Serial No. PCT/CA2014/000048, International Preliminary Report on Patentability dated Sep. 24, 2015", 8 pgs.
"international Application Serial No. PCT/CA2014/000048, International Search Report dated Apr. 29, 2014", 3 pgs.
"International Application Serial No. PCT/CA2014/000048, Written Opinion dated Apr. 29, 2014", 6 pgs.
"International Application Serial No. PCT/CA2014/000148, International Preliminary Report on Patentability dated Sep. 24, 2015", 5 pgs.
"International Application Serial No. PCT/CA2014/000148, International Search Report dated May 9, 2014", 4 pgs.
"International Application Serial No. PCT/CA2014/000148, Written Opinion dated May 9, 2014", 3 pgs.
"International Application Serial No. PCT/CA2014/000169, International Preliminary Report on Patentability dated Sep. 24, 2015", 8 pgs.
"International Application Serial No. PCT/CA2014/000169, International Search Report dated May 27, 2014", 3 pgs.
"International Application Serial No. PCT/CA2014/000169, Written Opinion dated May 27, 2014", 6 pgs.
"International Application Serial No. PCT/CA2014/000171, International Preliminary Report on Patentability dated Sep. 24, 2015", 7 pgs.
"International Application Serial No. PCT/CA2014/000171, International Search Report dated May 27, 2014", 3 pgs.
"International Application Serial No. PCT/CA2014/000171, Written Opinion dated May 27, 2014", 5 pgs.
"International Application Serial No. PCT/CA2015/050787, International Search Report dated Nov. 4, 2015", 3 pgs.
"International Application Serial No. PCT/CA20151050787, Written Opinion dated Nov. 4, 2015", 3 pgs.
"International Application Serial No. PCT/CA2016/050252, International Search Report dated May 26, 2016", 3 pgs.
"International Application Serial No. PCT/CA2016/050252, Written Opinion dated May 26, 2016", 4 pgs.
"International Application Serial No. PCT/CA2016/050507, International Search Report dated Jul. 21, 2016", 3 pgs.
"International Application Serial No. PCT/CA2016/050507, Written Opinion dated Jul. 21, 2016", 3 pgs.
"International Application Serial No. PCT/IB2011/002145, International Preliminary Report on Patentability dated Jan. 10, 2013", 13 pgs.
"International Application Serial No. PCT/IB2011/002145, International Search Report dated Feb. 15, 2012", 7 pgs.
"International Application Serial No. PCT/IB2011/002145, Written Opinion dated Feb. 15, 2012", 11 pgs.
"International Application Serial No. PCT/IB2016/053799, International Search Report dated Aug. 26, 2016", 3 pgs.
"International Application Serial No. PCT/IB2016/053799, Written Opinion dated Aug. 26, 2016", 6 pgs.
"International Application Serial No. PCT/US00/02956, International Preliminary Report on Patentability dated Jul. 9, 2001", 3 pgs.
"International Application Serial No. PCT/US00/02956, International Search Report dated Nov. 8, 2000", 1 pg.
"Plane plate membrane contactor prototypes", University of Genoa, (Published prior to Mar. 28, 2013), 1 pg.
Abdel-Salam, Mohamed R. H., et al., "Experimental Study of Effects of Phase-Change Energy and Operating Parameters on Performances of Two-Fluid and Three-Fluid Liquid-to-Air Membrane Energy Exchangers", Ashrae Transactions, vol. 122, Part 1, (Jan. 2016), 134-145.

(56) References Cited

OTHER PUBLICATIONS

Abdel-Salam, Mohamed R. H., et al., "Performance testing of 2-fluid and 3-fluid liquid-to-air membrane energy exchangers for HVAC applications in cold-dry climates", International Journal of Heat and Mass Transfer, 106, (2017), 558-569.
Abdel-Salam, Mohamed R. H., et al., "Performance testing of a novel 3-fluid liquid-to-air membrane energy exchanger (3-fluid LAMEE) under desiccant solution regeneration operating conditions", International Journal of Heat and Mass Transfer, 95 (2015), 773-786.
Bergero, Stefano, et al., "On the performances of a hybrid air-conditioning system in different climatic conditions", Energy 36(8), (2011), 5261-5273.
Erb, Blake, et al., "Experimental Measurements of a Run-Around Membrane Energy Exchanger (RAMEE) with Comparison to a Numerical Model", Ashrae Transactions, (2009), 689-705.
Karniadakis, George E., et al., "Mimimum-dissipation transport enhancement by flow destabilization: Reynolds' analogy revisited", J. Fluid Mech vol. 192, (1988), 365-391.
Larson, Michael David, et al., "The Performance of Membranes in a Newly Proposed Run-Around Heat and Mositure Exchanger", Thesis Submitted to the College of Graduate Studies and Research in Partial Fulfillment of the Requirements for the Degree of Master of Science in the Department of Mechanical Engineering UniversitY of Saskatchewan Saskatoon Canada, http/ /lib ran. usask.ca/theses/available/etd-12192006-094159/umestricted/Larson Thesis.pdf, (Dec. 2006), 177 pgs.
Lepoudre, P., et al., "Channel Flow with Sinusoidal Screen Insert", Dept. of Mech Engineering, Univ. of Saskatchewan, Proceedings of the 19th Annual Conference of the CFD Society of Canada, Montreal, Apr. 28-29, 2011, (2011), 6 pgs.
Mahmud, Khizir, "Design and Performance Testing of Counter-Cross-Flow Run-Around Membrane Energy Exchanger System", Master Thesis Submitted to the College of Graduate Studies and Research in Partial Fulfillment of the Requirements for the Degree of Master of Science in the Department of Mechanical Engineering University of Saskatchewan Saskatoon Canada, http I /libran •. usask. ca/theses/ available/ etd-09092009-223 83 3/umestricted/ Khizir_Mahmud 2009-Sep-28a. pdf, (Sep. 2009), 176 pgs.
Mahmud, Khizir, et al., "Performance testing of a counter-cross-flow run-around membrane energy exchanger (RAMEE) system for HVAC applications", Energy and Buildings, 42, (2010), 1140-1146.
Ryan, K., et al., "Three-dimensional transition in the wake of bluff elongated cylinders", J. Fluid, Mech, vol. 538, (2005), 1-29.
Sorin, Ain A., et al., "Optimization of Flow Design in Forced Flow Electrochemical Systems, with Special Application to Electrodialysis", Ind. Eng. Chem, Process Des. Develop vol. 13. No. 3, (1974), 241-248.
Vali, Alireza, et al., "Numerical model and effectiveness correlations for a run-around heat recovery system with combined counter and cross flow exchangers", International Journal of Heat and Mass Transfer 52, (2009), 5827-5840 pgs.
Vali, Alireza, "Modeling a Run-Around Heat and Moisture Exchanger Using Two Counter/Cross Flow Exchangers", Master Thesis Submitted to the College of Graduate Studies in the Department of Mechanical Engineering University of Saskatchewan Saskatoon Canada, http:/ /library. usask.ca/theses/m ailable/etd-060 3 2009-15-J.6-J.-1./unrestricted/Vali.Alireza Thesis. pdf, (2009), 193 pgs.
"U.S. Appl. No. 13/449,598, Notice of Allowance dated Jul. 6, 2017", 7 pgs.
"U.S. Appl. No. 13/797,152, Notice of Allowance dated Jun. 27, 2017", 8 pgs.
"U.S. Appl. No. 14/187,413, Final Office Action dated Jun. 27, 2017", 16 pgs.
"U.S. Appl. No. 14/187,413, Response filed Jun. 8, 2017 to Non Final Office Action dated Feb. 8, 2017", 15 pgs.
"U.S. Appl. No. 14/190,715, Non Final Office Action dated Aug. 10, 2017", 9 pgs.
"U.S. Appl. No. 14/190,715, Response filed Jul. 12, 2017 to Restriction Requirement dated Apr. 12, 2017", 7 pgs.
"U.S. Appl. No. 14/192,019, Non Final Office Action dated May 19, 2017", 15 pgs.
"U.S. Appl. No. 14/192,019, Response filed Aug. 21, 2017 to Non Final Office Action dated May 19, 2017", 13 pgs.
"U.S. Appl. No. 14/804,953, Notice of Allowance dated May 9, 2017", 7 pgs.
"U.S. Appl. No. 14/804,953, Notice of Allowance dated Sep. 7, 2017", 7 pgs.
"U.S. Appl. No. 14/957,795, Response filed Aug. 3, 2017 to Non Final Office Action dated Apr. 3, 2017", 17 pgs.
"Australian Application Serial No. 2013305428, Office Action dated May 30, 2017", 5 pgs.
"Australian Application Serial No. 2014231672, First Examiners Report dated Jul. 14, 2017", 4 pgs.
"Australian Application Serial No. 2014231681, First Examiners Report dated Jul. 12, 2017", 4 pgs.
"Canadian Application Serial No. 2,901,483, Office Action dated Jul. 19, 2017", 3 pgs. -.
"Canadian Application Serial No. 2,901,483, Response filed May 23, 2017 to Office Action dated Nov. 23, 2016", 40 pgs.
"Chinese Application Serial No. 201380042926.0, Office Action dated May 11, 2017", W/English Translation, 13 pgs.
"Chinese Application Serial No. 201380044484.3, Office Action dated Jul. 31, 2017", With English Translation, 21 pgs.
"Chinese Application Serial No. 201480014783.7, Office Action dated Jun. 30, 2017", (English Translation), 19 pgs.
"Chinese Application Serial No. 201480015355.6, Response filed Jun. 13, 2017 to Office Action dated Nov. 28, 2016", (w/ English Translation of Claims), 36 pgs.
"Chinese Application Serial No. 201480015422.4, Response filed May 12, 2017 to Office Action dated Nov. 1, 2016", w/ claims in English, 47 pgs.
"Chinese Application Serial No. 201480016150.X, Office Action dated Jun. 19, 2017", (w/ English Translation), 22 pgs.
"European Application Serial No. 14764713.5, Response filed Jul. 13, 2017 to Extended European Search Report dated Dec. 9, 2016", 9 pgs.
"European Application Serial No. 14765396.8, Response filed May 25, 2017 to Extended European Search Report dated Oct. 28, 2016", 5 pgs.
"International Application Serial No. PCT/CA2017/050180, International Search Report dated Apr. 26, 2017", 3 pgs.
"International Application Serial No. PCT/CA2017/050180, Written Opinion dated Apr. 26, 2017", 4 pgs.
"U.S. Appl. No. 13/797,062, Appeal Decision dated Nov. 22, 2017", 15 pgs.
"U.S. Appl. No. 14/187,413, Non Final Office Action dated Dec. 18, 2017", 20 pgs.
"U.S. Appl. No. 14/187,413, Response filed Nov. 27, 2017 to Final Office Action dated Jun. 27, 2017", 14 pgs.
"U.S. Appl. No. 14/190,715, Response filed Nov. 9, 2017 to Non Final Office Action dated Aug. 10, 2017", 10 pgs.
"U.S. Appl. No. 14/192,019, Final Office Action dated Nov. 28, 2017", 16 pgs.
"U.S. Appl. No. 14/830,492, Restriction Requirement dated Dec. 15, 2017", 6 pgs.
"U.S. Appl. No. 14/957,795, Final Office Action dated Nov. 6, 2017", 17 pgs.
"U.S. Appl. No. 15/590,685, Non Final Office Action dated Oct. 6, 2017", 11 pgs.
"Australian Application Serial No. 2013305427, Response filed Oct. 10, 2017 to Examination Report dated Mar. 3, 2017", 30 pgs.
"Australian Application Serial No. 2014231672, Response filed Oct. 9, 2017 to First Examiners Report dated Jul. 14, 2017", 24 pgs.
"Australian Application Serial No. 2014231680, First Examiners Report dated Aug. 4, 2017", 4 pgs.
"Australian Application Serial No. 2014231681, Response filed Sep. 15, 2017 to First Examiners Report dated Jul. 12, 2017", 9 pgs.
"Australian Application Serial No. 2014231681, Subsequent Examiners Report dated Nov. 26, 2017", 4 pgs.
"Canadian Application Serial No. 2,801,352, Office Action dated Jul. 4, 2017", 3 pgs.

(56) References Cited

OTHER PUBLICATIONS

"Chinese Application Serial No. 201380042926.0, Response filed Sep. 26, 2017 to Office Action dated May 11, 2017", claims not amended in response, current pending claims included in attachment, 13 pgs.

"Chinese Application Serial No. 201380044484.3, Response filed Oct. 12, 2017 to Office Action dated Jul. 31, 2017", w/ claims in English, 54 pgs.

"Chinese Application Serial No. 201480014783.7, Response filed Nov. 10, 2017 to Office Action dated Jun. 30, 2017", w/ claims in English, 48 pgs.

"Chinese Application Serial No. 201480015355.6, Office Action dated Oct. 13, 2017", w/ English translation, 13 pgs.

"Chinese Application Serial No. 201480016150.X, Response filed Nov. 2, 2017 to Office Action dated Jun. 19, 2017", w/ claims in English, 82 pgs.

"European Application Serial No. 14764305.0, Response filed Oct. 31, 2017 to Extended European Search Report dated Apr. 4, 2017", 7 pgs.

"European Application No. 14764318.3, Response filed Oct. 10, 2017 to Extended European Search Report dated Mar. 15, 2017", 11 pgs.

"European Application Serial No. 15834201.4, Response dated Oct. 9, 2017 to Communication Pursuant to Rules 161(2) and 162 EPC dated Mar. 29, 2017", 15 pgs.

"International Application Serial No. PCT/CA2016/050252, International Preliminary Report on Patentability dated Nov. 30, 2017", 6 pgs.

"International Application Serial No. PCT/CA2016/050507, International Preliminary Report on Patentability dated Nov. 30, 2017", 5 pgs.

Mahmud, Khizir, et al., "Performance testing of a counter-cross-flow run-around membrane energy exchanger (RAMEE) system for HVAC applications", Energy and Buildings 42, (2010), 1139-1147.

"U.S. Appl. No. 13/797,062, Amendment and Response Under 37 C.F.R. 1.116 filed Jan. 22, 2018 to Final Office Action dated Feb. 24, 2016", 11 pgs.

"U.S. Appl. No. 13/797,062, Non Final Office Action dated Feb. 21, 2018", 21 pgs.

"U.S. Appl. No. 14/190,715, Final Office Action dated Feb. 20, 2018", 9 pgs.

"U.S. Appl. No. 14/804,953, Corrected Notice of Allowance dated Jan. 25, 2018", 4 pgs.

"U.S. Appl. No. 14/830,492, Non-Final Action dated Mar. 15, 2018", 9 pgs.

"U.S. Appl. No. 14/830,492, Response filed Feb. 15, 2018 to Restriction Requirement dated Dec. 15, 2017", 7 pgs.

"U.S. Appl. No. 14/957,795, Response filed Apr. 3, 2018 to Final Office Action dated Nov. 6, 2017", 11 pgs.

"U.S. Appl. No. 15/185,155, Non Final Office Action dated Apr. 10, 2018", 13 pgs.

"U.S. Appl. No. 15/590,685, Response filed Feb. 20, 2018 to Non Final Office Action dated Oct. 6, 2017", 7 pgs.

"Australian Application Serial No. 2014231667, First Examination Report dated Apr. 5, 2018", 4 pgs.

"Australian Application No. 2014231668, First Examination Report dated Dec. 6, 2017", 6 pgs.

"Australian Application Serial No. 2014231668, Response filed Apr. 14, 2018 to First Examination Report dated Dec. 6, 2017", 31 pgs.

"Australian Application Serial No. 2014231668, Subsequent Examiners Report dated Apr. 5, 2018", 3 pgs.

"Australian Application Serial No. 2014231681, Response filed Jan. 30, 2018 to Subsequent Examiners Report dated Sep. 26, 2017", 15 pgs.

"Australian Application Serial No. 2014231681, Subsequent Examiners Report dated Mar. 13, 2018", 4 pgs.

"Australian Application Serial No. 2015230799, Response filed Feb. 16, 2018 to First Examiner Report dated Mar. 27, 2017", 24 pgs.

"Canadian Application Serial No. 2,801,352, Response filed Dec. 18, 2017 to Office Action dated Jul. 4, 2017", 8 pgs.

"Canadian Application Serial No. 2,901,483, Response filed Jan. 16, 2018 to Office Action dated Jul. 19, 2017", 28 pgs.

"Chinese Application Serial No. 201380042926.0, Decision of Rejection dated Nov. 5, 2018", w. English Claims, 11 pgs.

"Chinese Application Serial No. 201480015355.6, Response filed Feb. 28, 2018 to Office Action dated Oct. 13, 2017", w/ claims in English, 36 pgs.

"European Application Serial No. 15834201.4, Extended European Search Report dated Mar. 16, 2018", 8 pgs.

"International Application Serial No. PCT/IB2016/053799, International Preliminary Report on Patentability dated Jan. 4, 2018", 8 pgs.

"Chinese Application Serial No. 201380044484.3, Examiner Interview Summary dated Jan. 3, 2018", 1 pg.

"Chinese Application Serial No. 201380044484.3, Response filed Jan. 3, 2018 to Examiner Interview Summary dated Jan. 3, 2018", w English claims, 53 pgs.

"Australian Application Serial No. 2014231681, Response filed Apr. 26, 2018 to Subsequent Examiners Report dated Mar. 13, 2018", 3 pgs.

"U.S. Appl. No. 14/192,019, Non Final Office Action dated May 11, 2018", 16 pgs.

"U.S. Appl. No. 14/192,019, Response filed Apr. 27, 2018 to Final Office Action dated Nov. 28, 2017", 11 pgs.

"U.S. Appl. No. 14/957,795, Notice of Allowance dated Apr. 27, 2018", 8 pgs.

"Chinese Application Serial No. 201480014783.7, Office Action dated Mar. 26, 2018", W English Translation, 16 pgs.

"Chinese Application Serial No. 201380042926.0, Request for Reexamination filed Apr. 20, 2018 to Decision of Rejection dated Jan. 5, 2018", w English claims, 52 pgs.

"Australian Application Serial No. 2013305428, Response filed May 15, 2018 to Office Action dated May 30, 2017", 23 pgs.

"Chinese Application Serial No. 201480014783.7, Response filed Jun. 11, 2018 to Office Action dated Mar. 26, 2018", w/ English claims, 18 pgs.

"Chinese Application Serial No. 201480015355.6, Office Action dated Jun. 14, 2018", w/ English summary, 8 pgs.

"European Application Serial No. 18153408.2, Communication Pursuant to Rule 55 EPC dated May 17, 2018", 2 pgs.

"U.S. Appl. No. 13/797,062, Response filed May 21, 2018 to Non Final Office Action dated Feb. 21, 2018", 12 pgs.

"U.S. Appl. No. 14/957,795, Corrected Notice of Allowance dated May 16, 2018", 4 pgs.

"U.S. Appl. No. 15/185,180, Restriction Requirement dated Jun. 21, 2018", 10 pgs.

"U.S. Appl. No. 15/590,685, Final Office Action dated Jun. 7, 2018", 12 pgs.

"U.S. Appl. No. 13/797,062, Response filed Dec. 13, 2018 to Final Office Action dated Jul. 13, 2018", 12 pgs.

"U.S. Appl. No. 14/187,413, Amendment and Response filed Nov. 30, 2018 to Final Office Action dated Jul. 26, 18", 19 pgs.

"U.S. Appl. No. 14/190,715, Examiner Interview Summary dated Oct. 31, 2018", 3 pgs.

"U.S. Appl. No. 14/192,019, Response filed Sep. 11, 2018 to Non Final Office Action dated May 11, 2018", 12 pgs.

"U.S. Appl. No. 14/830,492, Response filed Aug. 15, 2018 to Non Final Office Action dated Mar. 15, 2018", 12 pgs.

"U.S. Appl. No. 14/957,795, Notice of Allowance dated Sep. 11, 2018", 9 pgs.

"U.S. Appl. No. 15/185,155, Final Office Action dated Dec. 5, 2018", 11 pgs.

"U.S. Appl. No. 15/185,180, Response filed Nov. 19, 2018 to Restriction Requirement dated Jun. 21, 2018", 9 pgs.

"U.S. Appl. No. 15/574,201, Restriction Requirement dated Sep. 5, 2018", 6 pgs.

"U.S. Appl. No. 15/574,205, Non Final Office Action dated Sep. 11, 2018", 6 pgs.

"U.S. Appl. No. 15/590,685, Advisory Action dated Dec. 12, 2018", 3 pgs.

(56) References Cited

OTHER PUBLICATIONS

"U.S. Appl. No. 15/590,685, Response filed Nov. 30, 2018 to Final Office Action dated Jun. 7, 2018", 10 pgs.
"U.S. Appl. No. 15/739,016, Restriction Requirement dated Nov. 26, 2018", 5 pgs.
"Australian Application Serial No. 2014231667, Subsequent Examiners Report dated Aug. 29, 2018", 4 pgs.
"Australian Application Serial No. 2017204552, First Examination Report dated Oct. 9, 2018", 3 pgs.
"Chinese Application Serial No. 201380042926.0, Notice of Reexamination dated Aug. 23, 2018", w/ English Machine Translation, 18 pgs.
"European Application Serial No. 11797695.1, Communication Pursuant to Article 94(3) EPC dated Aug. 24, 2018", 5 pgs.
"European Application Serial No. 14765396.8, Communication Pursuant to Article 94(3) EPC dated Dec. 5, 2018", 4 pgs.
"European Application Serial No. 15834201.4, Response filed Oct. 15, 2018 to Extended European Search Report dated Mar. 16, 2018", 17 pgs.
"European Application Serial No. 16795582.2, Extended European Search Report dated Nov. 20, 2018", 8 pgs.
"European Application Serial No. 18153408.2, Extended European Search Report dated Dec. 4, 2018", 5 pgs.
"International Application Serial No. PCT/CA2017/050180, International Preliminary Report on Patentability dated Sep. 20, 2018", 6 pgs.
"U.S. Appl. No. 14/190,715, Response filed Jul. 20, 2018 to Final Office Action dated Feb. 20, 2018", 14 pgs.
"U.S. Appl. No. 13/797,062, Final Office Action dated Jul. 13, 2018", 22 pgs.
"U.S. Appl. No. 14/187,413, Final Office Action dated Jul. 26, 2018", 16 pgs.
"U.S. Appl. No. 14/190,715, Advisory Action dated Aug. 16, 2018", 6 pgs.
"U.S. Appl. No. 15/185,155, Response filed Aug. 6, 2018 to Non Final Office Action dated Apr. 10, 2018", 10 pgs.
"Australian Application Serial No. 2014231667, Response filed Jul. 20, 2018 to First Examination Report dated Apr. 5, 2018", 19 pgs.
"Canadian Application Serial No. 2,801,352, Office Action dated Aug. 2, 2018", 3 pgs.
"European Application No. 16795581.4, Response filed Aug. 6, 2018 to Communication Pursuant to Rules 161(2) and 162 EPC dated Jan. 26, 2018", 16 pgs.
"European Application Serial No. 16795582.2, Response filed Jul. 17, 2018 to Communication Pursuant to Rules 161(2) and 162 EPC dated Jan. 8, 2018", 12 pgs.
"European Application Serial No. 16813836.0, Partial Supplementary European Search Report dated Dec. 5, 2018", 11 pgs.
"Chinese Application Serial No. 201480015355.6, Response filed Dec. 4, 2018 to Office Action dated Jun. 14, 2018", w English claims, 16 pgs.
"U.S. Appl. No. 14/187,413, Advisory Action dated Dec. 17, 2018", 5 pgs.
"European Application Serial No. 14764713.5, Communication pursuant to Article 94(3) EPC dated Dec. 18, 2018", 3 pgs.
"Chinese Application Serial No. 201380042926.0, Response filed Dec. 7, 2018 to Notice of Reexamination dated Aug. 23, 2018", w English Translation, 15 pgs.
"U.S. Appl. No. 14/830,492, Final Office Action dated Dec. 28, 2018", 9 pgs.
"U.S. Appl. No. 13/797,062, Non Final Office Action dated Dec. 28, 2018", 50 pgs.
Larson, Michael D., "The elastic and moisture transfer properties of polyethylene and polypropylene membranes for use in liquid-to-air energy exchangers", Journal of Membrane Science 302, (2007), 14 pgs.
"U.S. Appl. No. 15/185,155, Corrected Notice of Allowability dated May 15, 2019", 2 pgs.
"U.S. Appl. No. 15/185,155, Corrected Notice of Allowability dated May 22, 2019", 2 pgs.

"U.S. Appl. No. 15/185,180, Response filed May 1, 2019 to Non Final Office Action dated Jan. 8, 2019", 11 pgs.
"U.S. Appl. No. 15/590,685, Response filed Apr. 18, 2019 to NonFinal Office Action dated Jan. 11, 2019", 11 pgs.
"Australian Application Serial No. 2014231667, Response filed Jan. 15, 2019 to Subsequent Examiners Report dated Aug. 29, 2018", 12 pgs.
"Canadian Application Serial No. 2,880,350, Examiner's Rule 30(2) Requisition dated May 1, 2019", 4 pgs.
"Canadian Application Serial No. 2,880,353, Office Action dated Apr. 29, 2019", 4 pgs.
"Chinese Application Serial No. 201380042926.0, Decision of Reexamination—Upholding Decision of Rejection dated Mar. 15, 2019", w/ English translation, 18 pgs.
"Chinese Application Serial No. 201480015355.6, Decision of Rejection dated Mar. 18, 2019", w/ English Summary, 7 pgs.
"Chinese Application Serial No. 201680048895.3, Office Action dated Apr. 17, 2019", W/ English Translation, 33 pgs.
"Chinese Application Serial No. 201710708143.1, Response filed Apr. 29, 2019 to Office Action dated Dec. 29, 2018", w/ English claims, 10 pgs.
"European Application Serial No. 14765396.8, Response filed May 23, 2019 to Communication Pursuant to Article 94(3) EPC dated Dec. 5, 2018", 16 pgs.
"European Application Serial No, 16813836.0, Extended European Search Report dated Mar. 25, 2019", 9 pgs.
"European Application Serial No. 17762365.9, Response filed Apr. 25, 2019 to Communication Pursuant to Rules 161 and 162 dated Oct. 16, 2018", 12 pgs.
"European Application Serial No. 18211142.7, Extended European Search Report dated Apr. 11, 2019", 6 pgs.
"European Application Serial No. 18214518.5, Extended European Search Report dated Apr. 17, 2019", 5 pgs.
"U.S. Appl. No. 14/190,715, Notice of Allowance dated Mar. 4, 2019", 7 pgs.
"U.S. Appl. No. 14/192,019, Final Office Action dated Jan. 10, 2019", 16 pgs.
"U.S. Appl. No. 14/957,795, Corrected Notice of Allowability dated Feb. 1, 2019", 4 pgs.
"U.S. Appl. No. 14/957,795, Notice of Allowance dated Jan. 17, 2019", 7 pgs.
"U.S. Appl. No. 15/185,155, Examiner Interview Summary dated Feb. 21, 2019", 3 pgs.
"U.S. Appl. No. 15/185,155, Notice of Allowance dated Mar. 25, 2019", 7 pgs.
"U.S. Appl. No. 15/185,155, Response filed Mar. 5, 2019 to Final Office Action dated Dec. 5, 2018", 9 pgs.
"U.S. Appl. No. 15/185,180, Non Final Office Action dated Jan. 8, 2019", 14 pgs.
"U.S. Appl. No. 15/590,685, Non Final Office Action dated Jan. 11, 2019", 13 pgs.
"U.S. Appl. No. 15/739,016, Non Final Office Action dated Feb. 13, 2019", 6 pgs.
"U.S. Appl. No. 15/739,016, Response filed Jan. 28, 2019 to Restriction Requirement dated Nov. 26, 2018", 8 pgs.
"Canadian Application Serial No. 2,801,352, Response filed Jan. 29, 2019 to Office Action dated Aug. 2, 2018", 12 pgs.
"Chinese Application Serial No. 201710708143.1, Office Action dated Dec. 29, 2018", w/ English translation, 9 pgs.
"European Application Serial No. 11797695.1, Response filed Jan. 9, 2019 to Communication Pursuant to Article 94(3) EPC dated Aug. 24, 2018", 11 pgs.
"European Application Serial No. 14764305.0, Communication Pursuant to Article 94(3) EPC Feb. 14, 2019", 4 pgs.
"European Application Serial No. 16795581.4, Extended European Search Report dated Feb. 12, 2019", 9 pgs.
"European Application Serial No. 18160812.6, Extended European Search Report dated Feb. 11, 2019", 6 pgs.
"Singapore Application Serial No. 11201710777Y, Office Action dated Jan. 31, 2019", in English, 7 pgs.
"Singaporean Application Serial No. 11201709404P, Written Opinion dated Feb. 22, 2019", in English, 8 pgs.

(56) References Cited

OTHER PUBLICATIONS

"U.S. Appl. No. 14/192,019, Response filed Jun. 10, 2019 to Final Office Action dated Jan. 20, 2019", 10 pgs.
"Chinese Application Serial No. 201710339973.1, Office Action dated Apr. 26, 2019", w/ English Translation, 9 pgs.
"U.S. Appl. No. 14/192,019, Non Final Office Action dated Jun. 25, 2019", 13 pgs.
"U.S. Appl. No. 15/590,685, Final Office Action dated Jun. 26, 2019", 14 pgs.
"European Application Serial No. 16795582.2, Response filed Jun. 17, 2019 to Extended European Search Report dated Nov. 20, 2018", 16 pgs.
"Australian Application Serial No. 2018202342, First Examination Report dated Jun. 17, 2019", 5 pgs.
"U.S. Appl. No. 14/830,492, Response filed Jun. 29, 2019 to Final Office Action dated Dec. 28, 2018", 6 pgs.
"U.S. Appl. No. 13/797,062, Respnose filed Jun. 28, 2019 to Non Final Office Action dated Jun. 28, 2019", 12 pgs.
"European Application Serial No. 14764305.0, Response filed Jun. 21, 2019 to Communication Pursuant to Article 94(3)EPC Feb. 14, 2019", 24 pgs.
"Chinese Application Serial No. 201680038134.X, Office Action dated Jul. 8, 2019", w/ English Translation, 30 pgs.
"Singapore Application Serial No. 11201710777Y, Response filed Jul. 1, 2019 to Office Action dated Jan. 31, 2019", in English, 31 pgs.
"European Application Serial No. 14764713.5, Response filed Jun. 28, 2019 to Communication pursuant to Article 94(3) EPC dated Dec. 18, 2018", 8 pgs.
"European Application Serial No. 18153408.2, Response filed Jul. 2, 2019 to Extended European Search Report dated Dec. 4, 2018", 12 pgs.
"U.S. Appl. No. 15/185,155, Notice of Allowance dated Jul. 17, 2019", 8 pgs.
"Chinese Application Serial No. 201710339973.1, Response filed Jul. 3, 2019 to Office Action dated Apr. 26, 2019", w/ English Claims, 14 pgs.
"U.S. Appl. No. 13/797,062, Final Office Action dated Jul. 25, 2019", 50 pgs.
"European Application Serial No. 18214518.5, Response filed Jul. 16, 2019 to Extended European Search Report dated Apr. 17, 2019", 3 pgs.
"Australian Application Serial No. 2018204774, First Examination Report dated Jul. 18, 2019", 4 pgs.
"U.S. Appl. No. 15/185,180, Final Office Action dated Jul. 31, 2019", 15 pgs.
"U.S. Appl. No. 14/187,413, Non Final Office Action dated Jul. 31, 2019", 22 pgs.
"U.S. Appl. No. 15/739,016, Notice of Allowance dated Aug. 1, 2019", 6 pgs.
"Singaporean Application Serial No. 11201709404P, Response filed Jul. 22, 2019 to Written Opinion dated Feb. 22, 2019", in English, 62 pgs.
"U.S. Appl. No. 16/431,397, Supplemental Preliminary Amendment filed Aug. 2, 2019", 6 pgs.
"Australian Application Serial No. 2018226496, First Examination Report dated Jul. 25, 2019", 4 pgs.
"Australian Application Serial No. 2018202342, Response filed Aug. 1, 2019 to First Examination Report dated Jun. 17, 2019", 17 pgs.
"Australian Application Serial No. 2019201063, First Examination Report dated Aug. 6, 2019", 7 pgs.
"European Application Serial No. 18160812.6, Response filed Aug. 6, 2019 to Extended European Search Report dated Feb. 11, 2019", 23 pgs.
"European Application Serial No. 18211142.7, Response filed Aug. 8, 2019 to Extended European Search Report dated Apr. 11, 2019", 10 pgs.
"Australian Application Serial No. 2018202342, Subsequent Examiners Report dated Aug. 23, 2019", 4 pgs.
"Chinese Application Serial No. 201680038135.4, Office Action dated Aug. 26, 2019", w/ English Translation, 23 pgs.
"Chinese Application Serial No. 201710708143.1, Office Action dated Aug. 16, 2019", w/ English Translation, 10 pgs.
"U.S. Appl. No. 14/830,492, Notice of Allowance dated Sep. 24, 2019", 7 pgs.
"Chinese Application Serial No. 201580053421.3, Office Action dated Sep. 17, 2019", w/ English Translation, 31 pgs.
"European Application Serial No. 16795581.4, Response filed Sep. 11, 2019 to Extended European Search Report dated Feb. 12, 2019", 14 pgs.
"Canadian Application Serial No. 3,046,529, Office Action dated Sep. 18, 2019", 6 pgs.
"European Application Serial No. 17762365.9, Extended European Search Report dated Oct. 17, 2019", 8 pgs.
"European Application Serial No. 16813836.0, Response to Extended European Search Report dated Mar. 25, 2019", 11 pgs.

* cited by examiner

CONTROL SYSTEM AND METHOD FOR A LIQUID DESICCANT AIR DELIVERY SYSTEM

CROSS-REFERENCE TO RELATED APPLICATIONS

The present application relates to and claims priority benefits from U.S. Provisional Patent Application No. 61/793,826, entitled "Method and System for Maintaining Supply Air Conditions in an Energy Exchange System," filed Mar. 15, 2013, which is hereby expressly incorporated by reference in its entirety.

BACKGROUND OF THE DISCLOSURE

Embodiments of the present disclosure generally relate to air delivery systems, such as HVAC, air handling, heat pump, and energy exchange systems, and, more particularly, to control systems and methods for air delivery systems.

Enclosed structures, such as occupied buildings, factories and the like, generally include a heating/ventilation/air conditioning (HVAC) system for conditioning outdoor ventilated and/or recirculated air. The HVAC system typically includes a supply air flow path and an exhaust air flow path. The supply air flow path receives pre-conditioned air, for example outside air or outside air mixed with re-circulated air, or air from another source, and channels and distributes the pre-conditioned air into the enclosed structure. The pre-conditioned air is conditioned by the HVAC system to provide a desired temperature and humidity of supply air discharged into the enclosed structure. The exhaust air flow path discharges air back to the environment outside the structure. Without energy recovery, conditioning the supply air typically requires a significant amount of auxiliary energy, particularly in environments having extreme outside air conditions that are much different than the required supply air temperature and humidity. Accordingly, energy exchange or recovery systems are used to recover energy from the exhaust air flow path.

Conventional energy exchange systems may utilize energy recovery devices (for example, energy wheels and permeable plate exchangers) or heat exchange devices (for example, heat wheels, plate exchangers, heat-pipe exchangers and run-around heat exchangers) positioned in both the supply air flow path and the exhaust air flow path. Liquid-to-air membrane energy exchangers (LAMEEs) may be fluidly coupled so that a desiccant liquid flows between the LAMEEs in a run-around loop, similar to run-around heat exchangers that typically use aqueous glycol as a coupling fluid.

A liquid desiccant system is generally a direct contact system, in which the liquid desiccant removes moisture from the air it contacts. The temperature and humidity of the supply air that contacts the liquid desiccant may be modified by manipulating the temperature and concentration of the liquid desiccant. However, known desiccant-based HVAC energy exchange systems lack processes for conditioning the liquid desiccant to maintain supply air conditions.

SUMMARY OF THE DISCLOSURE

Certain embodiments of the present disclosure provide an air delivery system that may include a housing, a first liquid-to-air membrane energy exchanger (LAMEE), and a desiccant storage tank. The housing includes a supply air channel and a return or exhaust air channel. The supply air channel includes a supply or outdoor air inlet configured to allow outdoor air or other source air to pass into the supply air channel, and a supply air outlet configured to allow supply air to pass to an enclosed structure. The exhaust air channel includes an exhaust air inlet configured to allow exhaust air from the enclosed structure to pass into the exhaust air channel, and an exhaust air outlet configured to allow exhaust air to exhaust to an outside environment. The first LAMEE is configured to receive air, such as outside air, during a desiccant regeneration mode in order to regenerate desiccant within the first LAMEE. The desiccant storage tank is in fluid communication with the first LAMEE. The first LAMEE is configured to store regenerated desiccant within the desiccant storage tank. The regenerated desiccant is configured to be held in reserve and tapped during a normal operation mode. The first LAMEE may be configured to receive the outside air, or other source air, during an off-hour period when the air delivery system is not providing supply air to the enclosed structure. The first LAMEE may be an exhaust LAMEE disposed within the exhaust air channel. Alternatively, the first LAMEE may be a supply LAMEE disposed within the supply air channel. Also, alternatively, the first LAMEE may be a regeneration LAMEE disposed in purge air that is neither supply air, nor exhaust air. The housing may optionally include airflow control devices, such as dampers, to direct air from the supply air inlet or the exhaust air inlet to the first LAMEE, and/or from the first LAMEE to the supply air outlet or the exhaust air outlet.

The system may include a desiccant regeneration bypass damper positioned between the supply air channel and the exhaust air channel. The system may also include an outside or supply air inlet damper positioned within the outside or supply air inlet, a supply air outlet damper positioned within the supply air outlet, an exhaust air inlet damper positioned within the exhaust air inlet, and an exhaust air outlet damper positioned within the exhaust air outlet. During the normal operation mode, the outside or supply air inlet damper, the supply air outlet damper, the exhaust air outlet damper, and the exhaust air inlet damper are all open, and the desiccant regeneration bypass damper is closed.

In at least one embodiment, during the desiccant regeneration mode, the outside or supply air inlet damper, the exhaust air outlet damper, and the desiccant regeneration bypass damper are open while the supply air outlet damper and the exhaust air inlet damper are closed so that the outside air, or other source air, passes directly from the supply air channel to the exhaust air channel and into the exhaust LAMEE. The desiccant within the exhaust LAMEE is regenerated with the outside or other source air.

In at least one other embodiment, during the desiccant regeneration mode, the exhaust air outlet damper, and the exhaust air inlet damper are open while the outside air inlet damper, the supply air outlet damper and the desiccant regeneration bypass damper are closed so that the exhaust air from the enclosed structure passes to the exhaust air channel and into the exhaust LAMEE. The desiccant within the exhaust LAMEE is regenerated with the exhaust air.

In at least one other embodiment, during the desiccant regeneration mode, purge air that is neither supply air nor exhaust air, passes through a remotely located regeneration LAMEE. The desiccant within the remotely located regeneration LAMEE may be regenerated with the purge air.

The supply air channel and the exhaust air channel may be separated by a partition. The desiccant regeneration bypass damper may be disposed within the partition.

The system may also include a supply LAMEE disposed within the supply air channel. The supply LAMEE may be operatively connected to the exhaust LAMEE by a moisture transfer loop configured to circulate the desiccant between the supply LAMEE and the exhaust LAMEE.

The system may also include a regeneration LAMEE that may be disposed outside either the supply or exhaust air channels. The remote LAMEE may be operatively connected to any other LAMEE by a moisture transfer loop configured to circulate the desiccant between the remote LAMEE and the other LAMEE.

The system may also include a heat pump operatively connected to one or more of the supply, exhaust, and/or regeneration LAMEEs. The heat pump is configured to heat or cool the desiccant within the supply exhaust, and/or regeneration LAMEEs.

The system may also include one or more of a first heat exchanger within the supply air channel downstream of the supply LAMEE, a second heat exchanger within the exhaust air channel upstream from the exhaust LAMEE, and/or a third heat exchanger within a purge air stream that is upstream from a purge LAMEE. The heat pump may be operatively connected to one or more of the heat exchangers. Heated or cooled fluid from the heat pump may be used to condition refrigerant within the heat exchangers.

The system may also include a source of renewable or recyclable energy operatively connected to one or more of the heat exchangers. The source of renewable or recyclable energy is configured to condition a liquid within one or more of the heat exchangers.

The supply LAMEE may be fluidly connected to the desiccant storage tank with at least one conduit. At least one supply bypass damper may be positioned proximate to the supply LAMEE. The supply bypass damper(s) is configured to be moved between a closed position in which airflow is directed through the supply LAMEE and an open position in which the airflow is bypassed around the supply LAMEE.

The system may also include a water supply fluidly connected to any of the LAMEEs. The water supply is configured to provide water to the desiccant within the LAMEEs to one or both of dilute the desiccant or alter the temperature of the desiccant.

The system may also include an energy recovery device having a first portion disposed within the supply air channel upstream from the supply LAMEE, and a second portion disposed within the exhaust air channel upstream from the exhaust LAMEE. At least one bypass damper may be positioned proximate to at least the first or second portions of the energy recovery device. The bypass damper(s) is configured to be closed in order to prevent air from bypassing around the energy recovery device, and opened in order to allow at least a portion of the air to bypass around the energy recovery device. The energy recovery device may include an enthalpy wheel, for example.

The system may also include a heat pump operatively connected to the exhaust LAMEE. The heat pump may be configured to heat or cool the desiccant within the exhaust LAMEE.

The system may also include a control sub-system configured to control operation of the air delivery system. The control sub-system is configured to transition the air delivery system between the normal operation mode and the desiccant regeneration mode.

The system may also include at least one exhaust bypass damper positioned proximate to the exhaust LAMEE. The exhaust bypass damper(s) is configured to be moved between a closed position in which airflow is directed through the exhaust LAMEE and an open position in which the airflow is bypassed around the exhaust LAMEE.

The system may also include an exhaust air recirculating damper positioned between the supply air channel and the exhaust air channel. The exhaust air recirculating damper is configured to be opened to allow the exhaust air from the enclosed structure to recirculate into the supply air.

The system may also include a water supply fluidly connected to the exhaust LAMEE. The water supply is configured to provide water to the desiccant within the exhaust LAMEE to one or both of dilute the desiccant or alter the temperature of the desiccant.

Certain embodiments of the present disclosure provide a method of operating an air delivery system. The method may include receiving outside or purge air within a first LAMEE, such as an exhaust LAMEE, disposed within an exhaust air channel or within a purge air flow path during a desiccant regeneration mode, regenerating desiccant within the first LAMEE during the desiccant regeneration mode, storing regenerated desiccant within a desiccant storage tank that is fluidly connected to the first LAMEE, and tapping the regenerated desiccant during a normal operation mode. Optionally, the outside or purge air may be received within a supply LAMEE or another regeneration LAMEE.

Certain embodiments of the present disclosure provide an air delivery system that may include a housing, an exhaust LAMEE disposed within an exhaust air channel, a supply LAMEE disposed within a supply air channel, a heat pump, and one or both of a first heat exchanger within the supply air channel downstream of the supply LAMEE, or a second heat exchanger within the exhaust air channel upstream from the exhaust LAMEE. The supply LAMEE is operatively connected to the exhaust LAMEE by a moisture transfer loop configured to circulate the desiccant between the supply LAMEE and the exhaust LAMEE. The heat pump is operatively connected to one or both of the exhaust LAMEE and the supply LAMEE. The heat pump is configured to heat or cool the desiccant within one or both of the exhaust LAMEE and the supply LAMEE. The heat pump is also operatively connected to one or both of the first heat exchanger or the second heat exchanger. Gas or liquid from the heat pump is used to condition refrigerant within one or both of the first or second heat exchangers. Optionally, the system may also include a regeneration LAMEE disposed outside of the housing.

Certain embodiments of the present disclosure provide an air delivery system that may include a housing, an exhaust LAMEE disposed within an exhaust air channel, and a supply LAMEE disposed within a supply air channel. At least one exhaust bypass damper is positioned proximate to the exhaust LAMEE. The exhaust bypass damper(s) is configured to be moved between a closed position in which airflow is directed through the exhaust LAMEE, and an open position in which the airflow is bypassed around the exhaust LAMEE. At least one supply bypass damper is positioned proximate to the supply LAMEE. The supply bypass damper(s) is configured to be moved between a closed position in which airflow is directed through the supply LAMEE, and an open position in which the airflow is bypassed around the supply LAMEE.

Certain embodiments of the present disclosure provide an air delivery system that may include a housing, an exhaust LAMEE disposed within an exhaust air channel, and a supply LAMEE disposed within a supply air channel. An exhaust air recirculating damper may be positioned between the supply air channel and the exhaust air channel. The exhaust air recirculating damper is configured to be opened to allow the exhaust air from the enclosed structure to recirculate into the supply air.

Certain embodiments of the present disclosure provide an air delivery system that may include a housing, a first liquid-to-air-membrane energy exchanger (LAMEE) disposed within one of an exhaust air channel or a purge air stream outside of the housing, and a second LAMEE disposed within a supply air channel. The second LAMEE is operatively connected to the first LAMEE by a moisture transfer loop configured to circulate the desiccant between the second LAMEE and the first LAMEE. The system may also include a heat pump operatively connected to one or both of the first LAMEE and the second LAMEE. The heat pump is configured to heat or cool the desiccant within one or both of the first LAMEE and the second LAMEE. The system may also include one or both of a first heat exchanger within the supply air channel downstream of the second LAMEE, or a second heat exchanger within the exhaust air channel or the purge air stream upstream from the first LAMEE. The heat pump is operatively connected to one or both of the first heat exchanger or the second heat exchanger. Gas or liquid from the heat pump is used to condition refrigerant within one or both of the first or second heat exchangers.

In at least one embodiment, the first LAMEE is an exhaust LAMEE disposed within the exhaust air channel. In at least one embodiment, the first LAMEE is a regeneration LAMEE disposed within the purge air stream.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1A:
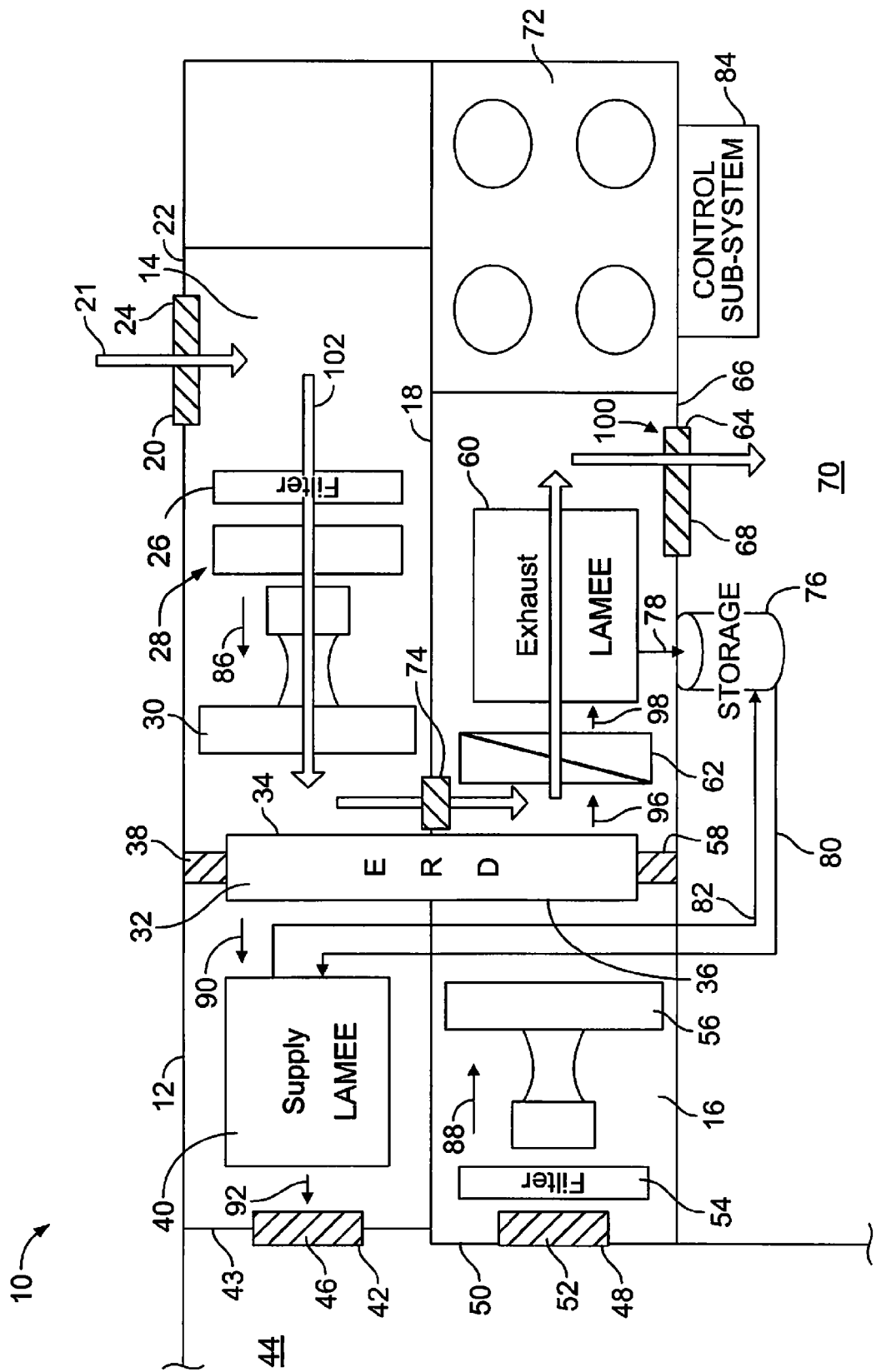
FIG. 1A illustrates a schematic of an air delivery system, according to an embodiment of the present disclosure.

FIG. 1A illustrates a schematic view of an air delivery system 10, according to an embodiment of the present disclosure. The air delivery system 10 includes a housing 12, such as a cabinet, which may include a supply air channel 14 separated from an exhaust air channel 16 by a partition 18. The supply air channel 14 and the exhaust air channel 16 may be conduits, plenums, and the like configured to channel air therethrough.

A supply or outdoor air inlet 20 is formed at a supply or outdoor air inlet end 22 of the supply air channel 14. A supply or outdoor air inlet damper 24 may be disposed within the outdoor air inlet 20 to selectively allow and prevent outdoor air 21 (or other source air) from passing into the supply air channel 14. For example, the outdoor air inlet damper 24 may be actuated between open and closed positions.

An air filter 26 may be disposed within the supply air channel 14 downstream from the outdoor air inlet 20. The air filter 26 is configured to filter contaminants and impurities from an air stream. Alternatively, the air delivery system 10 may not include the air filter 26.

A heat exchanger 28 may be disposed within the supply air channel 14 downstream from the air filter 26. The heat exchanger 28 may be any type of heating coil that is configured to heat an air stream. For example, the heat exchanger 28 may be an air-to-air heat exchanger configured to heat an air stream with heated air. Alternatively, the heat exchanger 28 may be a liquid-to-air heat exchanger that includes one or more liquid-circulating coils that surround an air passage. Heated liquid, such as liquid refrigerant or the like, may circulate around the air passage to heat air that passes therethrough. Alternatively, the heat exchanger 28 may use a renewable or recyclable source or energy, such as solar, geothermal, waste heat, or other sources of heat, to heat the air stream. Also, alternatively, the air delivery system 10 may not include the heat exchanger 28.

A supply air fan 30 may be disposed within the supply air channel 14 downstream from the heat exchanger 28 and upstream from an energy recovery device 32. The supply air fan 30 is configured to draw and move air through the supply air channel 14. While shown downstream from the heat exchanger 28, the supply air fan 30 may alternatively be disposed at various other areas within the supply air channel 14. For example, the supply air fan 30 may be disposed downstream from the outdoor air inlet 20 and upstream from the air filter 26. Additional supply air fans at various locations may also be used.

The energy recovery device 32 may be an energy wheel, such as thermal wheel or desiccant wheel, for example. The energy recovery device 32 includes a first portion 34 within the supply air channel 14 and a second portion 36 within the exhaust air channel 16. The energy recovery device 32 may be configured to rotate in order to exchange latent and/or sensible energy between the supply air channel 14 and the exhaust air channel 16.

A damper 38 may be disposed within the supply air channel 14 between a portion of the housing 12 and the energy recovery device 32. When the damper 38 is opened, the air stream may pass around the energy recovery device 32 and toward a supply liquid-to-air membrane energy exchanger (LAMEE) 40 that is disposed within the supply air channel 14 downstream from the energy recovery device 32. When the damper 38 is closed, however, an air stream is prevented from being diverted around the energy recovery device 32.

A supply air outlet 42 is positioned at a supply air outlet end 43 of the supply air channel 14 downstream from the supply LAMEE 40 and is configured to allow conditioned supply air to pass from the supply air channel 14 into an enclosed structure 44. A supply air outlet damper 46 may be disposed within the supply air outlet 42. When the damper 46 is opened, conditioned supply air may pass out of the supply air outlet 42 into the enclosed structure 44. When the damper 46 is closed, conditioned supply air is prevented from passing from the supply air channel 14 into the enclosed structure 44.

An exhaust air inlet 48 is located at an exhaust air inlet end 50 of the exhaust air channel 16. An exhaust air inlet damper 52 may be disposed within the exhaust air inlet 48 to selectively allow and prevent exhaust air from passing into the exhaust air channel 16.

An air filter 54 may be disposed within the exhaust air channel 16 downstream from the exhaust air inlet 48. The air filter 54 is configured to filter contaminants and impurities from an air stream. Alternatively, the air delivery system 10 may not include the air filter 54.

An exhaust air fan 56 may be disposed within the exhaust air channel 16 downstream from the air filter 54 and upstream from the energy recovery device 32. The exhaust air fan 56 is configured to draw and move air through the exhaust air channel 16. While shown downstream from the air filter 54, the exhaust air fan 56 may alternatively be disposed at various other areas within the exhaust air channel 16. For example, the exhaust air fan 56 may be disposed downstream from the energy recovery device 32. Additional exhaust air fans at various locations may also be used.

As noted above, a second portion 36 of the energy recovery device 32 is disposed within the exhaust air channel 16. A damper 58 may be disposed within the exhaust air channel 16 between a portion of the housing 12 and the energy recovery device 32. When the damper 58 is opened, the air stream may pass around the energy recovery device 32 and toward an exhaust LAMEE 60 that is disposed within the exhaust air channel 16 downstream from the energy recovery device 32. When the damper 58 is closed, however, an air stream is prevented from being diverted around the energy recovery device 32.

A heat exchanger 62, such as an air-to-air coil or a liquid-to-air coil, may be disposed within the exhaust air channel 16 downstream from the energy recovery device 32 and upstream from the exhaust LAMEE 60. Alternatively, the air delivery system 10 may not include the heat exchanger 62.

While not shown, an additional heat exchanger may be disposed within the exhaust air channel 16 downstream from the exhaust LAMEE 60.

The exhaust LAMEE 60 and the supply LAMEE 40 are connected together through a moisture transfer loop (not shown in FIG. 1A). The moisture transfer loop is configured to transfer liquid desiccant between the exhaust LAMEE 60 and the supply LAMEE 40.

An exhaust air outlet 64 is positioned at an exhaust air outlet end 66 of the exhaust air channel 16 downstream from the exhaust LAMEE 60 and is configured to allow exhaust air to pass from the exhaust air channel 16 to an outside environment 70. An exhaust air outlet damper 68 may be disposed within the exhaust air outlet 64. When the damper 68 is opened, exhaust air may be exhausted out of the exhaust air outlet 64 into the outside environment 70. When the damper 68 is closed, exhaust air is prevented from passing into the outside environment 70.

The air delivery system 10 may also include a heat pump 72 operatively connected to the supply LAMEE 40, the exhaust LAMEE 60, the heat exchanger 28, and/or the heat exchanger 62. The heat pump 72 may be connected to one or more of the supply LAMEE 40, the exhaust LAMEE 60, the heat exchanger 28, and/or the heat exchanger 62 through one or more conduits. For example, the heat pump 72 may be connected to the supply LAMEE 40 and/or the exhaust LAMEE 60 through conduits that are configured to allow heat from the heat pump 72, in the form of heated gas or liquid, to heat or cool liquid desiccant circulating within the supply LAMEE 40 and/or the exhaust LAMEE 60. Similarly, the heat pump 72 may be connected to the heat exchanger 28 and/or the heat exchanger 62 through conduits that are configured to allow heat from the heat pump 72, in the form of heated gas or liquid, to heat or cool refrigerant circulating within the heat exchangers 28 and 62. Alternatively, the air delivery system 10 may not include the heat pump 72.

As noted above, an additional heat exchanger may be disposed within the exhaust air channel 16 downstream from the exhaust LAMEE 60. The additional heat exchanger may be connected to the heat pump 72 through one or more conduits. The additional heat exchanger may exchange energy between exhaust air and refrigerant within internal conduits to further condition and/or regenerate refrigerant.

As shown in FIG. 1A, the air delivery system 10 may also include a desiccant regeneration bypass damper 74 disposed within the partition 18 upstream from the energy recovery device 32 within the supply air channel 14, and downstream from the energy recovery device 32 within the exhaust air channel 16. When the desiccant regeneration bypass damper 74 is opened, air within the supply air channel 14 may pass into the exhaust air channel 16. When the desiccant regeneration bypass damper 74 is closed, however, air within the supply air channel 14 is prevented from passing into the exhaust air channel 16.

As also shown in FIG. 1A, a desiccant storage tank 76 may be connected to the exhaust LAMEE 60 through a desiccant reception line 78. The desiccant storage tank 76 may also be connected to the supply LAMEE 40 through a desiccant inlet line 80 and a desiccant return line 82. The desiccant storage tank 76, the desiccant reception line 78, the desiccant inlet line 80, and the desiccant return line 82 may all be contained within the housing 12. Optionally, the desiccant storage tank 76 and lines 78, 80, and 82 may be mounted to an exterior of the housing 12, or even remotely located therefrom.

The air delivery system 10 may also include a control sub-system 84 contained on or in the housing 12, or remotely located therefrom. The control sub-system 84 may be in communication with each of the components of the air delivery system 10 and may be configured to control operation of the air delivery system 10. For example, the control sub-system 84 may be configured to control operation of the dampers, rotation of the energy recovery device 32, the fans 30 and 56, and the like.

The control sub-system 84 may include or represent hardware and associated instructions (for example, software stored on a tangible and non-transitory computer readable storage medium, such as a computer hard drive, ROM, RAM, or the like) that perform the operations described herein. The hardware may include electronic circuits that include and/or are connected to one or more logic-based devices, such as microprocessors, processors, controllers, or the like. These devices may be off-the-shelf devices that perform the operations described herein. Additionally or alternatively, one or more of these devices may be hard-wired with logic circuits to perform these operations.

It is to be understood that the control sub-system 84 may represent an electronic circuit module that may be implemented as hardware with associated instructions. The hardware may include state machine circuitry hard wired to perform the functions described herein. Optionally, the hardware may include electronic circuits that include and/or are connected to one or more logic-based devices, such as microprocessors, processors, controllers, or the like. Optionally, the control sub-system 84 may represent processing circuitry such as one or more field programmable gate array (FPGA), application specific integrated circuits (ASIC), or microprocessors. The electronic circuit modules in various embodiments may be configured to execute one or more algorithms to perform functions described herein. The one or more algorithms may include aspects of embodiments disclosed herein, whether or not expressly identified in a flowchart or a method.

Alternatively, the air delivery system 10 may not include the control sub-system 84. Instead, operation of the air delivery system 10 may be performed manually.

During normal operation, the outside air 21 or other source air passes into the supply air channel 14 through the outdoor air inlet 20. The outside air 21 is first filtered by the air filter 26 and then pre-conditioned by the heat exchanger 28. For example, the heat exchanger 28 may be configured to pre-heat or pre-cool the outside air 21.

The pre-conditioned air 86 is then further moved within the supply air channel 14 by the supply air fan 30 through the energy recovery device 34. The pre-conditioned air 86 is further conditioned through operation of the energy recovery device 32 exchanging sensible and/or latent energy with exhaust air 88 passing through the exhaust air channel 16. The conditioned air 90 passes through the energy recovery device 34 within supply air channel 14 and through the supply LAMEE 40, which further conditions the air to be supply air 92 that passes through the supply air outlet 42 into the enclosed structure 44.

The exhaust air 88 from the enclosed structure 44 passes into the exhaust air channel 16 through the exhaust air inlet 48, and is drawn toward the energy recovery device 32 by the exhaust air fan 56. The exhaust air 88 exchanges sensible and/or latent energy with the pre-conditioned air 86 within the supply air channel 14 through operation of the energy recovery device 34. The exhaust air 88 is altered by the energy recovery device 32 such that altered air 96 passes through the energy recovery device 36 and through the heat exchanger 62, which further alters the air. The altered air 98 passes through the heat exchanger 62 and into the exhaust LAMEE 60, which further alters the air and provides exhaust air 100 that is then exhausted to the outside environment 70 through the exhaust air outlet 64.

During times when the air delivery system 10 does not need to provide supply air 92 to the enclosed structure 44, the air delivery system 10 may be used to regenerate the desiccant that is circulated between the exhaust LAMEE 60 and the supply LAMEE 40. During such an off-hours mode, the energy recovery device 32 may be deactivated. For example, the control sub-system 84 may cease rotation of the energy recovery device 34. Further, the dampers 38 and 58 may be closed so that air may not pass around the energy recovery device 32. Also, the desiccant regeneration bypass damper 74 within the partition 18 may be opened, thereby providing a passage for air to flow between the supply air channel 14 and the exhaust air channel 16. Outside air 21 may then be used to regenerate the desiccant within the exhaust LAMEE 60.

As the outside air 21 enters the supply air channel 14, the supply air fan 30 remains active to move regenerating outside air 102 towards the energy recovery device 32. However, because the energy recovery device 32 is deactivated, the regenerating outside air 102 is prevented from moving therethrough or past. Further, the damper 38 is closed, so that the regenerating outside air 102 is prevented from passing around the energy recovery device 32. At this time, the damper 46 may be closed to prevent any regenerating outside air 102 from passing into the enclosed structure 44. Similarly, the damper 52 may be closed to prevent any exhaust air from passing into the exhaust air channel 16. Because the deactivated energy recovery device 32 and the closed damper 38 prevent the regenerating outside air 102 from passing therethrough or around, the regenerating outside air 102 is shunted into the exhaust air channel 16 through the open desiccant regeneration bypass damper 74. The deactivated energy recovery device 32 and the closed damper 58 prevent the regenerating outside air 102 from moving therethrough or around. Instead, the regenerating outside air 102 is moved through the exhaust air channel 16 and into the exhaust LAMEE 60 to regenerate the desiccant therein. After passing through the exhaust LAMEE 60, the regenerating outside air 102 is exhausted to the outside environment 70 through the open exhaust air outlet 64.

During the off-hour regeneration, the heat exchangers 28 and 62 may be active in order to pre-condition the regenerating outside air 102 before it passes into the exhaust LAMEE 60. Alternatively, the heat exchangers 28 and 62 may be deactivated during the off-hour regeneration.

Thus, when the air delivery system 10 is not needed to provide supply air 92 to the enclosed structure 44, the control sub-system 84 (or an individual) may switch the air delivery system 10 from a normal operation mode to an off-hour desiccant regeneration mode. During the desiccant regeneration mode, the regenerating outside air 102 passes through the exhaust LAMEE 60 and increases the concentration of the desiccant therein.

During the desiccant regeneration mode, the heat pump 72 may be used to heat the desiccant within the exhaust LAMEE 60. As the regenerating outside air 102 passes through the exhaust LAMEE 60, the regenerating outside air 102 transfers latent and sensible energy with the heated desiccant. The regenerating outside air 102 absorbs moisture from the heated desiccant, thereby increasing the concentration of the desiccant. The concentrated desiccant may then be transferred to the desiccant storage tank 76 by way of the desiccant reception line 78. The concentrated desiccant may then be held in reserve until the normal operation mode. The concentrated desiccant within the desiccant storage tank may be re-injected, tapped, or input into the supply LAMEE 40 through the desiccant inlet line 80, while diluted desiccant may be transferred to the desiccant storage tank 76 through the desiccant return line 82. Alternatively, the exhaust LAMEE 60 may simply draw concentrated desiccant from the desiccant storage tank 76 through the line 78 and circulate the concentrated desiccant within the supply LAMEE 40 through normal operation. In such an embodiment, the lines 80 and 82 may not be used.

During the normal operation, the control sub-system 84 may monitor the concentration of the desiccant circulating between the supply LAMEE and the exhaust LAMEE 60 and tap into the concentrated desiccant within the desiccant storage tank 76 as needed. For example, the control sub-system 84 may monitor the temperature and humidity conditions within the enclosed structure 44 and tap into (or refrain from tapping into) the concentrated desiccant within the desiccant storage tank 76 based on a desired temperature and humidity for the enclosed structure 44. Further, the control sub-system 84 may operate the air delivery system 10 according to the desiccant regeneration mode during off-hours in order to regenerate the desiccant and store the regenerated desiccant in reserve for use during a normal operation mode.

Alternatively, the desiccant may be regenerated through exhaust air. In this embodiment, the dampers 24, 74, and 38 may be closed, while the dampers 52, 58, and 68 are opened. The energy recovery device 32 is deactivated, the exhaust air fan 56 is activated to draw the exhaust air 88 from the enclosed structure through the exhaust LAMEE 60 to regenerate the desiccant, as described above. As such, the desiccant may be regenerated with exhaust air 88 instead of outside air 21.

In at least one other embodiment, the desiccant with the exhaust LAMEE 60 may be regenerated with both the outside air 21 and the exhaust air 88. For example, the energy recovery device 32 may be deactivated, while the dampers 38 and 46 are closed. The dampers 24 and 52 are opened, thereby allowing outside air 21 and exhaust air 88, respectively, to pass into the air delivery system 10. The dampers 74 and 58 are opened in order to allow the outside air 21 and the exhaust air 88 to pass into the exhaust LAMEE 60 and regenerated the desiccant therein. The heat exchangers 28 and 62 may be activated in order to pre-condition the outside air 21 and the exhaust air 88 before entering the exhaust LAMEE 60.

In at least one other embodiment, the desiccant within the supply LAMEE 40 may be regenerated with outside environment. For example, instead of using a desiccant regeneration bypass damper to transfer the outside air 21 from the supply air channel 14 to the exhaust air channel 16 during the desiccant regeneration mode, the outside air 21 may simply be channeled to the supply LAMEE 40. The supply air outlet damper 46 may be closed, thereby preventing any air from passing into the enclosed structure 44. An exhaust outlet damper positioned within the supply air channel 14 may be opened. The exhaust outlet damper allows the regenerating outside air that passes through the supply LAMEE 40 to be vented to the outside environment 70. The supply LAMEE 40 may be connected to the desiccant storage tank 76 so that the regenerated desiccant within the supply LAMEE 40 may be stored therein.

Figure 1B:
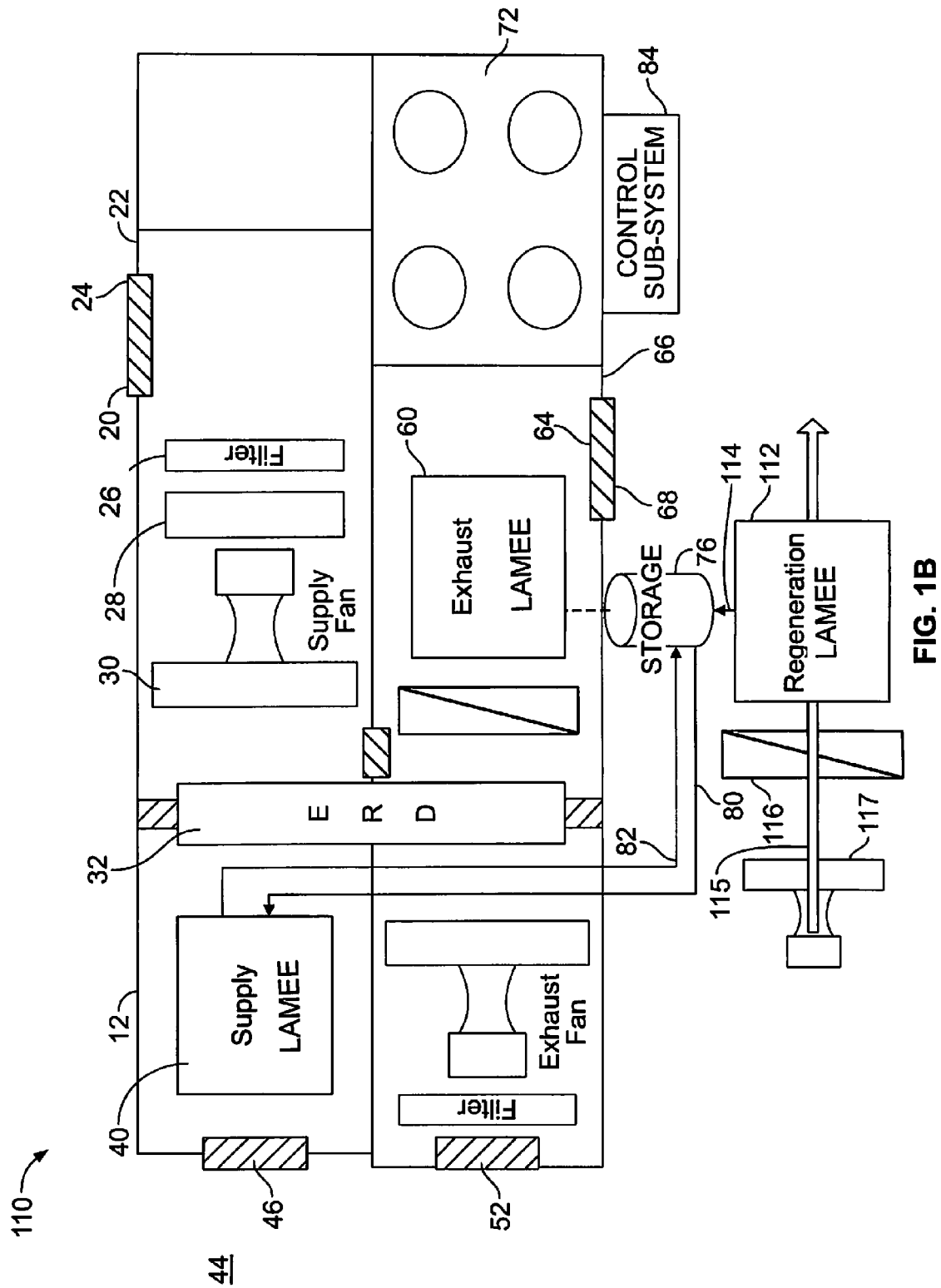
FIG. 1B illustrates a schematic of an air delivery system, according to an embodiment of the present disclosure.

FIG. 1B illustrates a schematic of an air delivery system 110 according to an embodiment of the present disclosure. The air delivery system 110 may be configured to utilize purge air to regenerate desiccant. The air delivery system 110 is similar to the air delivery system 10, except that the air delivery system 110 may include a regeneration LAMEE 112 fluidly connected to the desiccant storage tank 76 through one or more conduits 114. The regeneration LAMEE 112 may be disposed within a purge air path 115 outside of the housing 12.

The purge air path 115 may be an air stream of air vented from the enclosed structure 44, for example. The purge air may be neither supply air, nor return air. Instead, the purge air may be air that is purged from the enclosed structure 44. Alternatively, the purge air may generated by another structure, outside air source, or the like.

The purge air path 115 may be defined by a channel, such as formed by a conduit, duct, or the like. Alternatively, the purge air path 115 may be an open air path outside of the housing 12.

A heat exchanger 116 may be disposed within the purge air path 115 upstream from the regeneration LAMEE 112. The heat exchanger 116 may condition the purge air before it passes through the regeneration LAMEE 112. The purge air passes through the regeneration LAMEE 112 and conditions desiccant that circulates through the regeneration LAMEE 112. The desiccant that is regenerated within the regeneration LAMEE 112 may then be stored in the desiccant storage tank 76, as described above. Additionally, the desiccant may be regenerated by the exhaust LAMEE 60, as described above.

During a desiccant regeneration mode, the dampers 24, 46, 52 and 68 may be closed, and the supply air fan 30, the exhaust air fan 56, and the energy recovery device 32 may be deactivated. A purge fan 117 may be activated to draw the purge air through the purge air LAMEE 112 to regenerate the desiccant, as described above. As such, the desiccant may be regenerated with purge air instead of, or in addition to, outside air, supply air or exhaust air.

As shown in FIG. 1B, the regeneration LAMEE 112 and the heat exchanger 116 may be outside of the housing 12. The regeneration LAMEE 112 and the heat exchanger 116 may be mounted to the outside of the housing 12. Alternatively, the regeneration LAMEE 112 and the heat exchanger 116 may be remote from the housing 12. For example, the regeneration LAMEE 112 and the heat exchanger 116 may be secured to or within a separate and distinct structure, such as a separate and distinct building, that is remote from the housing 12 and the enclosed structure 44. The purge air may be exhaust or even supply air from the remote structure, for example.

Alternatively, the supply LAMEE 40 may be operatively connected to the regeneration LAMEE 112 by a moisture transfer loop configured to circulate the desiccant between the supply LAMEE 40 and the regeneration LAMEE 112. Similarly, the exhaust LAMEE 60 may be operatively connected to the regeneration LAMEE 112 by a moisture transfer loop configured to circulate the desiccant between the exhaust LAMEE 60 and the regeneration LAMEE 112.

Figure 2:
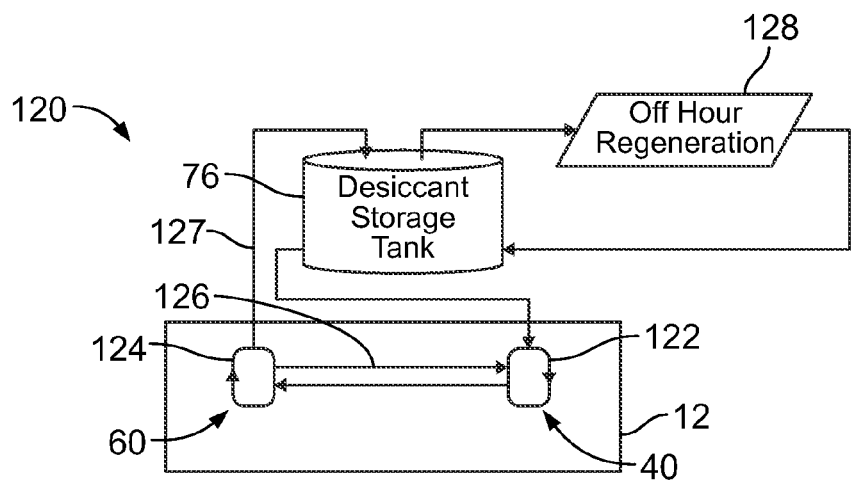
FIG. 2 illustrates a schematic of a desiccant circuit of an air delivery system, according to an embodiment of the present disclosure.

FIG. 2 illustrates a schematic of a desiccant circuit 120 of the air delivery system 10 (shown in FIG. 1A), according to an embodiment of the present disclosure. The desiccant circuit 120 includes a desiccant loop 122 within and/or through the supply LAMEE 40 connected to a desiccant loop 124 within and/or through the exhaust LAMEE 60 through a moisture transfer loop 126. The moisture transfer loop 126 transfers latent and/or sensible energy between the desiccant loops 122 and 124.

As shown, the desiccant loop 124 within the exhaust LAMEE 60 may be connected to the desiccant storage tank 76 through a conduit 127. During the normal operation mode, diluted desiccant may be transferred from the exhaust LAMEE 60 into the desiccant storage tank 76 through the conduit 127. During desiccant regeneration mode 128, diluted desiccant within the desiccant storage tank 76 may be transferred to an off-hour regenerator through a conduit, regenerated, and then transferred back to be stored within the desiccant storage tank 76. Regenerated, concentrated desiccant may then later be supplied to the desiccant loop 122 of the supply LAMEE 40 (or the desiccant loop 124 of the exhaust LAMEE 60) as needed.

As explained above, the supply LAMEE 40 and the exhaust LAMEE 60 may be contained within the common housing 12, such as a cabinet. Alternatively, a regeneration LAMEE within a purge air stream may be used in addition to, or instead of, the exhaust LAMEE 60. The desiccant storage tank 76 may be remotely located from the housing 12, or may optionally be contained within the housing 12.

In addition to altering the concentration of the desiccant during the desiccant regeneration mode, the temperature of the desiccant may also be altered. For example, the heat pump 72 (shown in FIG. 1A) may be used to heat or cool the desiccant, depending on a desired temperature of air to be supplied to the enclosed structure 44 (shown in FIG. 1A). The heated or cooled desiccant may be stored within the desiccant storage tank 76, and tapped during the normal operation mode, as needed. Accordingly, the concentration and/or temperature of the desiccant may be altered during the desiccant regeneration mode, and the regenerated desiccant may be stored within the desiccant storage tank 76 and tapped as needed during the normal operation mode.

Embodiments of the present disclosure are described with respect to air delivery systems, such as the air delivery system 10. Each air delivery system may be or otherwise include, for example, an HVAC system, a heat pump, an air handling system, an air-to-air energy exchange system, a liquid-to-air energy exchange system, and the like. For example, embodiments of the present disclosure may be used with respect to heat pumps, such as described in U.S. patent application Ser. No. 13/350,902, entitled "Heat Pump System Having a Pre-Processing Module," filed Jan. 16, 2012, U.S. patent application Ser. No. 13/009,222, entitled "Heat Pump System Having a Pre-Processing Module," filed Jan. 19, 2011, U.S. patent application Ser. No. 12/870,545, entitled "Heat Pump Humidifier and Dehumidifier System and Method," filed Aug. 27, 2010, and U.S. patent application Ser. No. 13/275,633, entitled "Heat Pump Humidifier and Dehumidifier System and Method," filed Oct. 18, 2011, all of which are hereby incorporated by reference in their entireties. Also, embodiments of the present discloses may be used with respect to energy exchange systems, such as described in U.S. patent application Ser. No. 13/702,596, entitled "Liquid-To-Air Membrane Energy Exchanger," filed Dec. 7, 2012, U.S. patent application Ser. No. 13/449,598, entitled "Energy Exchange System for Conditioning Air in an Enclosed Structure," filed Apr. 18, 2012, and U.S. patent application Ser. No. 13/737,472, entitled "System and Method for Providing Conditioned Air to an Enclosed Structure," filed Jan. 19, 2013, all of which are hereby incorporated by reference in their entireties.

Figure 3:
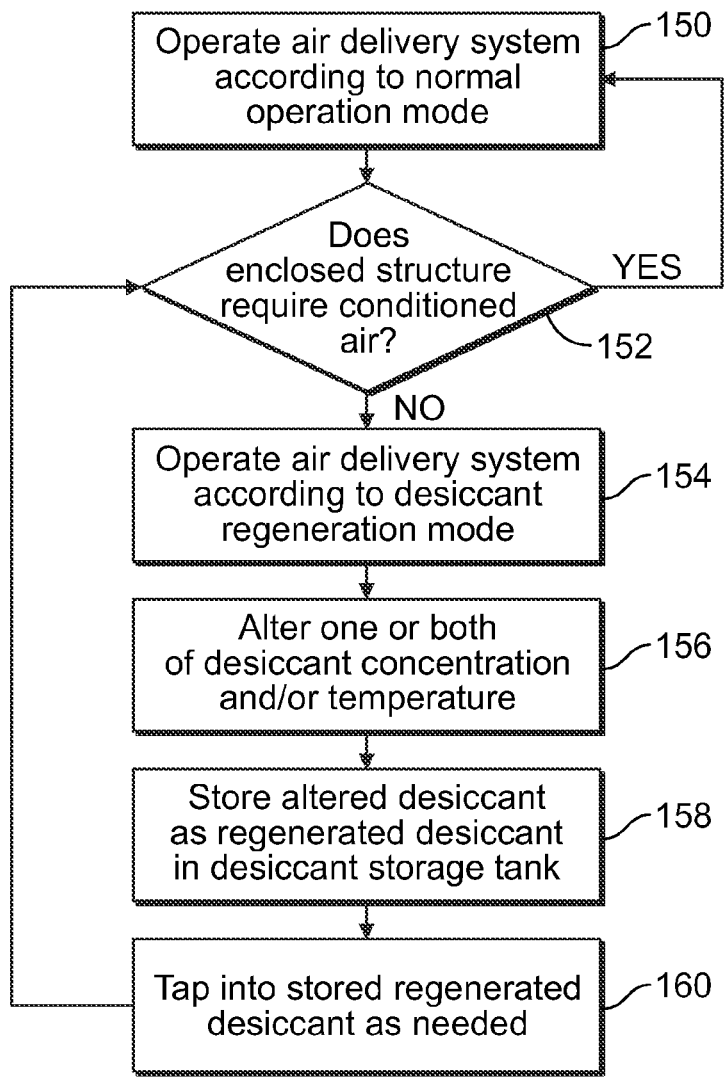
FIG. 3 illustrates a flow chart of a method of operating an air delivery system, according to an embodiment of the present disclosure.

FIG. 3 illustrates a flow chart of a method of operating an air delivery system, according to an embodiment of the present disclosure. At 150, the air delivery system is operated according to a normal mode of operation, in which conditioned supply air is supplied to an enclosed structure. At 152, it is determined whether the enclosed structure requires conditioned supply air. If so, the process returns to 150. If, however, the enclosed structure does not immediately require conditioned supply air, such as during off-hours, then the method proceeds to 154, in which the air delivery system is operated according to a desiccant regeneration mode, as described above. At 156, one or both of the concentration and/or temperature of the desiccant is altered. Then, at 158, the altered desiccant is stored as regenerated desiccant within a desiccant storage tank. The method then proceeds to 160, in which the stored regenerated desiccant may be tapped at any time as needed. The method then returns to 152.

While the desiccant regeneration mode is described as occurring during off-hour periods, it is understood that the desiccant regeneration mode may be conducted at any time. For example, the control sub-system 84 (shown in FIG. 1A) may shift from a normal operation mode to a desiccant regeneration mode at any time, even if supply air is still to be provided to the enclosed structure. For example, the control sub-system 84 may detect that the desiccant is too diluted to be effective with respect to desired supply air conditions, and may shift to the desiccant regeneration mode to regenerate the desiccant. Once the desiccant is regenerated, the control sub-system 84 may shift back to the normal operation mode.

Figure 4:
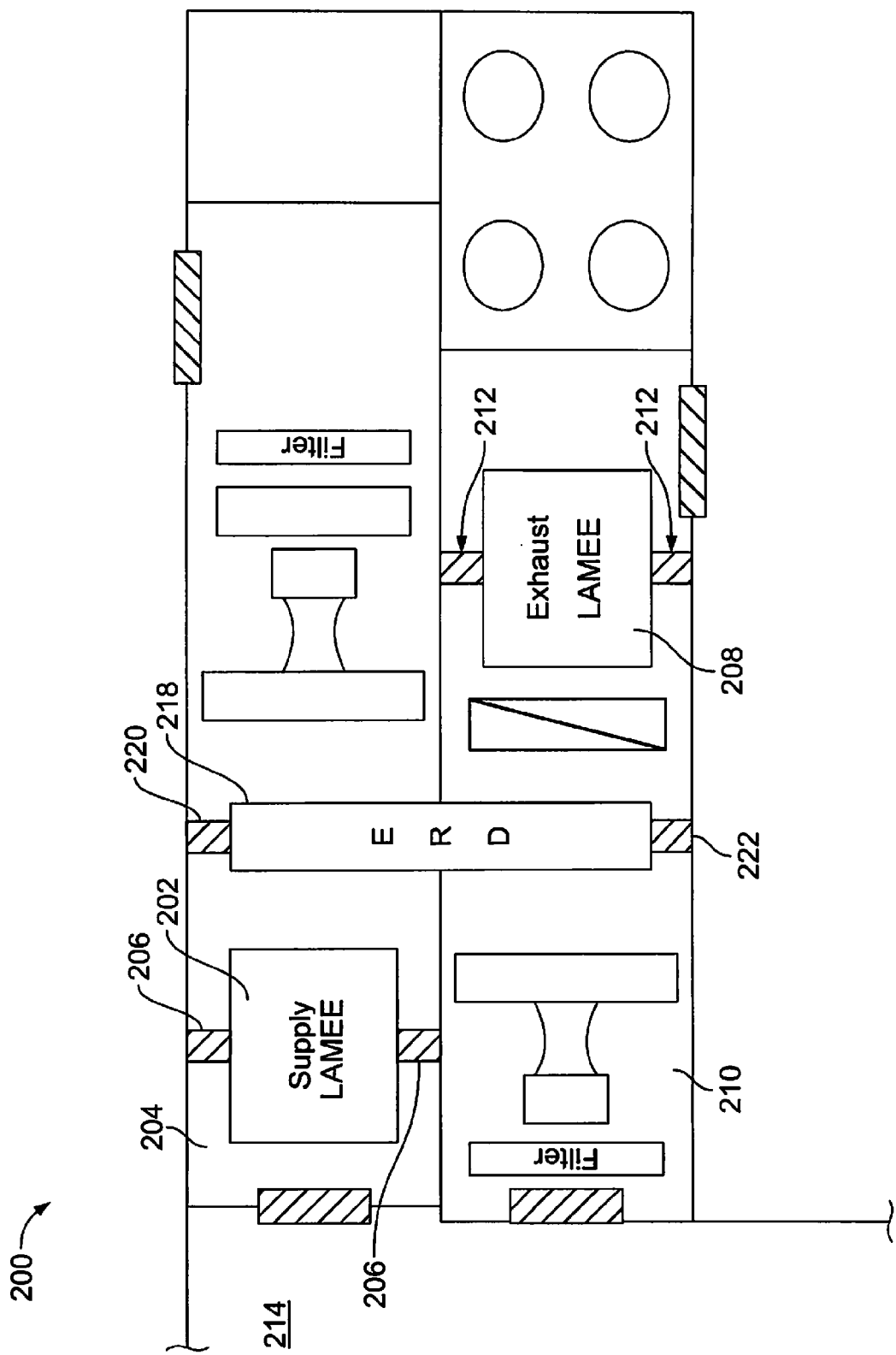
FIG. 4 illustrates a schematic of an air delivery system, according to an embodiment of the present disclosure.

FIG. 4 illustrates a schematic of an air delivery system 200, according to an embodiment of the present disclosure. The air delivery system 200 is similar to the air delivery system 10, shown in FIG. 1A, and may be operated in a normal operation mode and a desiccant regeneration mode, as described above.

Additionally, as shown in FIG. 4, a supply LAMEE 202 within a supply air channel 204 may be bounded by a damper 206. Similarly, an exhaust LAMEE 208 within an exhaust air channel 210 may be bounded by a damper 212. Each damper 206 and 212 may be selectively opened and closed to allow and prevent air from passing therethrough. When the dampers 206 and 212 are closed, airflow passes through the supply and exhaust LAMEEs 202 and 208, respectively. When the dampers 206 and 212 are opened, airflow may be diverted around the LAMEEs 202 and 208, respectively, so that the airflow does not pass therethrough. Further, the dampers 202 and 212 may be modulated between fully opened and fully closed positions to allow a portion of airflow to pass therethrough, and a remaining portion to pass through the supply and exhaust LAMEEs 202 and 208, respectively.

The dampers 206 and 212 may be opened to provide efficient air conditioning and delivery. For example, the damper 206 may be fully opened in an economy mode when the temperature and/or humidity of the outside air is close to or at the desired temperature and/or humidity of the air to be supplied to an enclosed structure 214. When the damper 206 is opened, the air bypasses around the supply LAMEE 202, as the LAMEE 202 may not be needed to condition the air. As such, the supply LAMEE 202 may be deactivated to save energy. Moreover, in such a configuration, the exhaust LAMEE 208 may be simultaneously operated in a desiccant regeneration mode, as described above, in order to regenerate the desiccant and store the regenerated desiccant for future use, while conditioned supply air is provided to the enclosed structure 214.

Additional dampers may be positioned at inlets of each of the supply LAMEE 202 and the exhaust LAMEE 208. When airflow is to be diverted around the supply LAMEE 202, for example, the inlet damper may be closed, thereby preventing air from passing into the supply LAMEE 202, while the damper 206 is opened, thereby allowing air to flow around and bypass the supply LAMEE 202. However, inlet dampers are not required on the supply and exhaust LAMEEs 202 and 208. Instead, air may automatically bypass around the supply and exhaust LAMEEs 202 and 208 when the dampers 206 and 212 are opened due to the pressure drop within the supply and exhaust LAMEEs 202 and 208.

Additionally, an energy recovery device 218 may be bounded by dampers 220 and 222. During an economy mode, the energy recovery device 218 may be deactivated and the damper 220 may be opened in order to allow supply air to be diverted around the energy recovery device 218.

As such, in addition to the desiccant concentration and/or temperature being modulated, as described above, airflow may be diverted around one or more of the supply and exhaust LAMEEs 202 and 208 through the dampers 206 and 212, respectively, in order to further control the temperature and humidity of the supply air that is provided to the enclosed structure 214.

The bypass paths around the energy recovery device 218 and the supply and exhaust LAMEEs 202 and 208 may be utilized to improve energy efficiency and/or performance of the system. Optionally, the air delivery system 200 may include a multi-stage economizer cycle (in which the heat pump is off) using any combination of (i) outdoor or source air bypassed around the energy recovery device 218 and/or the LAMEEs 202 and 208, (ii) the supply and exhaust LAMEEs 202 and 208 used as a passive Run Around Membrane Energy Exchanger (RAMEE) to transfer sensible and/or latent energy with the exhaust air, and/or (iii) the energy recovery device 218.

Figure 5:
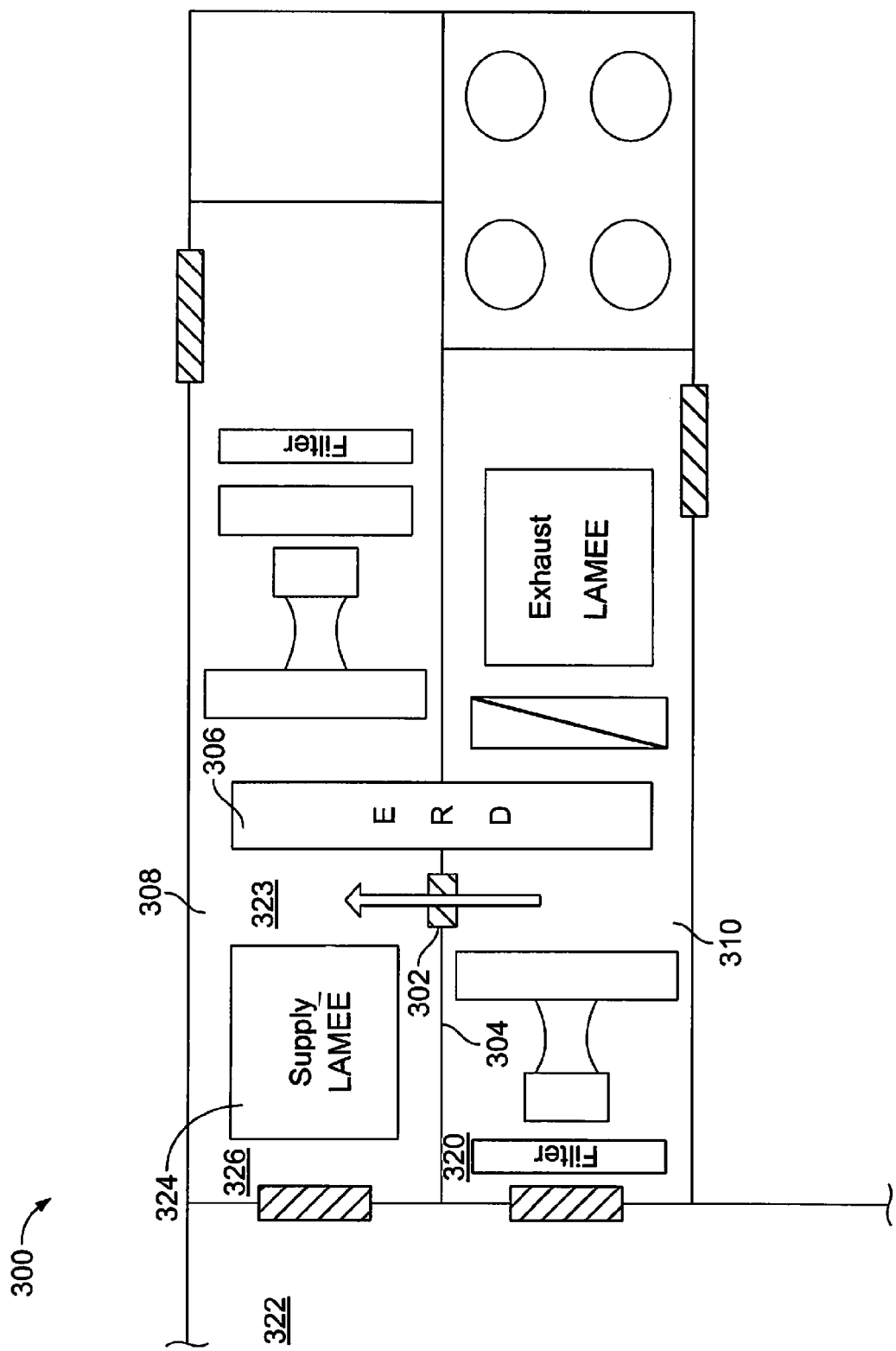
FIG. 5 illustrates a schematic of an air delivery system, according to an embodiment of the present disclosure.

FIG. 5 illustrates a schematic of an air delivery system 300, according to an embodiment of the present disclosure. The air delivery system 300 is similar to the air delivery systems described above, and may be used with respect to any of the methods described above.

Additionally, the air delivery system 300 may include an exhaust air recirculation damper 302 within a partition 304 that is downstream from an energy recovery device 306 within a supply air channel 308, and upstream from the energy recovery device 306 within an exhaust air channel 310. The damper 302 may be opened in order to allow exhaust air 320 from an enclosed structure 322 to mix with conditioned air 323 before entering a supply LAMEE 324.

The supply LAMEE 324 receives the mixed air and further conditions it to provide supply air 326 to the enclosed structure 322. As such, the damper 302 may be opened to recirculate the exhaust air 320 into the conditioned air 323. The damper 302 may be closed in order to prevent the exhaust air 320 from mixing with the conditioned air 323.

Figure 6:
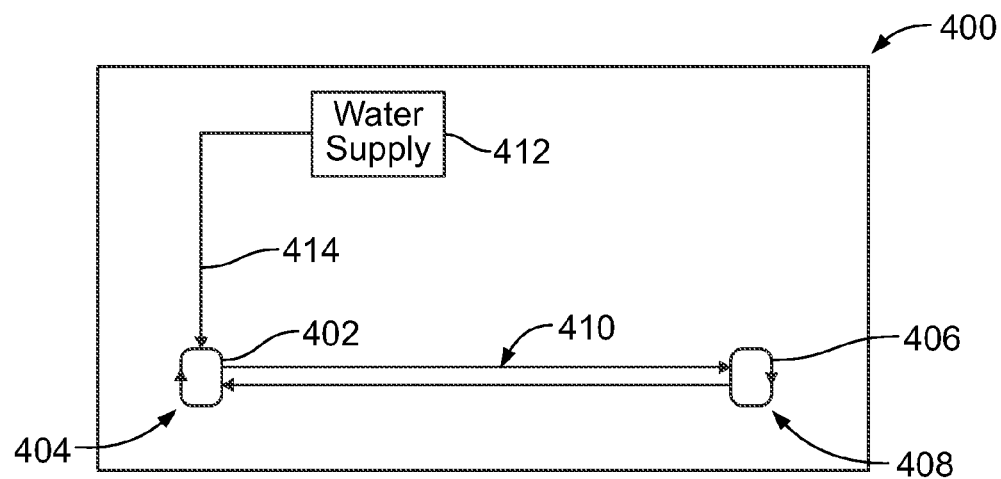
FIG. 6 illustrates a schematic of a desiccant circuit of an air delivery system, according to an embodiment of the present disclosure.

FIG. 6 illustrates a schematic of a desiccant circuit 400 of an air delivery system (such as the air delivery system 10, shown in FIG. 1A), according to an embodiment of the present disclosure. The desiccant circuit 400 may include a desiccant loop 402 within and/or through an exhaust LAMEE 404 connected to a desiccant loop 406 within and/or through a supply LAMEE 408 by a moisture transfer loop 410, as described above with respect to FIG. 2. A water supply 412 may be connected to the desiccant loop 402 of the exhaust LAMEE 404 through a conduit 414. A control sub-system or an operator may provide water, such as reverse osmosis water, to the desiccant within the desiccant loop 402 in order to dilute the desiccant to a desired concentration. Further, the water may heat or cool the temperature of the desiccant to a desired temperature.

The desiccant circuit 400 may be used in conjunction with FIG. 1A, for example. Indeed, the desiccant circuit 400 may be used with respect to any of the desiccant circuits described above.

Figure 7:
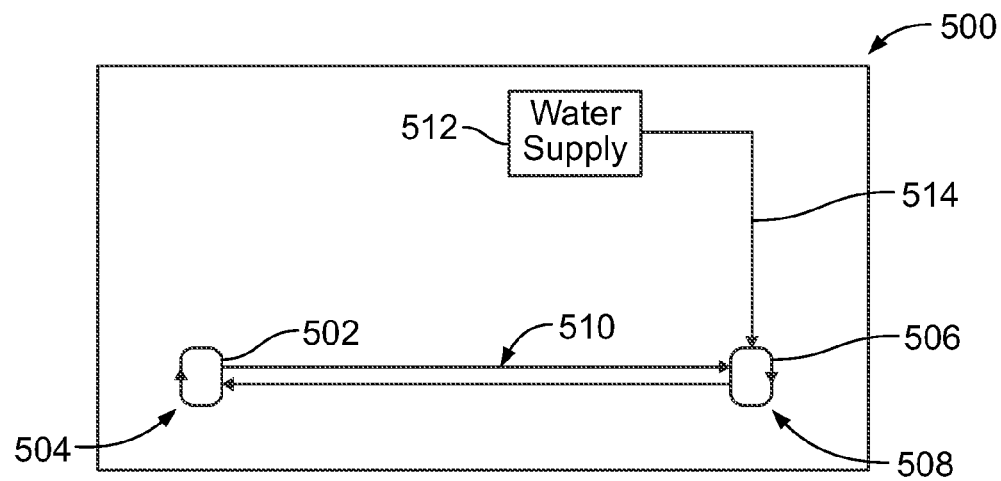
FIG. 7 illustrates a schematic of a desiccant circuit of an air delivery system, according to an embodiment of the present disclosure.

FIG. 7 illustrates a schematic of a desiccant circuit 500 of an air delivery system (such as the air delivery system 10, shown in FIG. 1A), according to an embodiment of the present disclosure. The desiccant circuit 500 may include a desiccant loop 502 within and/or through an exhaust LAMEE 504 connected to a desiccant loop 506 within and/or through a supply LAMEE 508 by a moisture transfer loop 510, as described above with respect to FIG. 2. A water supply 512 may be connected to the desiccant loop 506 of the supply LAMEE 508 through a conduit 514. A control sub-system or an operator may provide water, such as reverse osmosis water, to the desiccant within the desiccant loop 506 in order to dilute the desiccant to a desired concentration. Further, the water may cool the temperature of the desiccant to a desired temperature.

The desiccant circuit 500 may be used in conjunction with FIG. 1A, for example. The desiccant circuit 500 may be used with respect to any of the desiccant circuits described above.

As described, FIG. 6 illustrates the desiccant circuit 400 that includes the water supply 412 that is configured to supply water to the exhaust LAMEE 404, while FIG. 7 illustrates the desiccant circuit 500 that includes the water supply 512 that is configured to supply water to the supply LAMEE 508. Alternatively, a single water supply may be used to provide water to both the exhaust and supply LAMEEs. In at least one other embodiment, each of the supply and exhaust LAMEEs may be connected to separate and distinct water supplies.

FIGS. 6 and 7 illustrate desiccant loops within and/or through an exhaust LAMEE connected to a desiccant loop within and/or through a supply LAMEE by a moisture transfer loop. Alternatively, a regeneration LAMEE within a purge air stream may be used in addition to, or in place of, the exhaust LAMEE.

FIGS. 6 and 7 relate to passive evaporative cooling systems and methods utilizing one or more LAMEEs. Passive evaporative cooling is achieved by injecting water into the LAMEE (such as one or both of the supply and exhaust LAMEEs) desiccant stream, which sensibly cools the desiccant. The coefficient of performance (COP) of an air delivery system may be increased by injecting water into the LAMEE desiccant stream, creating enhanced evaporative cooling and thereby lowering condenser temperature.

Figure 8:
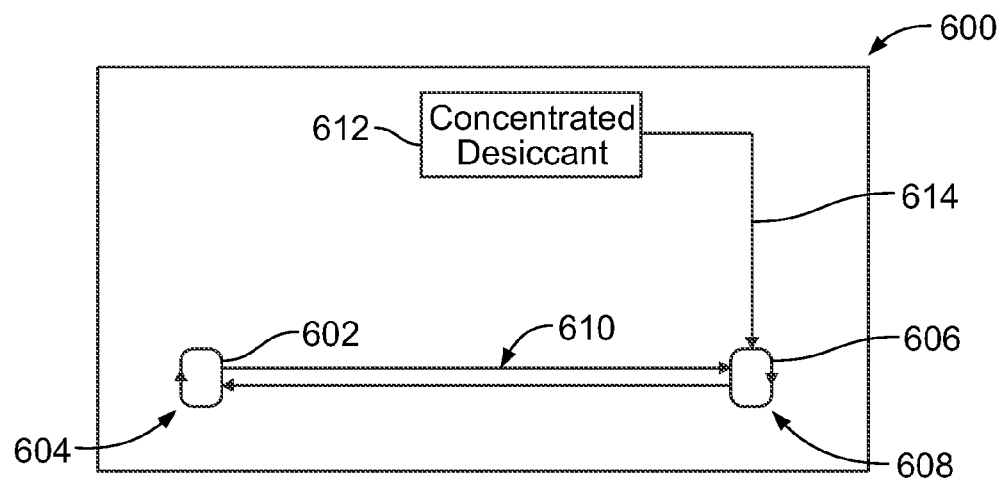
FIG. 8 illustrates a schematic of a desiccant circuit of an air delivery system, according to an embodiment of the present disclosure.

FIG. 8 illustrates a schematic of a desiccant circuit 600 of an air delivery system (such as the air delivery system 10, shown in FIG. 1A), according to an embodiment of the present disclosure. The desiccant circuit 600 may include a desiccant loop 602 within and/or through an exhaust LAMEE 604 connected to a desiccant loop 606 within and/or through a supply LAMEE 608 by a moisture transfer loop 610, as described above with respect to FIG. 2. A desiccant storage tank 612 containing concentrated desiccant may be connected to the desiccant loop 606 of the supply LAMEE 608 through a conduit 614. A control sub-system or an operator may provide concentrated desiccant to the desiccant within the desiccant loop 606 in order to increase the concentration of the desiccant to a desired concentration. Thus, as shown in FIG. 8, concentrated desiccant may be directly injected into the desiccant loop 606 of the supply LAMEE 608. Alternatively, the desiccant storage tank 612 may be connected to the exhaust LAMEE 604. Also, alternatively, the desiccant storage tank 612 may connected to both the supply and exhaust LAMEEs 604 and 608, respectively. In at least one other embodiment, each of the supply and exhaust LAMEEs 604 and 608 may be connected to separate and distinct desiccant storage tanks.

The desiccant circuit 600 may be used in conjunction with FIG. 1A, for example. The desiccant circuit 600 may be used with respect to any of the desiccant circuits described above.

FIG. 8 illustrates a desiccant loop within and/or through an exhaust LAMEE connected to a desiccant loop within and/or through a supply LAMEE by a moisture transfer loop. Alternatively, a regeneration LAMEE disposed within a purge air stream may be used in addition to, or place of, the exhaust LAMEE.

Figure 9:
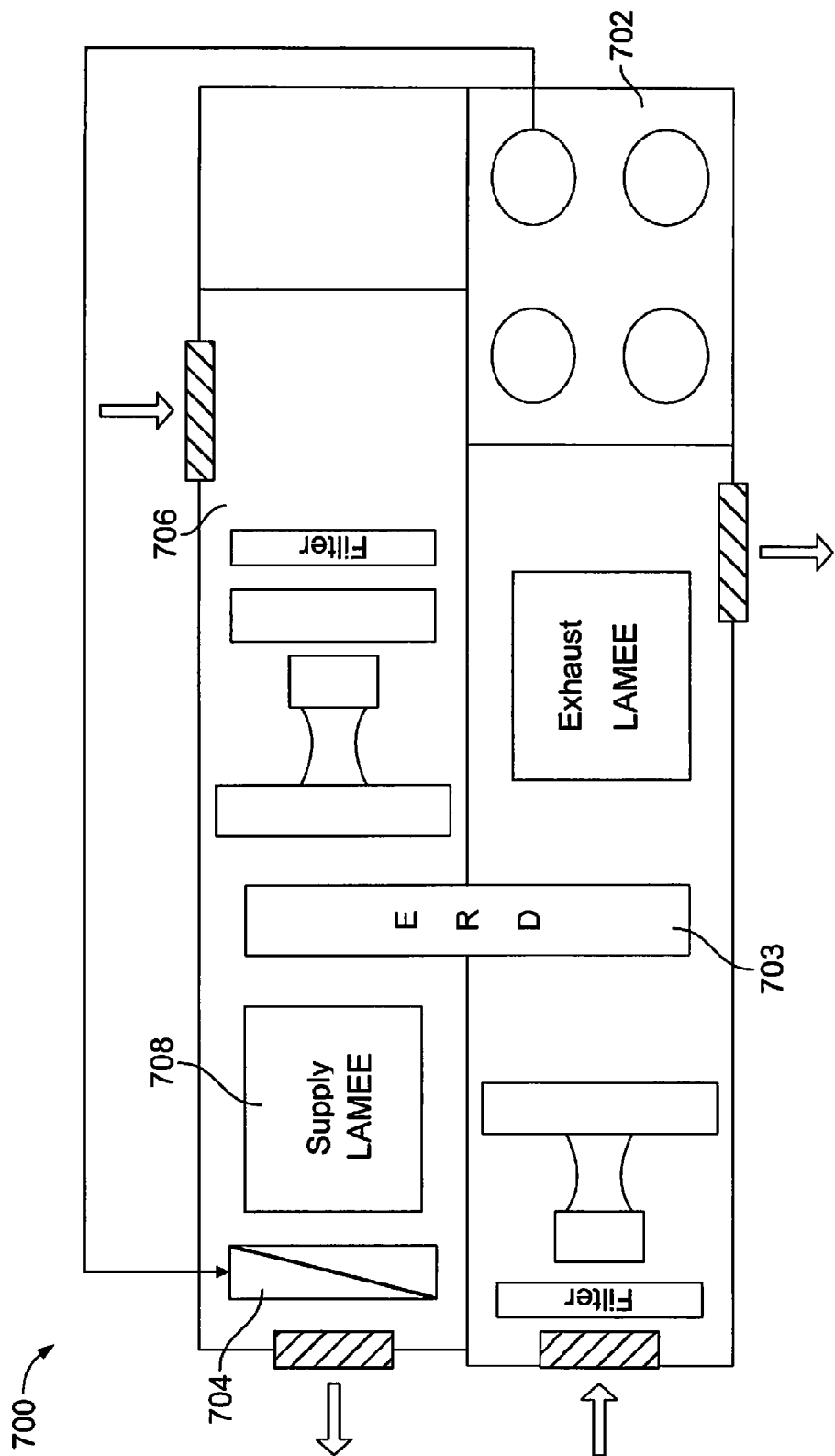
FIG. 9 illustrates a schematic of an air delivery system, according to an embodiment of the present disclosure.

FIG. 9 illustrates a schematic of an air delivery system 700, according to an embodiment of the present disclosure. The air delivery system 700 is similar to the air delivery system 10, shown in FIG. 1A, and may be used with respect to any of the embodiments described above.

As shown in FIG. 9, a heat pump 702 is operatively connected to a heat exchanger 704 within a supply air channel 706 downstream from a supply LAMEE 708. Energy from the heat pump 702, whether in the form of gas or liquid, such as liquid refrigerant, is transferred to the heat exchanger 704. For example, hot gas or hot refrigerant may be used to heat air or liquid, such as refrigerant, circulating within the heat exchanger 704 in order to further heat the supply air after the supply air passes through the supply LAMEE 708. Conversely, cooler gas or cool refrigerant may be used to cool air or liquid, such as refrigerant, circulating within the heat exchanger 704 in order to further cool the supply air after the supply air passes through the supply LAMEE 708.

The heat exchanger 704 may be a hot gas reheat or sub-cooling heat exchanger that is used to improve performance of the heat pump 702, for example. The system 700 may incorporate the hot gas reheat heat exchanger or module or sub-cooler heat exchanger or module downstream of the supply LAMEE 708 to allow the supply air to be sub-cooled and re-heated to improve the coefficient of performance (COP) of the heat pump 702. Additional or alternative methods to improve the COP of the heat pump 702 may include controlling the speed of rotation of the energy recovery device 703, controlling the flow rate of liquid desiccant, and/or reducing the temperature difference between an evaporator and condenser within the heat pump 702.

Figure 10:
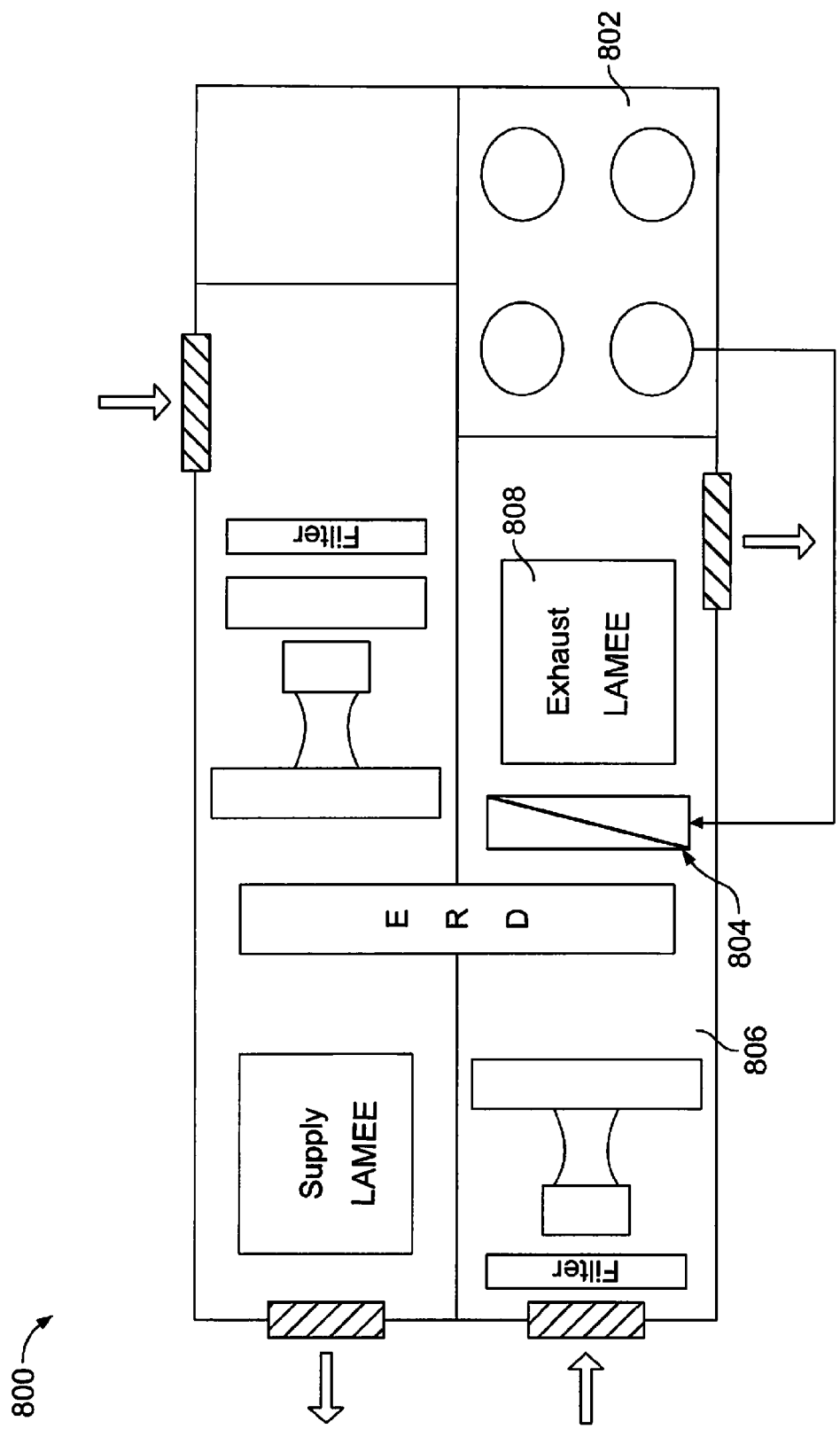
FIG. 10 illustrates a schematic of an air delivery system, according to an embodiment of the present disclosure.

FIG. 10 illustrates a schematic of an air delivery system 800, according to an embodiment of the present disclosure. The air delivery system 800 is similar to the air delivery system 10, shown in FIG. 1A, and may be used with respect to any of the embodiments described above.

As shown in FIG. 10, a heat pump 802 is operatively connected to a heat exchanger 804 within an exhaust air channel 806 upstream from an exhaust LAMEE 808. Energy from the heat pump 802, whether in the form of gas or liquid, such as liquid refrigerant, is transferred to the heat exchanger 804. For example, hot gas or hot refrigerant may be used to heat air or liquid, such as refrigerant, circulating within the heat exchanger 804 in order to further heat the exhaust air before the exhaust air passes into the exhaust LAMEE 808. Cooler gas or cool refrigerant may be used to cool air or liquid, such as refrigerant, circulating within the heat exchanger 804 in order to further cool the exhaust air before the exhaust air passes into the exhaust LAMEE 808.

The air delivery system 800 provides boosted regeneration capacity by preheating exhaust air with heat from the heat pump 802 using the heat exchanger 804, which may be in the form of a hot gas preheat module or sub-cooling module. When additional regeneration is required, the system 800 may boost regeneration capacity by preheating the exhaust air using hot gas from a compressor within the heat pump 802, for example.

Alternatively, regeneration LAMEE disposed within a purge air stream may be utilized in addition to, or in place of, the exhaust LAMEE.

Figure 11:
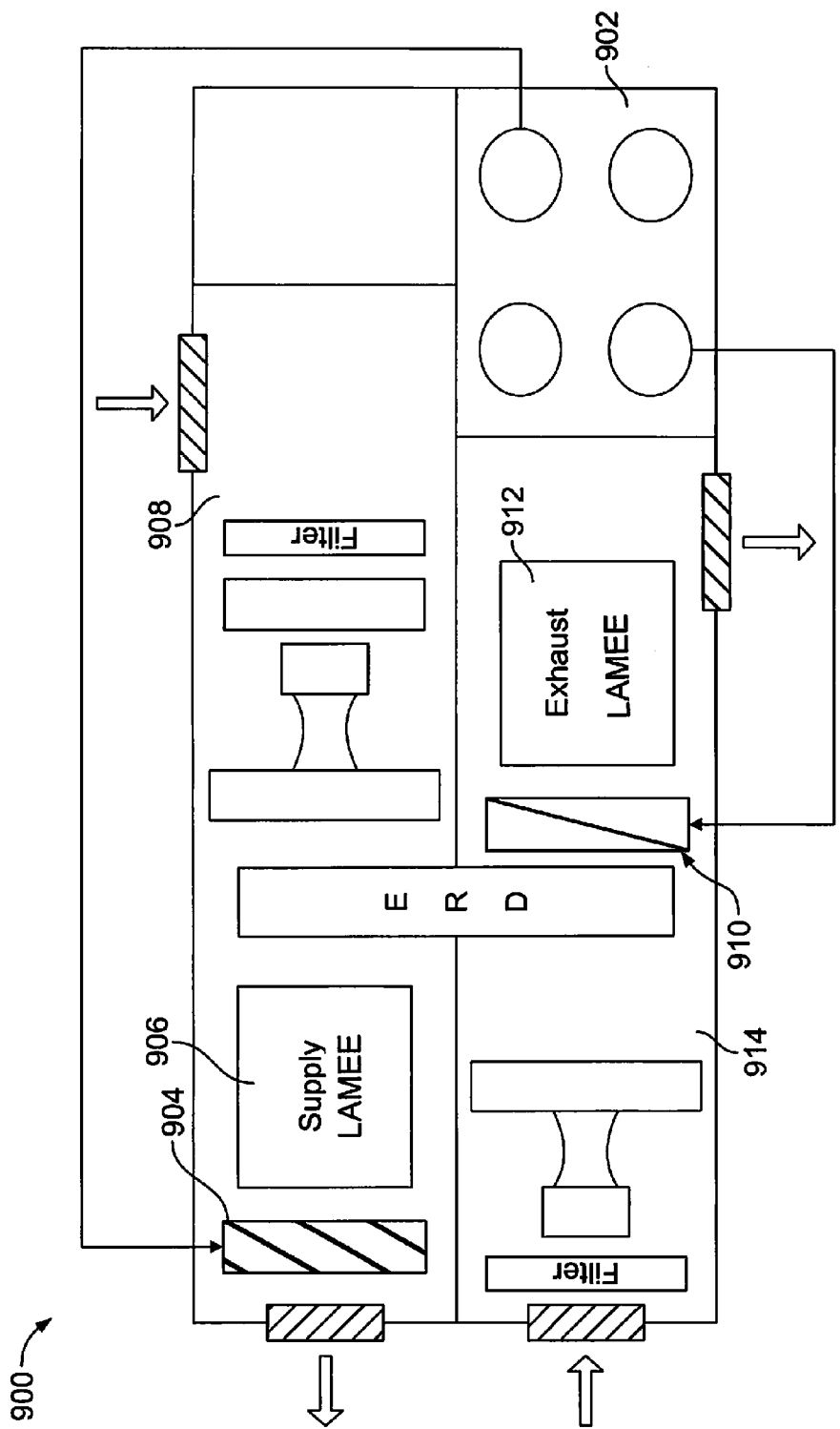
FIG. 11 illustrates a schematic of an air delivery system, according to an embodiment of the present disclosure.

FIG. 11 illustrates a schematic of an air delivery system 900, according to an embodiment of the present disclosure. The air delivery system 900 is similar to the air delivery system 10, shown in FIG. 1A, and may be used with respect to any of the embodiments described above. The air delivery system 900 is similar to the air delivery systems shown in FIGS. 9 and 10, except that a heat pump 902 may be operatively connected to both a heat exchanger 904 that is downstream from a supply LAMEE 906 within a supply air channel 908, and a heat exchanger 910 that is upstream from an exhaust LAMEE 912 within an exhaust air channel 914.

Referring to FIGS. 9-11, an additional heat exchanger may be disposed within the exhaust air channel downstream from the exhaust LAMEE, as described above with respect to FIG. 1A. Also, alternatively, instead of using an additional heat exchanger, the heat exchanger 910 may be moved from an upstream position with respect to the exhaust LAMEE 912, to a position that is downstream from the exhaust LAMEE 912. For example, the heat exchanger 910 may alternatively be disposed within the exhaust air channel 914 downstream from the exhaust LAMEE 912. Accordingly, the heat pump 902 may be operatively connected to the heat exchanger 910 that may be downstream from the exhaust LAMEE 912 within the exhaust air channel 914. In a cooling mode, the heat exchanger 910 may be used as an evaporator to provide heat for regeneration. Alternatively this heat exchanger 910 can be used as a condenser to reject excess heat.

Also, alternatively, a regeneration LAMEE disposed within a purge air stream may be utilized in addition to, or in place of, the exhaust LAMEE.

Figure 12:
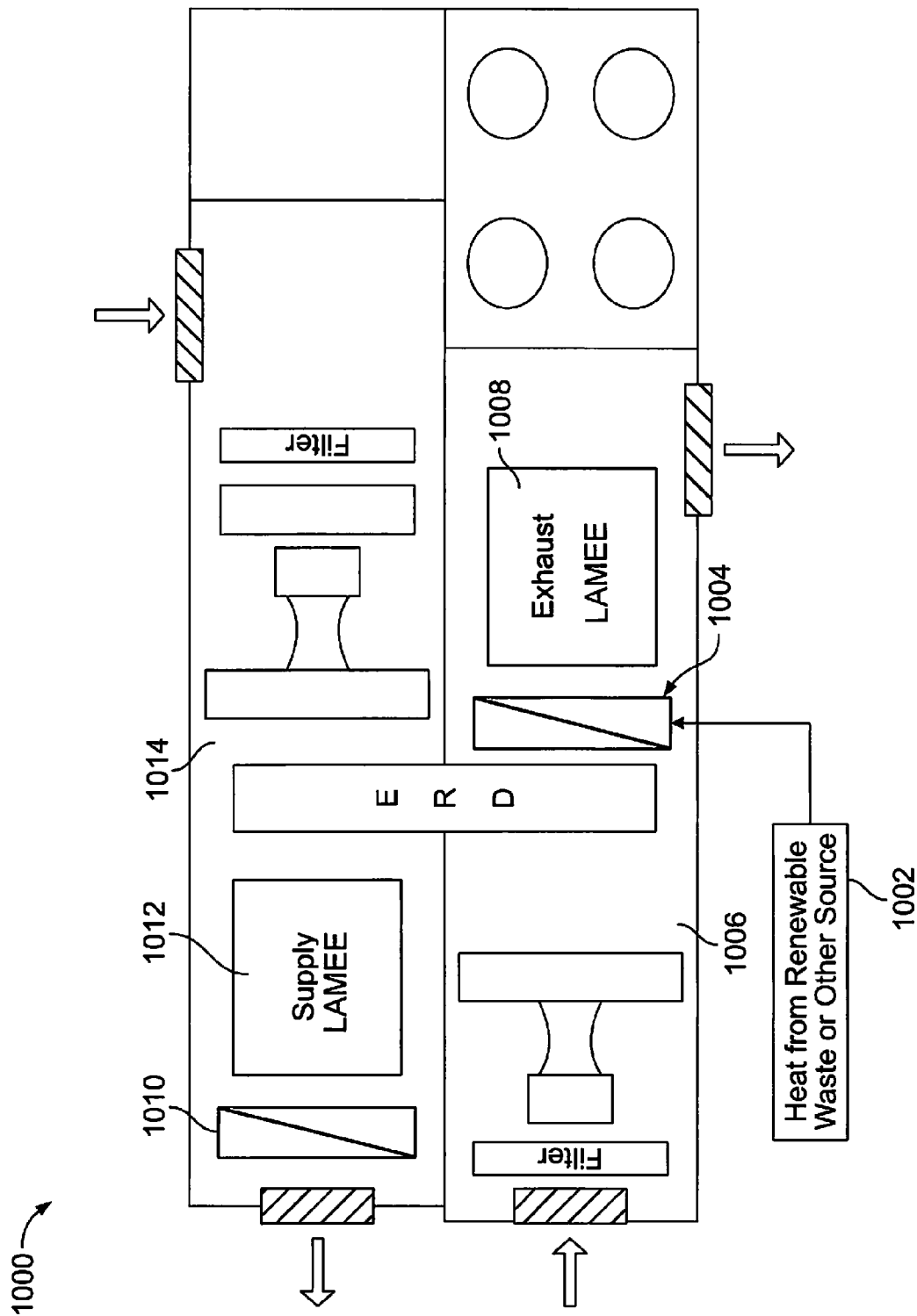
FIG. 12 illustrates a schematic of an air delivery system, according to an embodiment of the present disclosure.

FIG. 12 illustrates a schematic of an air delivery system 1000, according to an embodiment of the present disclosure. The air delivery system 1000 is similar to the air delivery system 10, shown in FIG. 1A, and may be used with respect to any of the embodiments described above. The air delivery system 1000 may include an alternate heat source 1002 operatively connected to a heat exchanger 1004 that is within an exhaust air channel 1006 upstream from an exhaust LAMEE 1008. The alternate heat source 1002 may be a renewable or recyclable source of energy, such as a solar-powered heat source, which may include a plurality of solar cells, a geothermal heat source, waste heat, such as recycled from exhaust air, and/or the like. The heat exchanger 1004 may be a hot water coil, for example. Alternatively, the alternative heat source 1002 may be coupled to a heat exchanger 1010 that is downstream from a supply LAMEE 1012 within a supply air channel 1014. Also, alternatively, the alternative heat source 1002 may be connected to both the heat exchangers 1004 and 1010. In at least one other embodiment, each heat exchanger 1004 and 1010 may be operatively connected to a separate and distinct alternative heat source.

The heat exchanger 1010 may be a reheat coil configured to provide conditioned supply air at a low dew point. The system 1000 may incorporate one or more of a re-heat coil, hot gas reheat module or sub-cooler module to allow the supply air to be sub-cooled, dehumidified and then reheated to provide extremely low dew points.

Alternatively, a regeneration LAMEE disposed within a purge air stream may be utilized in addition to, or in place of, the exhaust LAMEE.

Figure 13:
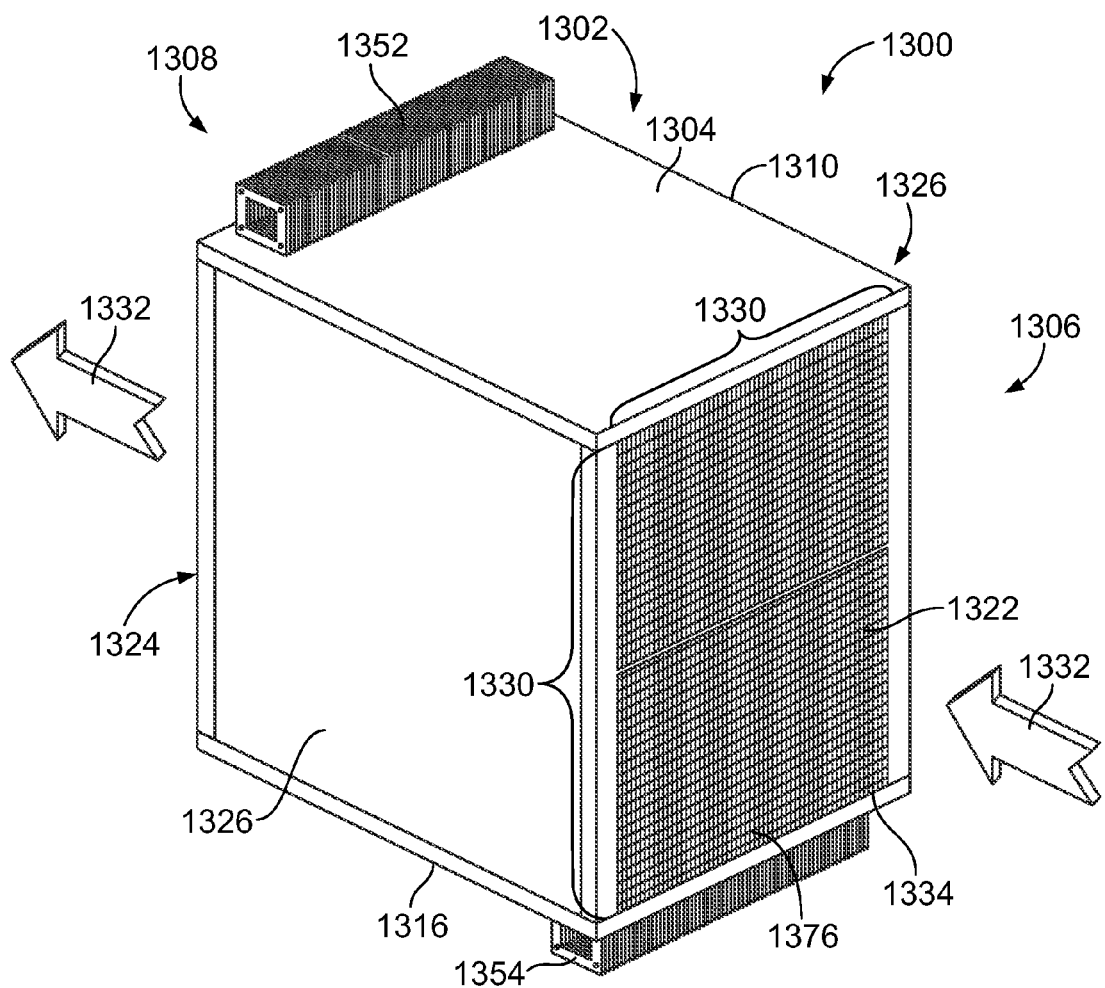
FIG. 13 illustrates a side perspective view of a liquid-to-air membrane energy exchanger, according to an embodiment of the present disclosure.

FIG. 13 illustrates a side perspective view of a LAMEE 1300, according to an embodiment. The LAMEE 1300 may be used as any of the supply, exhaust, or regeneration LAMEEs described above. The LAMEE 1300 includes a housing 1302 having a body 1304. The body 1304 includes an air inlet end 1306 and an air outlet end 1308. A top 1310 extends between the air inlet end 1306 and the air outlet end 1308. While not shown, a stepped-down top may be positioned at the air inlet end 1306. The stepped-down top may be stepped a distance from the top 1310. A bottom 1316 extends between the air inlet end 1306 and the air outlet end 1308. While not shown, a stepped-up bottom may be positioned at the air outlet end 1308. The stepped-up bottom may be stepped a distance from the bottom 1316. In alternative designs the stepped-up bottom or stepped-down top sections may have different sizes of steps or no step at all.

An air inlet 1322 is positioned at the air inlet end 1306. An air outlet 1324 is positioned at the air outlet end 1308. Sides 1326 extend between the air inlet 1322 and the air outlet 1324.

An energy exchange cavity 1330 extends through the housing 1302 of the LAMEE 1300. The energy exchange cavity 1330 extends from the air inlet end 1306 to the air outlet end 1308. An air stream 1332 is received in the air inlet 1322 and flows through the energy exchange cavity 1330. The air stream 1332 is discharged from the energy exchange cavity 1330 at the air outlet 1324. The energy exchange cavity 1330 may include a plurality of panels 1334, such as liquid panels configured to receive desiccant and direct the flow of the desiccant therethrough.

A desiccant inlet reservoir 1352 may be positioned on the top 1310. The desiccant inlet reservoir 1352 may be configured to receive desiccant, which may be stored in a storage tank. The desiccant inlet reservoir 1352 may include an inlet in fluid communication with the storage tank. The desiccant is received through the inlet. The desiccant inlet reservoir 1352 may also include an outlet that is in fluid communication with desiccant channels 1376 of the panels 1334 in the energy exchange cavity 1330. The liquid desiccant flows through the outlet into the desiccant channels 1376. The desiccant flows along the panels 1334 through the desiccant channels 1376 to a desiccant outlet reservoir 1354, which may be positioned at or proximate the bottom 1316.

Accordingly, the desiccant may flow through the LAMEE 1300 from top to bottom. For example, the desiccant may flow into the desiccant channels 1376 proximate to the desiccant inlet reservoir 1352, through the desiccant channels 1376, and out of the LAMEE 1300 proximate to the desiccant outlet reservoir 1354. In an alternative embodiment, the desiccant may flow through the LAMEE 1300 from bottom to top.

Figure 14:
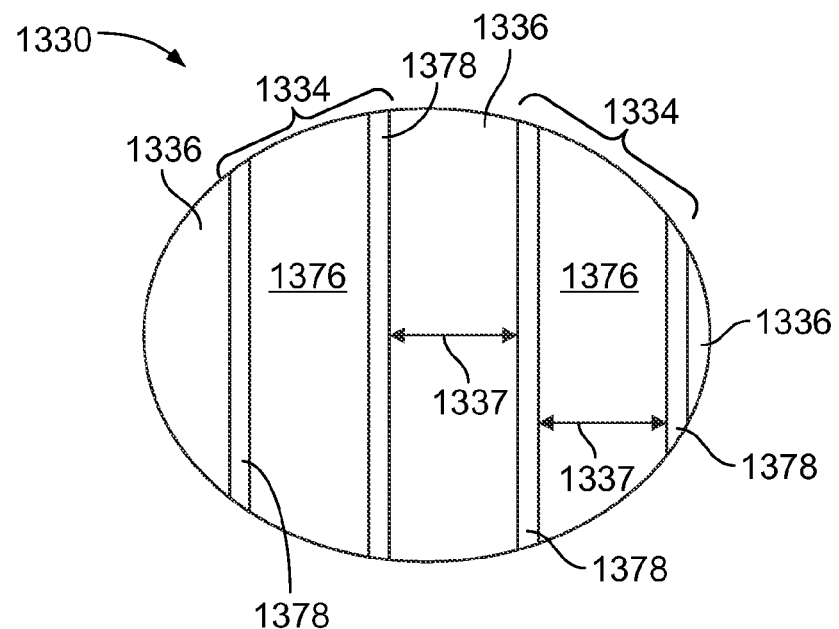
FIG. 14 illustrates a cut-away front view of panels within an energy exchange cavity of a liquid-to-air membrane energy exchanger, according to an embodiment of the present disclosure.

FIG. 14 illustrates a cut-away front view of the panels 1334 within the energy exchange cavity 1330 of the LAMEE 1300, according to an embodiment. The panels 1334 may be solution or liquid panels configured to direct the flow of liquid, such as desiccant, therethrough. The panels 1334 form a liquid desiccant flow path that is confined by semi-permeable membranes 1378 on either side and is configured to carry desiccant therethrough. The membranes 1378 may or may not be porous or able to transfer mass. Each membrane 1378 may be any flexible structure that may generally bulge under fluid pressure. The semi-permeable membranes 1378 are arranged in parallel to form air channels 1336 with an average flow channel width of 1337 and liquid desiccant channels 1376 with an average flow channel width of 1377. In one embodiment, the semi-permeable membranes 1378 are spaced to form uniform air channels 1336 and liquid desiccant channels 1376. The air stream 1332 (shown in FIG. 13) travels through the air channels 1336 between the semi-permeable membranes 1378. The desiccant in each desiccant channel 1376 exchanges heat and moisture with the air stream 1332 in the air channels 1336 through the semi-permeable membranes 1378. The air channels 1336 alternate with the liquid desiccant channels 1376. Except for the two side panels of the energy exchange cavity, each air channel 1336 may be positioned between adjacent liquid desiccant channels 1376.

In order to minimize or otherwise eliminate the liquid desiccant channels 1376 from outwardly bulging or bowing, membrane support assemblies may be positioned within the air channels 1336. The membrane support assemblies are configured to support the membranes, and may promote turbulent air flow between the air channels 1336 and the membranes 1378.

Referring to the Figures, embodiments of the present disclosure may utilize various types of desiccant. For example, embodiments of the present disclosure may utilize one or more of lithium chloride, magnesium chloride, lithium bromide, calcium chloride, glycol, and the like.

Additionally, as described above, embodiments of the present disclosure may include a heat pump configured to exchange sensible and/or latent energy with liquid or gas contained within a heat exchanger. The heat pump may circulate refrigerant with or between the heat exchangers. Examples of refrigerant include R410a, R404, R134a, and the like. The refrigerant may exchange sensible energy with refrigerant flowing through a heat exchanger and/or water or desiccant flowing through a heat exchanger. As such, the heat pump may transfer sensible energy between the refrigerant circulating through a heat exchanger and/or water or desiccant circulating through a heat exchanger.

Figure 15:
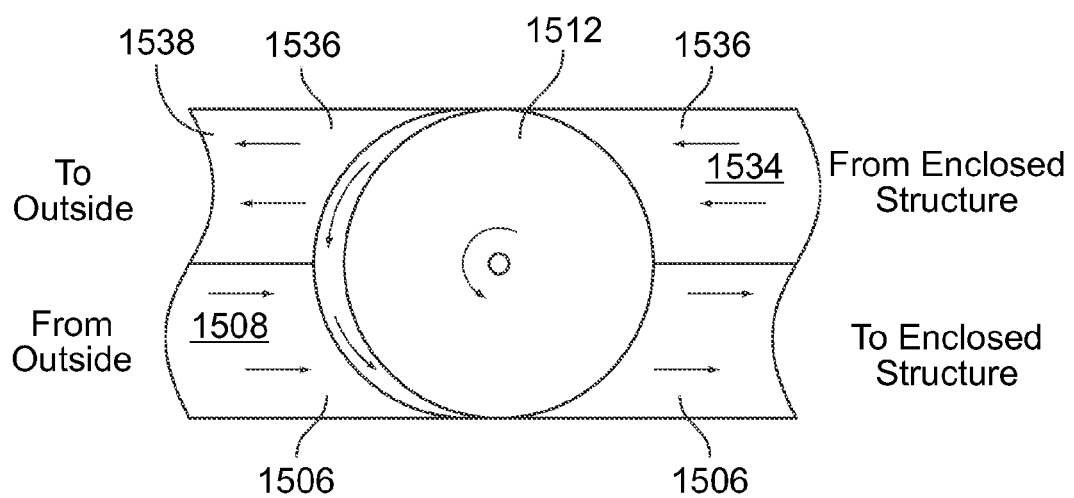
FIG. 15 illustrates a schematic view of an energy recovery device, according to an embodiment of the present disclosure.

FIG. 15 illustrates a schematic view of an energy recovery device 1512, according to an embodiment of the present disclosure. The energy recovery device 1512 represents one example of any of the energy recovery devices described above. A portion of the energy recovery device 1512 is disposed within a supply air channel 1506, while another portion of the energy recovery device 1512 is disposed within an exhaust air channel 1536. The energy recovery device 1512 is configured to transfer heat and/or moisture between the supply air channel 1506 and the exhaust air channel 1536. The energy recovery device 1512 may be one or more of various types of energy recovery devices, such as, for example, an enthalpy wheel, a sensible wheel, a desiccant wheel, or the like. As shown in FIG. 15, the energy recovery device 1512 may be an enthalpy wheel.

An enthalpy wheel is a rotary air-to-air heat exchanger. As shown, supply air 1508 within the supply air channel 1506 passes in a direction counter-flow to the exhaust air 1534 within the exhaust air channel 1536. For example, the supply air 1508 may flow through the lower half of the wheel, while the exhaust air 1534 flows through the upper half of the wheel, or vice versa. The wheel may be formed of a heat-conducting material with an optional desiccant coating.

In general, the wheel may be filled with an air permeable material resulting in a large surface area. The surface area is the medium for sensible energy transfer. As the wheel rotates between the supply and exhaust air channels 1506 and 1536, respectively, the wheel picks up heat energy and releases it into the colder air stream. Enthalpy exchange may be accomplished through the use of desiccants on an outer surface of the wheel. Desiccants transfer moisture through the process of adsorption, which is driven by the difference in the partial pressure of vapor within the opposing air streams.

Additionally, the rotational speed of the wheel also changes the amount of heat and moisture transferred. A slowly-turning desiccant coated wheel primarily transfers moisture. A faster turning desiccant coated wheel provides for both heat and moisture transfer.

Optionally, the energy recovery device 1512 may be a sensible wheel, a dehumidification wheel, a plate exchanger, a heat pipe, a run-around apparatus, a refrigeration loop having a condenser and evaporator, a chilled water coil, or the like.

Alternatively, the energy recovery device 1512 may be a flat plate exchanger. A flat plate exchanger is generally a fixed plate that has no moving parts. The exchanger may include alternating layers of plates that are separated and sealed. Because the plates are generally solid and non-permeable, only sensible energy is transferred. Optionally, the plates may be made from a selectively permeable material that allows for both sensible and latent energy transfer.

Alternatively, the energy recovery device 1512 may be a run-around loop or coil. A run-around loop or coil includes two or more multi-row finned tube coils connected to each other by a pumped pipework circuit. The pipework is charged with a heat exchange fluid, typically water or glycol, which picks up heat from the exhaust air coil and transfers the heat to the supply air coil before returning again. Thus, heat from an exhaust air stream is transferred through the pipework coil to the circulating fluid, and then from the fluid through the pipework coil to the supply air stream.

Also, alternatively, the energy recovery device 1512 may be a heat pipe. A heat pipe is a thermal transfer device that includes one or more sealed pipes or tubes made of a material with a high thermal conductivity such as copper or aluminum at both hot and cold ends. A vacuum pump is used to remove all air from the empty heat pipe, and then the pipe is filled with a fraction of a percent by volume of a vaporizable liquid or refrigerant, such as water, ethanol, HCFC, R134a, R-22, R407c, R410a, or the like. Heat pipes contain no mechanical moving parts. Heat pipes transfer thermal energy from one point to another by the evaporation and condensation of a working fluid, vaporizable liquid, or coolant.

Figure 16:
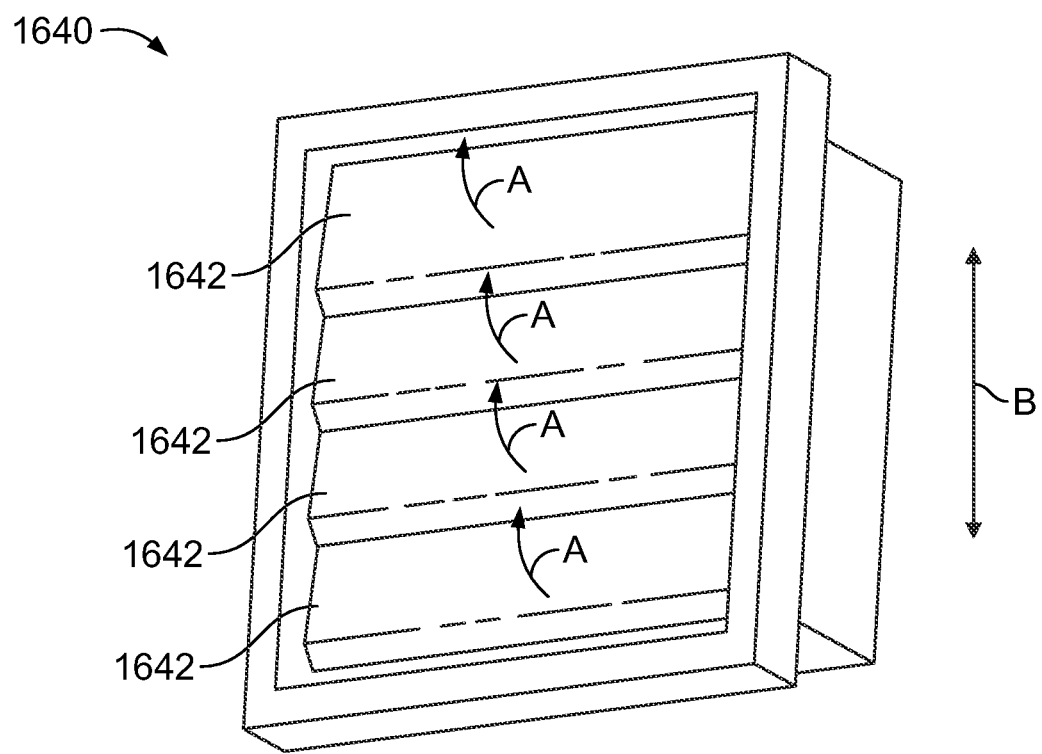
FIG. 16 illustrates a perspective view of a damper, according to an embodiment of the present disclosure.

FIG. 16 illustrates a perspective view of a damper 1640, according to an embodiment of the present disclosure. Any of the dampers described above may be structured and operate similar to the damper 1640. The damper 1640 may include a plurality of plates 1642. Each plate 1642 may be positioned on a pivot (not shown) that allows the plates 1642 to be moved between open and closed positions. As shown in FIG. 16, the plates 1642 are in the fully-closed position. When the damper 1640 is to be opened, the plates 1642 swing open in the direction of arc A.

Alternatively, the damper 1640 may include a single sliding plate that slides between open and closed positions in directions denoted by arrow B. Indeed, the damper 1640 may take any form that allows selective movement between open and closed positions.

Figure 17:
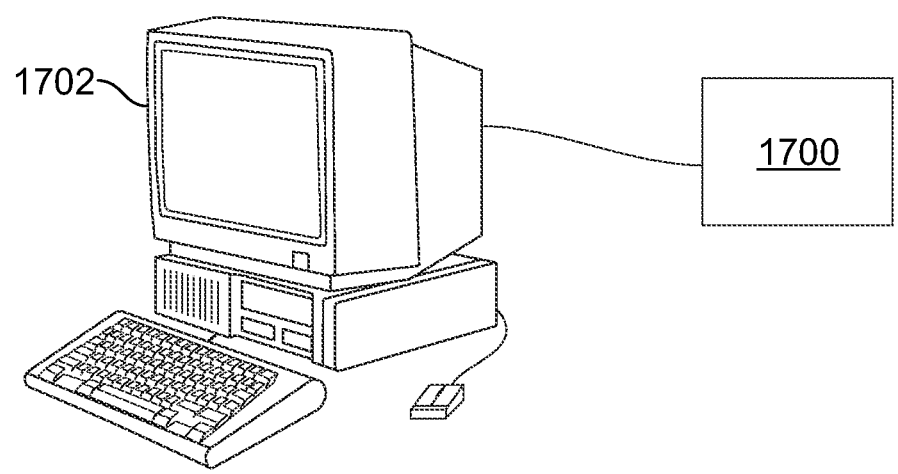
FIG. 17 illustrates a schematic of an air delivery system, according to an embodiment of the present disclosure Before the embodiments are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

FIG. 17 illustrates a schematic of an air delivery system 1700, according to an embodiment of the present disclosure. As shown, a computing device 1702 having a processing unit monitors and controls operation of the air delivery system 1700, which may be any of the air delivery systems described above. For example, the computing device 1702 may include or be in communication with the control sub-system 84 shown and described with respect to FIG. 1A. The computing device 1702 may be used to control the air delivery system 1700 (such as activation and rotation of an enthalpy wheel), the LAMEEs, the moisture control loops, conditioners, heat exchangers, fluid pumps, fluid control valves, and the like.

The computing device 1702 may be remotely located from the system 1700, and may include a portable computer, a PDA, a cell phone, and the like. Optionally, the computing device 1702 may be a thermostat, humidistat, or the like, having a control unit that includes a processing unit. The computing device 1702 includes a processing unit, such as a central processing unit (CPU) that may include a micro-processor, a micro-controller, or equivalent control circuitry, designed specifically to control the system 1700. The CPU may include RAM or ROM memory, logic and timing circuitry, state machine circuitry, and I/O circuitry to interface with the system 2200.

Referring to FIGS. 1-17, certain embodiments of the present disclosure provide systems and methods for desiccant storage and off-hour regeneration of desiccant. The desiccant may be conditioned by various processes, such as by regeneration by a regeneration module, such an exhaust or purge LAMEE, to concentrate the desiccant. Another system and method may condition the desiccant by remote heating or cooling, for example. The regenerated or otherwise conditioned desiccant is re-injected into the storage tank and combined with the supply or exhaust desiccant streams in the liquid desiccant air handling system.

Additionally, embodiments of the present disclosure may utilize renewable energy sources. For example, waste heat, solar, thermal or other sources of heating may be used to regenerate or otherwise condition the liquid desiccant whenever the source of heat is available, and the regenerated or otherwise conditioned desiccant may be stored in reserve until it is needed by the conditioning unit. In effect, there is the possibility of long-term storage of solar or other renewable energy with little degradation.

Embodiments of the present disclosure may be controllable and modifiable. For example, the temperature and/or concentration of the exhaust desiccant may be manipulated to collect moisture from the exhaust air when humidification of the supply air is required. The energy recovery device and/or desiccant flow, temperature, or concentration may be controlled to maximize or minimize transient effects to increase performance. Sensible and latent heating or cooling may optionally be totally decoupled to provide sensible only, latent only or anything in-between. Any or all of the above methods may be utilized to minimize the annual energy cost of operating the systems, based on location and utility costs.

The methods and systems herein describe various ways to control the liquid desiccant temperature and concentration to control supply air temperature and humidity while maximizing both system efficiency and the use of renewable energies, such as solar radiation and waste heat.

Embodiments of the present disclosure provide various systems and methods for maintaining supply conditions within an enclosed structure by altering and modifying concentrations and temperatures of desiccant within air delivery systems.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An air delivery system comprising:
    a housing including a supply air channel and an exhaust air channel, wherein the supply air channel includes a supply air inlet configured to allow air to pass into the supply air channel, and a supply air outlet configured to allow supply air to pass to an enclosed structure, and wherein the exhaust air channel includes an exhaust air inlet configured to allow exhaust air from the enclosed structure to pass into the exhaust air channel, and an exhaust air outlet configured to allow exhaust air to exhaust to an outside environment;
    an exhaust liquid-to-air-membrane energy exchanger (LAMEE) that is disposed within the exhaust air channel and that is configured to receive the air during a desiccant regeneration mode in order to regenerate desiccant within the exhaust LAMEE, wherein the exhaust LAMEE comprises a plurality of desiccant channels separated from a plurality of air channels by a plurality of semi-permeable membranes;
    a desiccant storage tank in communication with the exhaust LAMEE, wherein the exhaust LAMEE is configured to store regenerated desiccant within the desiccant storage tank, and wherein the regenerated desiccant is configured to be tapped during a normal operation mode;
    a desiccant regeneration bypass damper positioned between the supply air channel and the exhaust air channel;
    a supply air inlet damper positioned within the supply air inlet;
    a supply air outlet damper positioned within the supply air outlet;
    an exhaust air inlet damper positioned within the exhaust air inlet;
    an exhaust air outlet damper positioned within the exhaust air outlet; and
    a control sub-system configured to control operation of the air delivery system and to transition the air delivery system between the normal operation mode and the desiccant regeneration mode, the control sub-system, during the desiccant regeneration mode:
        opening the supply air inlet damper, the exhaust air outlet damper, and the exhaust air inlet damper and closing the supply air outlet damper and the desiccant regeneration bypass damper so that the exhaust air from the enclosed structure passes to the exhaust air channel and into the exhaust LAMEE and the desiccant within the exhaust LAMEE is regenerated with the exhaust air.

2. The air delivery system of claim 1, wherein the exhaust LAMEE is configured to receive the air during an off-hour period when the air delivery system is not providing supply air to the enclosed structure.

3. The air delivery system of claim 1, wherein the supply air channel and the exhaust air channel are separated by a partition, and wherein the desiccant regeneration bypass damper is disposed within the partition.

4. The air delivery system of claim 1, further comprising a damper positioned between the exhaust air channel and the supply air channel, wherein the damper is configured to be opened to mix at least a portion of the exhaust air with the supply air.

5. The air delivery system of claim 1, further comprising a second LAMEE, wherein the second LAMEE is a supply LAMEE disposed within the supply air channel, wherein the supply LAMEE is operatively connected to the exhaust LAMEE by a moisture transfer loop configured to circulate the desiccant between the supply LAMEE and the exhaust LAMEE.

6. The air delivery system of claim 5, further comprising a heat pump operatively connected to the supply LAMEE, wherein the heat pump is configured to heat or cool the desiccant within the supply LAMEE.

7. The air delivery system of claim 6, further comprising one or more of:
  a first heat exchanger within the supply air channel downstream of the supply LAMEE;
  a second heat exchanger within the exhaust air channel upstream from the exhaust LAMEE;
  or a third heat exchanger within the exhaust air channel downstream from the exhaust LAMEE.

8. The air delivery system of claim 7, wherein the heat pump is operatively connected to one or more of the first heat exchanger, the second heat exchanger, or the third heat exchanger, and wherein gas or liquid from the heat pump is used to condition refrigerant within one or more of the first, second, or third heat exchangers.

9. The air delivery system of claim 7, further comprising a source of renewable or recyclable energy operatively connected to one or more of the first heat exchanger, the second heat exchanger, or the third heat exchanger, and wherein the source of renewable or recyclable energy is configured to condition a liquid within one or more of the first, second, or third heat exchangers.

10. The air delivery system of claim 5, wherein the supply LAMEE is fluidly connected to the desiccant storage tank with at least one conduit.

11. The air delivery system of claim 5, further comprising at least one supply bypass damper positioned proximate to the supply LAMEE, wherein the at least one supply bypass damper is configured to be moved between a closed position in which airflow is directed through the supply LAMEE and an open position in which the airflow is bypassed around the supply LAMEE.

12. The air delivery system of claim 5, further comprising a water supply fluidly connected to the supply LAMEE, wherein the water supply is configured to provide water to the desiccant within the supply LAMEE to one or both of dilute the desiccant or alter the temperature of the desiccant.

13. The air delivery system of claim 5, further comprising an energy recovery device having a first portion disposed within the supply air channel upstream from the supply LAMEE, and a second portion disposed within the exhaust air channel upstream from the exhaust LAMEE.

14. The air delivery system of claim 13, further comprising at least one bypass damper positioned proximate to at least the first or second portions, wherein the at least one bypass damper is configured to be closed in order to prevent airflow from bypassing around the energy recovery device, and opened in order to allow at least a portion of the air to bypass around the energy recovery device.

15. The air delivery system of claim 13, wherein the energy recovery device comprises an enthalpy wheel.

16. The delivery system of claim 1, further comprising a heat pump operatively connected to the exhaust LAMEE, wherein the heat pump is configured to heat or cool the desiccant within the exhaust LAMEE.

17. The air delivery system of claim 1, further comprising at least one exhaust bypass damper positioned proximate to the exhaust LAMEE, wherein the at least one exhaust bypass damper is configured to be moved between a closed position in which airflow is directed through the exhaust LAMEE and an open position in which the airflow is bypassed around the exhaust LAMEE.

18. The air delivery system of claim 1, further comprising an exhaust air recirculating damper positioned between the supply air channel and the exhaust air channel, wherein the exhaust air recirculating damper is configured to be opened to allow the exhaust air from the enclosed structure to recirculate into the supply air.

19. The air delivery system of claim 1, further comprising a water supply fluidly connected to the exhaust LAMEE, wherein the water supply is configured to provide water to the desiccant within the exhaust LAMEE to one or both of dilute the desiccant or alter the temperature of the desiccant.

20. A method of operating an air delivery system, wherein the air delivery system includes a housing having a supply air channel and an exhaust air channel, wherein the supply air channel includes a supply air inlet configured to allow air to pass into the supply air channel, and a supply air outlet configured to allow supply air to an enclosed structure, and wherein the exhaust air channel includes an exhaust air inlet configured to allow exhaust air from the enclosed structure to pass into the exhaust air channel, and an exhaust air outlet configured to allow exhaust air to exhaust to an outside environment, the method comprising:
  receiving the air within an exhaust liquid-to-air membrane energy exchanger (LAMEE) disposed within the exhaust air channel during a desiccant regeneration mode;
  regenerating the desiccant within the exhaust LAMEE during the desiccant regeneration mode;
  storing regenerated desiccant within a desiccant storage tank that is fluidly connected to the exhaust LAMEE;
  tapping the regenerated desiccant during a normal operation mode;
  during the desiccant regeneration mode:
    opening each of a supply air inlet damper, an exhaust air outlet damper, and an exhaust air inlet damper;
    closing a supply air outlet damper and a desiccant regeneration bypass damper so that the exhaust air from the enclosed structure passes to the exhaust air channel and into the exhaust LAMEE; and
    regenerating the desiccant within the exhaust LAMEE with the exhaust air.

21. The method of claim 20, wherein the receiving the air occurs during an off-hour period when the air delivery system is not providing supply air to the enclosed structure.

22. A method of operating an air delivery system, wherein the air delivery system includes a housing having a supply air channel and an exhaust air channel, wherein the supply air channel includes a supply air inlet configured to allow air to pass into the supply air channel, and a supply air outlet configured to allow supply air to an enclosed structure, and wherein the exhaust air channel includes an exhaust air inlet configured to allow exhaust air from the enclosed structure to pass into the exhaust air channel, and an exhaust air outlet configured to allow exhaust air to exhaust to an outside environment, the method comprising:
  receiving the air within an exhaust liquid-to-air membrane energy exchanger (LAMEE) disposed within the exhaust air channel during a desiccant regeneration mode;
  regenerating the desiccant within the exhaust LAMEE during the desiccant regeneration mode;
  storing regenerated desiccant within a desiccant storage tank that is fluidly connected to the exhaust LAMEE;
  tapping the regenerated desiccant during a normal operation mode;
  opening each of a supply air inlet damper, an exhaust air outlet damper, and a desiccant regeneration bypass damper during the desiccant regeneration mode;
  closing a supply air outlet damper and an exhaust air inlet damper during he desiccant regeneration mode so that the air passes directly from the supply air channel to the exhaust air channel and into the exhaust LAMEE; and regenerating the desiccant within the exhaust LAMEE with the outside air.

23. The method of claim 20, further comprising circulating the desiccant between the exhaust LAMEE and a supply LAMEE disposed within the supply air channel through a moisture transfer loop.

24. The method of claim 23, heating or cooling the desiccant within the supply LAMEE with a heat pump.

25. The method of claim 20, further comprising conditioning refrigerant within one or both of a first or second heat exchanger with gas or liquid from a heat pump.

26. The method of claim 20, further comprising conditioning a liquid within one or both of a first or second heat exchanger with a renewable or recyclable energy.

27. The method of claim 20, further comprising selectively actuating at least one supply bypass damper positioned proximate to a supply LAMEE, wherein the selectively actuating comprises moving the supply bypass damper between a closed position in which airflow is directed through the supply LAMEE and an open position in which the airflow is bypassed around the supply LAMEE.

28. The method of claim 20, further comprising providing water from a water source to desiccant within a supply LAMEE to one or both of dilute the desiccant or alter the temperature of the desiccant.

29. The method of claim 20, further comprising:
closing at least one bypass damper positioned proximate to an energy recovery device in order to prevent airflow from bypassing around the energy recovery device, and opening the at least one bypass damper in order to allow at least a portion of the airflow to bypass around the energy recovery device.

30. The method of claim 20, further comprising heating or cooling the desiccant within the exhaust LAMEE with a heat pump.

31. The method of claim 20, further comprising controlling operation of the air delivery system with a control sub-system, wherein the controlling comprises transitioning the air delivery system between the normal operation mode and the desiccant regeneration mode.

32. The method of claim 20, further comprising selectively actuating at least one exhaust bypass damper positioned proximate to the exhaust LAMEE, wherein the selectively actuating comprises moving the at least one exhaust bypass damper to a closed position in which airflow is directed through the exhaust LAMEE, and moving the at least one exhaust bypass damper to an open position in which the airflow is bypassed around the exhaust LAMEE.

33. The method of claim 20, further comprising opening an exhaust air recirculating damper to recirculate the exhaust air from the enclosed structure into the supply air.

34. The method of claim 20, providing water from a water supply to the desiccant within the exhaust LAMEE to one or both of dilute the desiccant or alter the temperature of the desiccant.

35. An air delivery system comprising:
a housing including a supply air channel and an exhaust air channel, wherein the supply air channel includes a supply air inlet configured to allow air to pass into the supply air channel, and a supply air outlet configured to allow supply air to pass to an enclosed structure, and wherein the exhaust air channel includes an exhaust air inlet configured to allow exhaust air from the enclosed structure to pass into the exhaust air channel, and an exhaust air outlet configured to allow exhaust air to exhaust to an outside environment;

an exhaust liquid-to-air-membrane energy exchanger (LAMEE) that is disposed within the exhaust air channel and that is configured to receive the air during a desiccant regeneration mode in order to regenerate desiccant within the exhaust LAMEE, wherein the exhaust LAMEE comprises a plurality of desiccant channels separated from a plurality of air channels by a plurality of semi-permeable membranes;

a desiccant storage tank in communication with the exhaust LAMEE, wherein the exhaust LAMEE is configured to store regenerated desiccant within the desiccant storage tank, and wherein the regenerated desiccant is configured to be tapped during a normal operation mode;

a desiccant regeneration bypass damper positioned between the supply air channel and the exhaust air channel;

a supply air inlet damper positioned within the supply air inlet;

a supply air outlet damper positioned within the supply air outlet;

an exhaust air inlet damper positioned within the exhaust air inlet;

an exhaust air outlet damper positioned within the exhaust air outlet; and a control sub-system configured to control operation of the air delivery system and to transition the air delivery system between the normal operation mode and the desiccant regeneration mode, the control sub-system, during the desiccant regeneration mode:
opening the supply air inlet damper, the exhaust air outlet damper, and the desiccant regeneration bypass damper and closing the supply air outlet damper and the exhaust air inlet damper so that the air passes directly from the supply air channel to the exhaust air channel and into the exhaust LAMEE and the desiccant within the exhaust LAMEE is regenerated with outside air.

* * * * *

UNITED STATES PATENT AND TRADEMARK OFFICE
CERTIFICATE OF CORRECTION

Page 1 of 2

PATENT NO. : 10,584,884 B2
APPLICATION NO. : 14/171951
DATED : March 10, 2020
INVENTOR(S) : Coutu et al.

It is certified that error appears in the above-identified patent and that said Letters Patent is hereby corrected as shown below:

On the Title Page

On page 5, in Column 1, under "Other Publications", Line 16, delete ""Desicants" and insert --"Desiccants-- therefor On page 7, in Column 1, under "Other Publications", Line 43, delete ""Austrailian" and insert --"Australian-- therefor On page 7, in Column 2, under "Other Publications", Line 26, delete "Nov. 30, 2016" and insert --Dec. 30, 2016-- therefor On page 8, in Column 2, under "Other Publications", Line 42, delete "PCT/CA20151050787," and insert --PCT/CA2015/050787,-- therefor On page 9, in Column 1, under "Other Publications", Line 16, delete ""Mimimum-dissipation" and insert --"Minimum-dissipation-- therefor On page 9, in Column 1, under "Other Publications", Line 20, delete "Mositure" and insert --Moisture-- therefor On page 10, in Column 1, under "Other Publications", Line 58, delete "Apr. 14, 2018" and insert --Mar. 14, 2018-- therefor On page 10, in Column 2, under "Other Publications", Line 6, delete "Nov. 5, 2018"," and insert --Jan. 5, 2018",-- therefor On page 12, in Column 1, under "Other Publications", Line 16, delete "Respnose" and insert --Response-- therefor Signed and Sealed this
Third Day of November, 2020

Andrei Iancu
*Director of the United States Patent and Trademark Office*

CERTIFICATE OF CORRECTION (continued)
U.S. Pat. No. 10,584,884 B2

In the Claims

In Column 25, Line 51, in Claim 16, after "The", insert --air--

In Column 26, Line 65, in Claim 22, delete "he" and insert --the-- therefor